United States Patent [19]

Minovitch

[11] Patent Number: 4,795,113
[45] Date of Patent: Jan. 3, 1989

[54] ELECTROMAGNETIC TRANSPORTATION SYSTEM FOR MANNED SPACE TRAVEL

[76] Inventor: Michael A. Minovitch, 2832 St. George St., Los Angeles, Calif. 90027

[21] Appl. No.: 919,252

[22] Filed: Oct. 14, 1986

Related U.S. Application Data

[63] Continuation-in-part of Ser. No. 577,592, Feb. 6, 1984, abandoned.

[51] Int. Cl.$^4$ .............. B64G 5/00; B64F 1/04
[52] U.S. Cl. .................. 244/63; 244/158 R; 244/172; 104/138.1; 104/292; 104/282; 335/219
[58] Field of Search .............. 244/63, 158 R, 158 A, 244/172, 166, 49, 160, 2; 277/80; 104/138.1, 290, 292, 282, 281; 220/230; 89/8; 124/3; 310/12; 335/216, 219

[56] References Cited

U.S. PATENT DOCUMENTS

| | | | |
|---|---|---|---|
| 3,224,375 | 12/1965 | Hoff | 244/158 A |
| 3,231,219 | 1/1966 | Young | 244/160 |
| 3,325,123 | 6/1967 | Null | 244/166 |
| 3,392,941 | 7/1968 | Cason III | 244/166 |
| 3,566,800 | 3/1971 | Chuan | 104/138.1 |
| 3,596,604 | 8/1971 | Corkevy | 244/158 A |
| 4,445,696 | 5/1984 | Raj et al. | 277/80 |

FOREIGN PATENT DOCUMENTS

| | | | |
|---|---|---|---|
| 858258 | 12/1970 | Canada | 104/138.1 |
| 2338728 | 2/1975 | Fed. Rep. of Germany | 104/138.1 |

OTHER PUBLICATIONS

Kolm et al., "Electromagnetic Launchers", IEEE Trans. on Magnetics, vol. Mag 16, No. 5, 9-1980.

Primary Examiner—Galen Barefoot
Attorney, Agent, or Firm—Christie, Parker & Hale

[57] ABSTRACT

An electromagnetically propelled space transportation system is provided for transporting passengers and/or freight between the Earth's surface and orbiting spaceports via reusable spaceplanes. Each spaceplane is equipped with a plurality of superconducting propulsion coils extending along its fuselage and is accelerated to orbital velocities inside a vacuum tube by a 1,530 km long electromagnetic linear accelerator. The vacuum tube is evacuated by utilizing the accelerator as a giant vacuum pump wherein a free-moving, magnetically propelled, air-tight piston is driven through the entire tube at low speed thereby forcing the air directly out the end. The spaceplanes are equipped with movable wings and other aerodynamic surfaces that are retracted during launching and extended during landing. The accelerator is capable of launching spaceplanes directly to geosynchronous orbits or onto interplanetary trajectories. The accelerator is embedded deep underground with a maximum depth of 46 km and emerges near the summit of a high mountain. The system is powered by the Earth's gravitational field whereby natural hydro and geothermal energy is converted into electrical energy. Since substantially more electrical energy is generated than is used by the accelerator, the system produces vast amounts of clean renewable electrical energy.

43 Claims, 19 Drawing Sheets

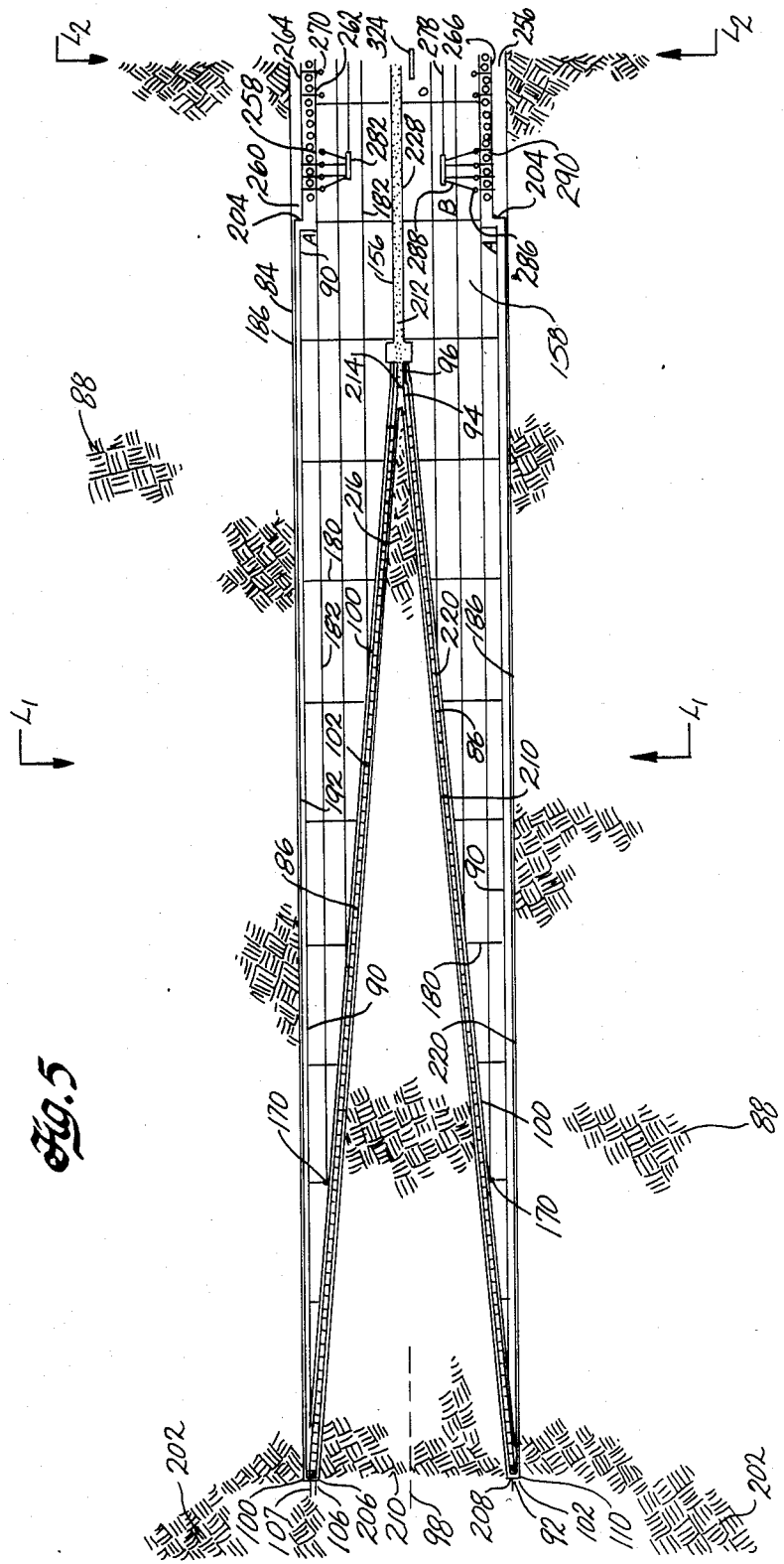

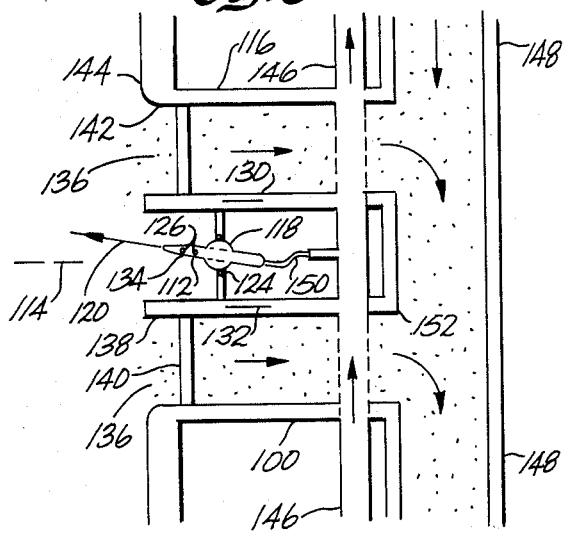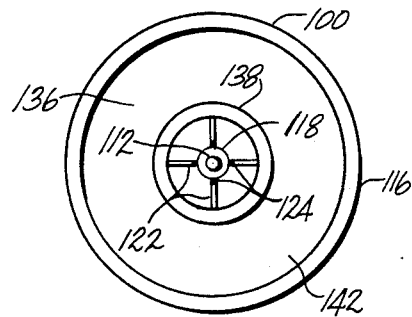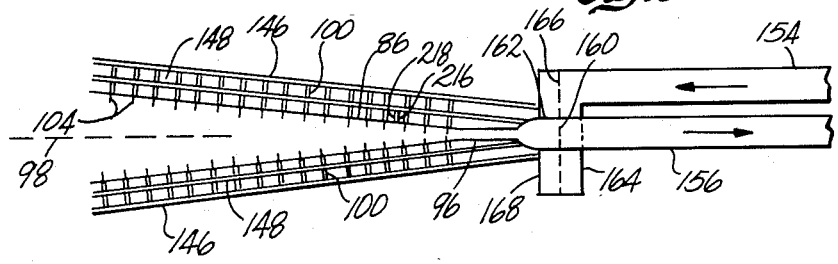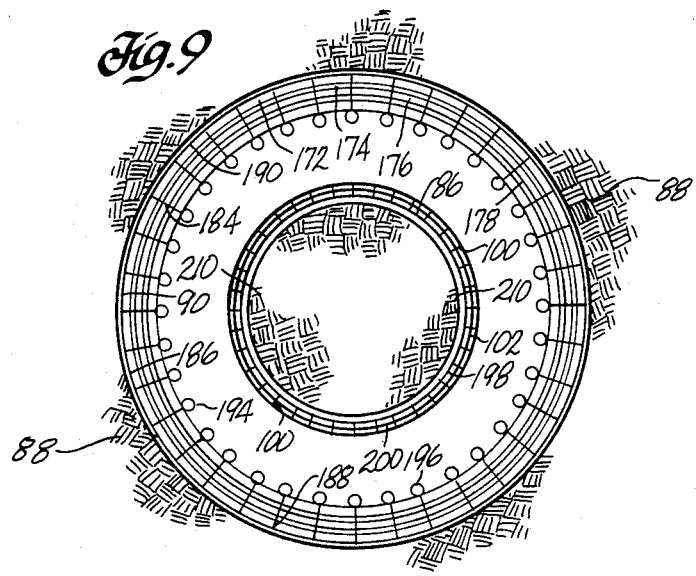

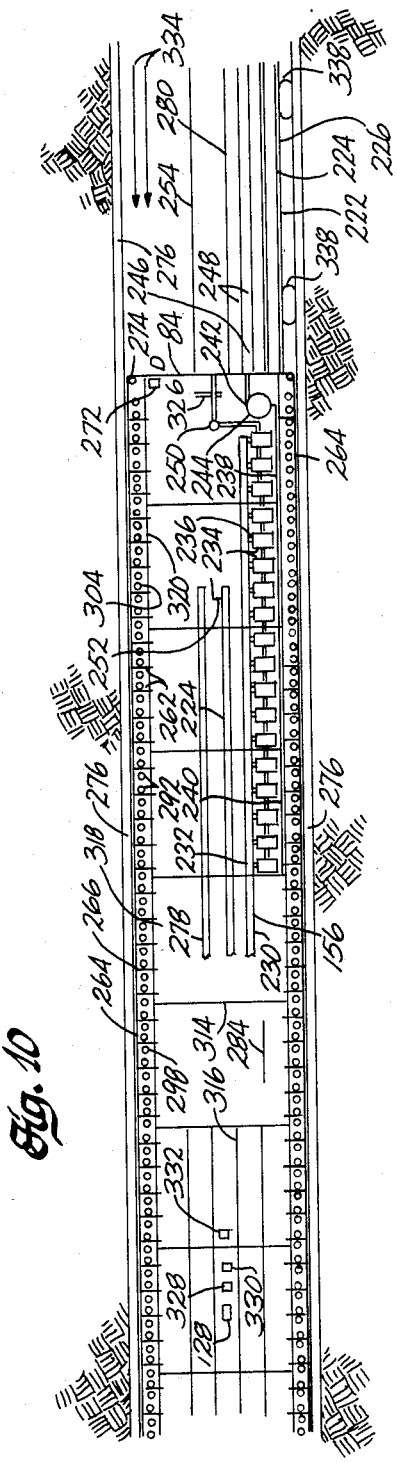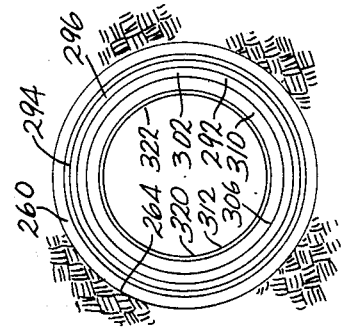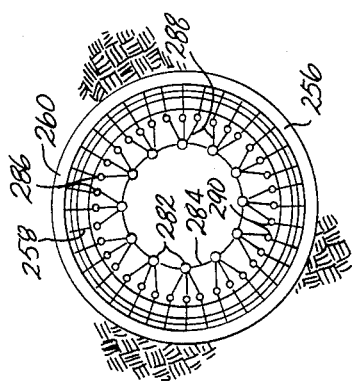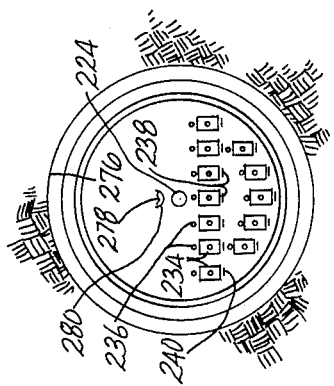

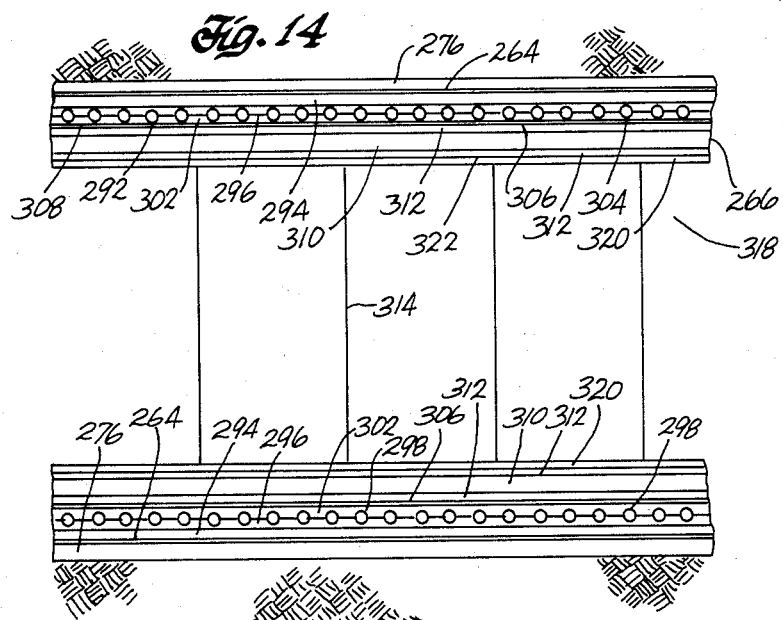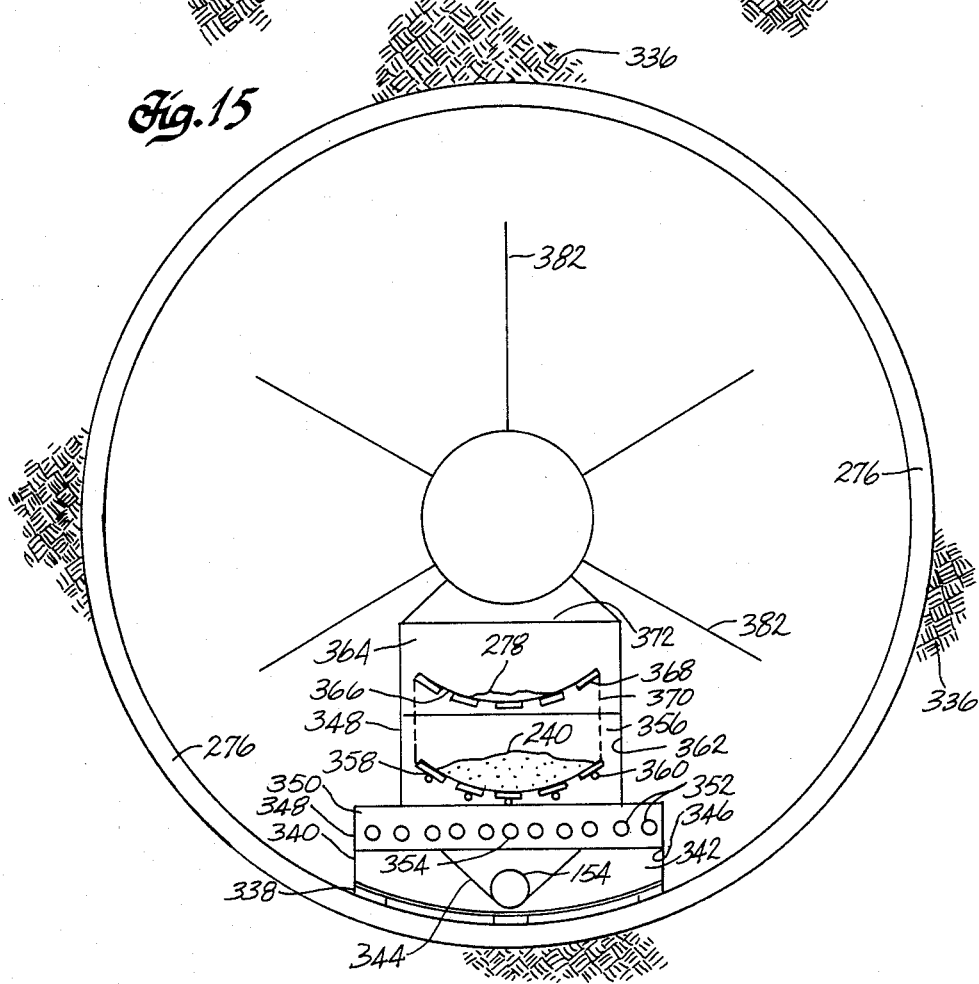

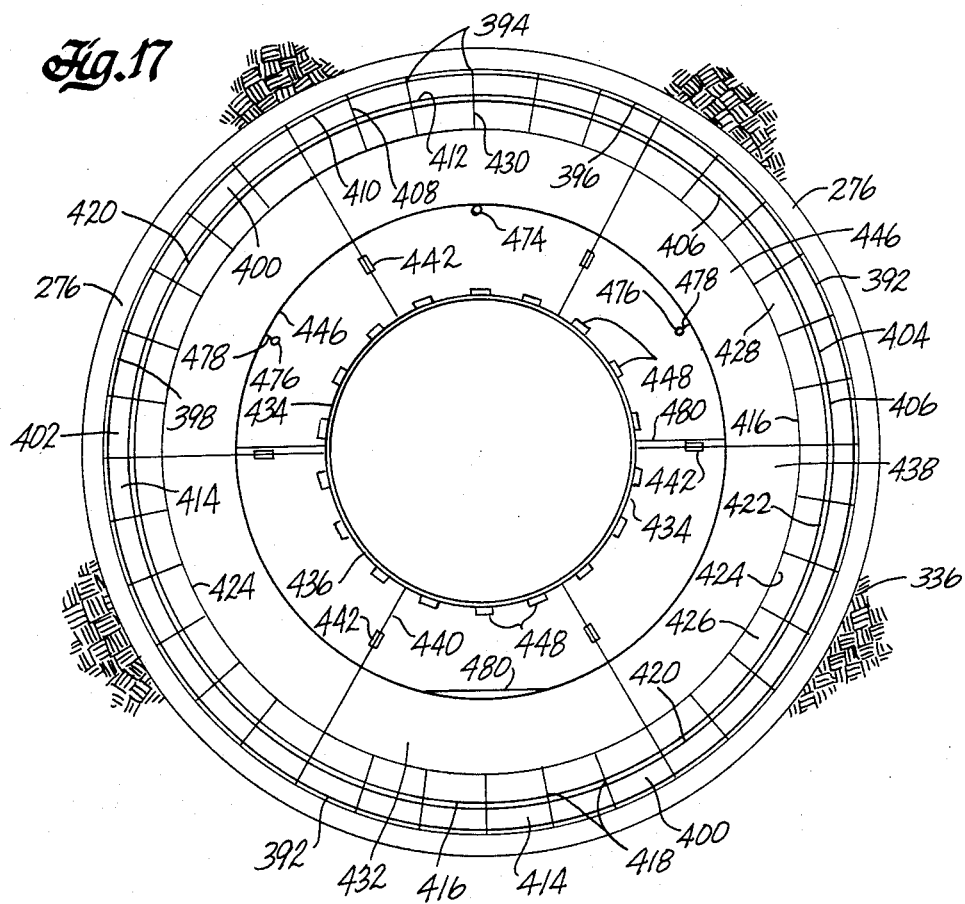
Fig. 17
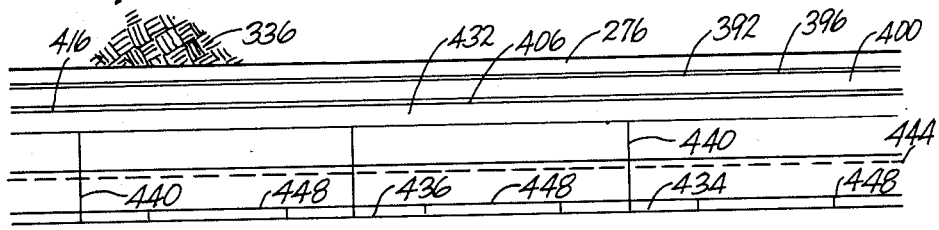
Fig. 18
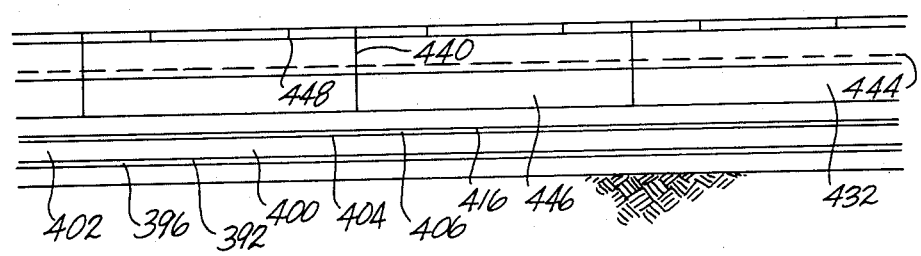

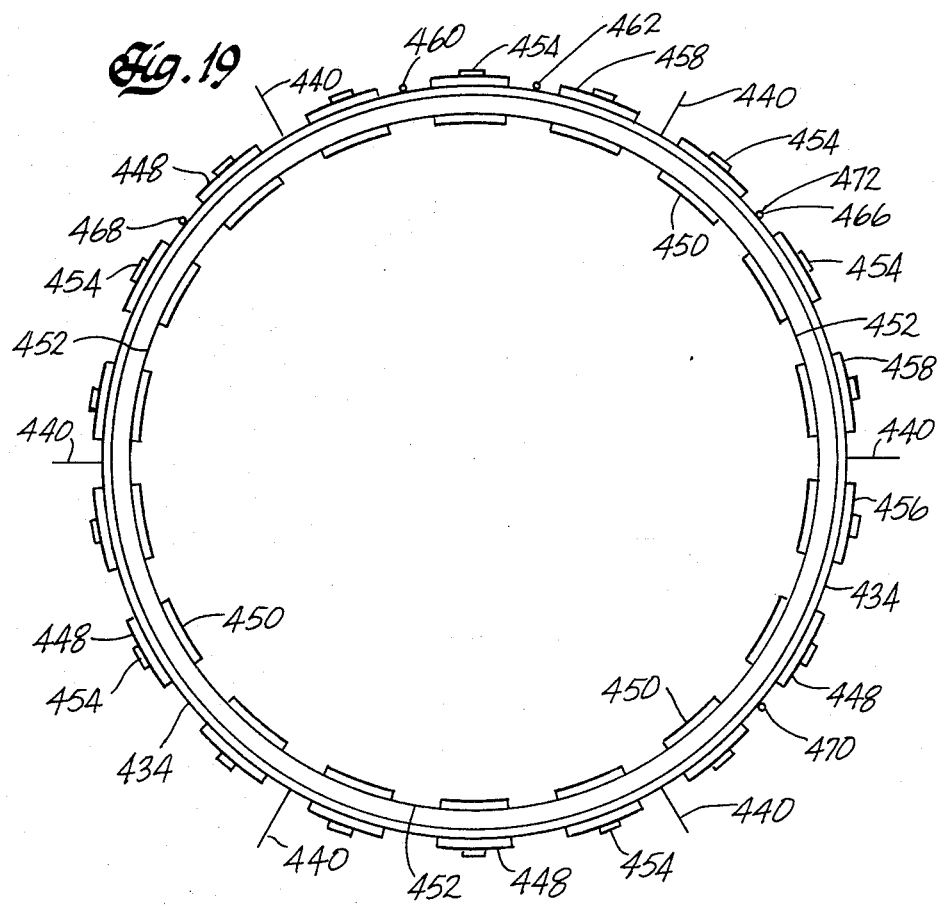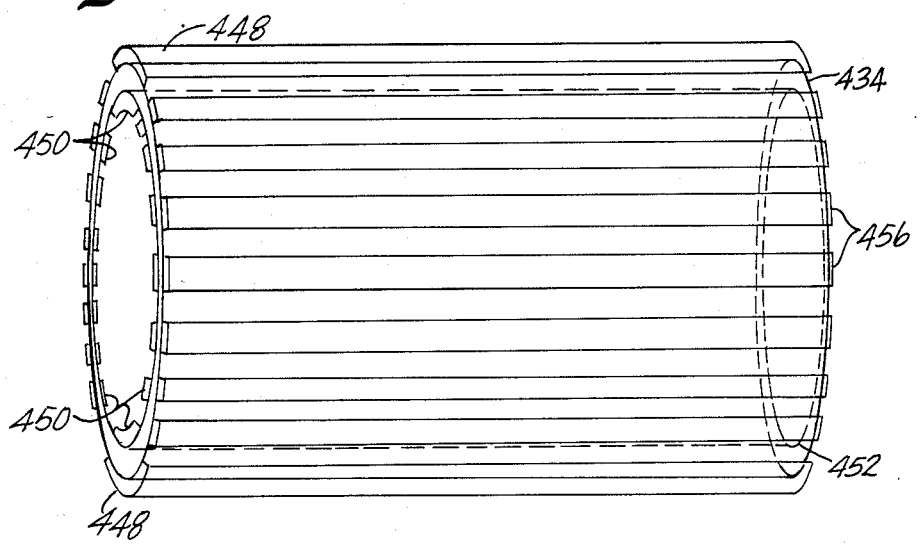

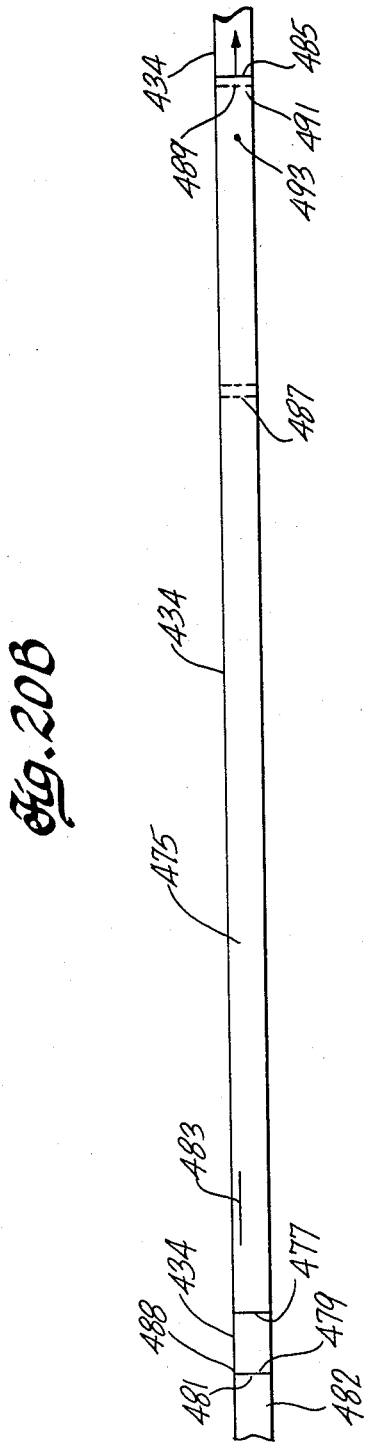

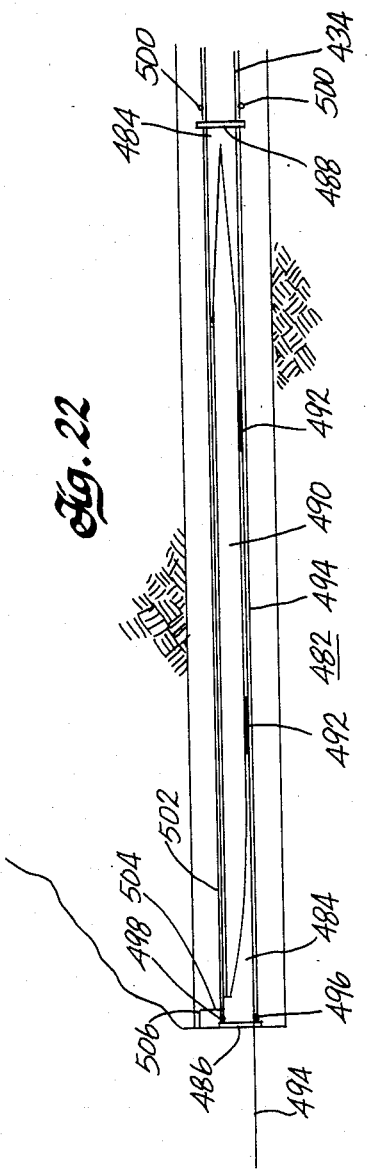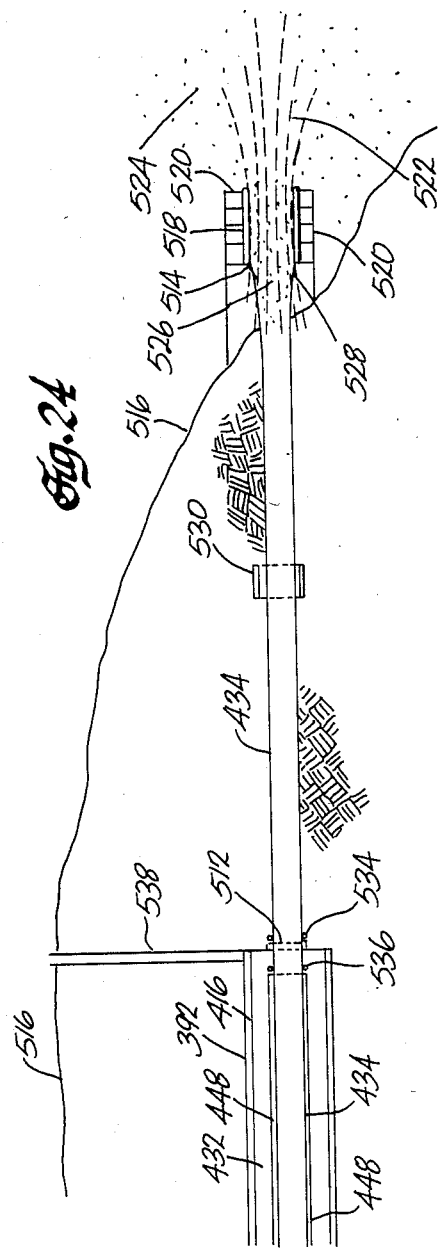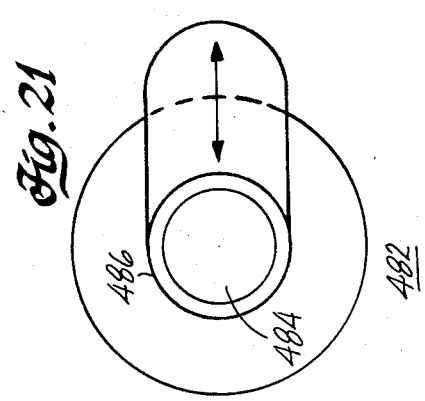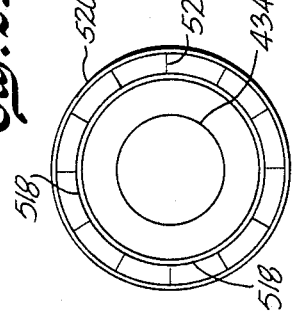

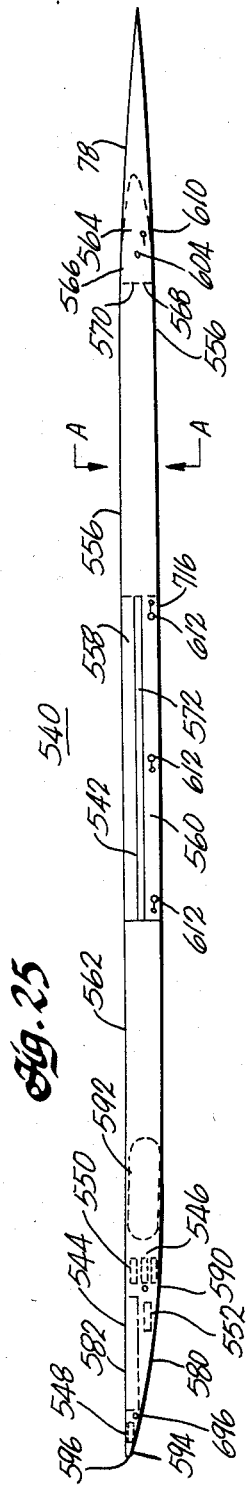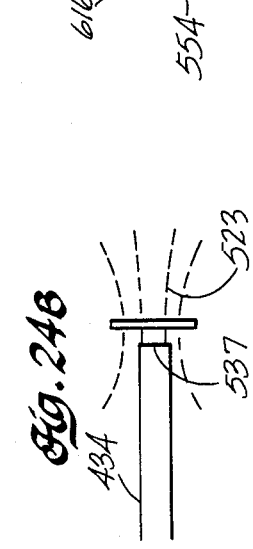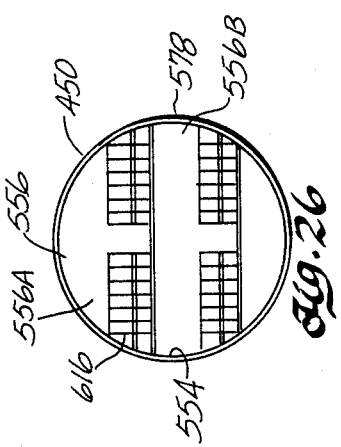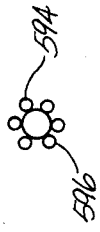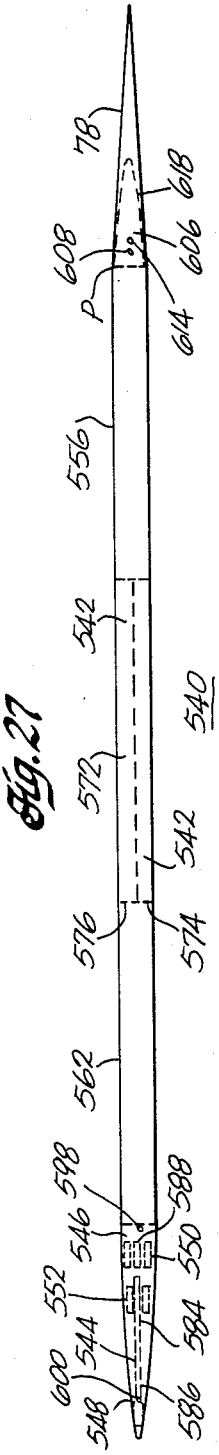

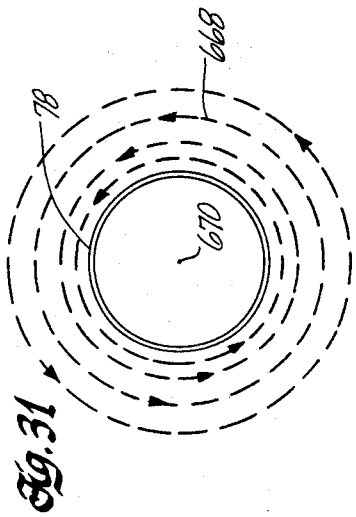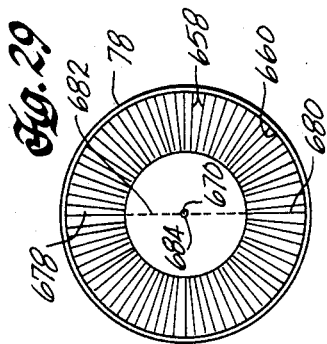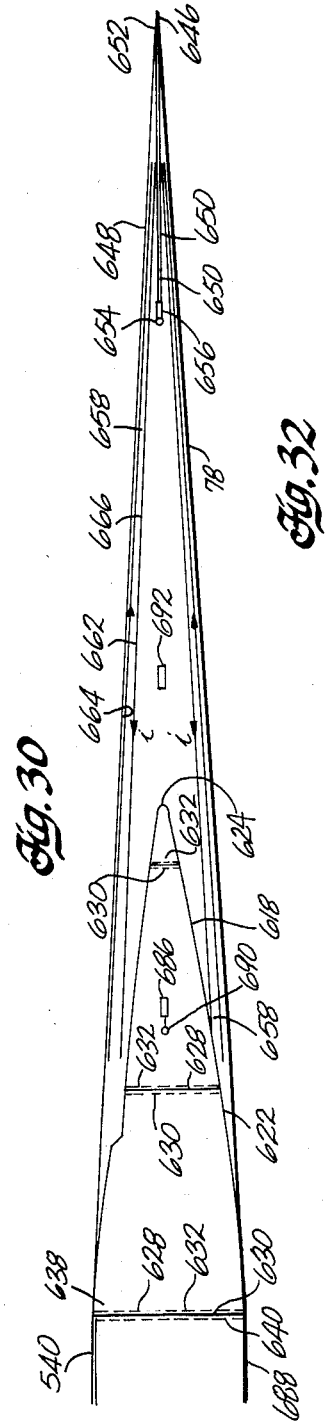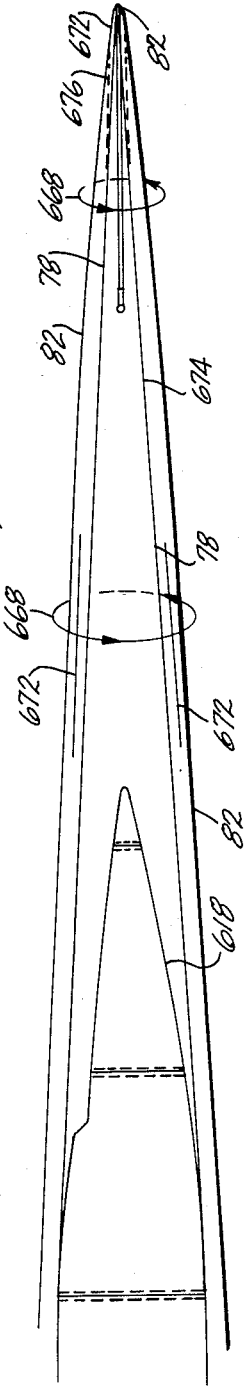

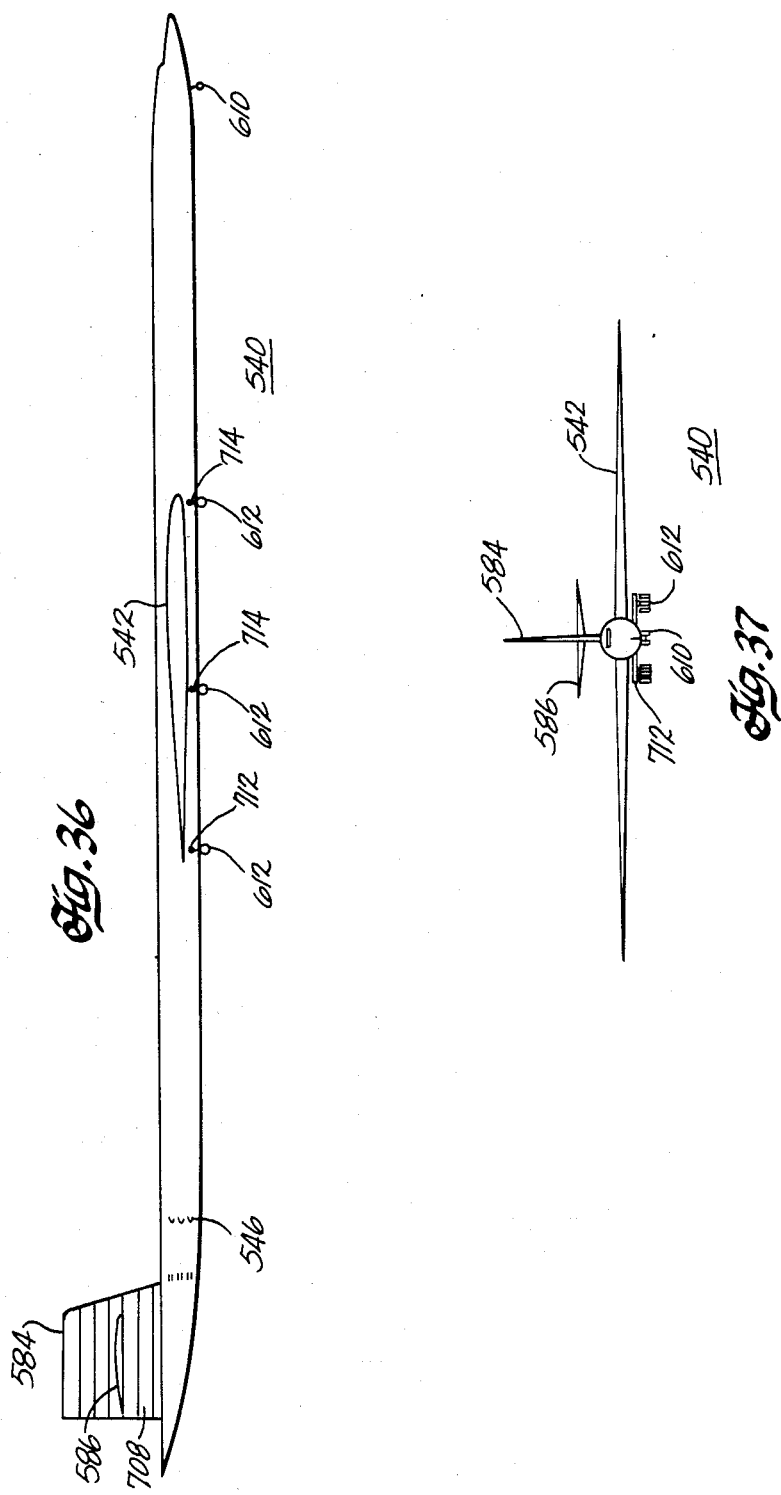

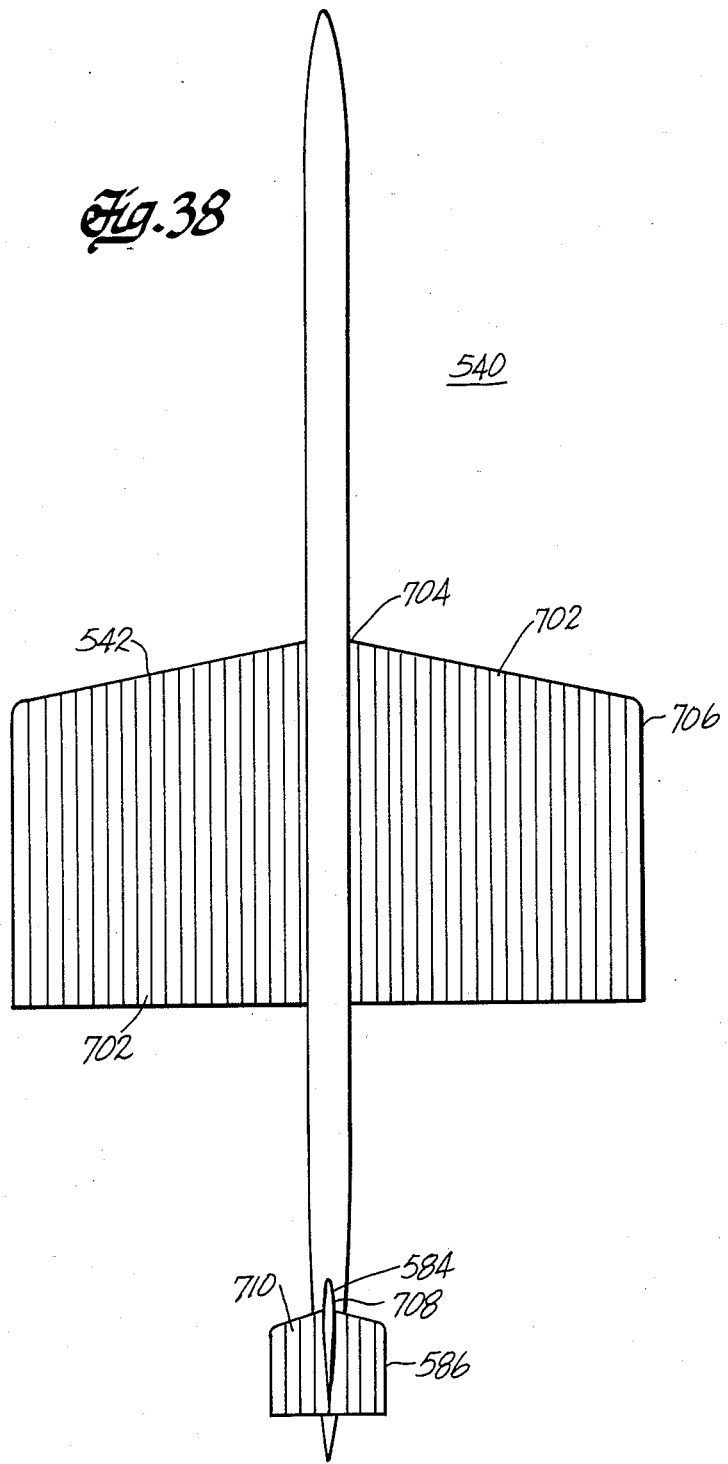

ELECTROMAGNETIC TRANSPORTATION SYSTEM FOR MANNED SPACE TRAVEL

CROSS-REFERENCE TO RELATED APPLICATION

This is a continuation-in-part of my U.S. patent application, Ser. No. 6/577,592 filed Feb. 6, 1984, entitled "Electromagnetic Transportation System for Manned Space Travel," now abandoned.

BACKGROUND

The last frontier where mankind can explore, utilize and eventually colonize is outer space. The deciding factor that will determine how fast and to what extent the United States will advance into and develop this new frontier ultimately depends upon how expensive it is to get there. The reusable ground to orbit shuttle vehicle represents a considerable advance toward developing an economical space transportation system. Before this system was developed, the launch vehicles were expendable. Consequently, the cost of transporting passengers and/or bulk cargo to Earth orbit and beyond with those first generation launch vehicles was enormous. The economical impact of using reusable launch vehicles, such as the U.S. Space Shuttle, represented a fundamental breakthrough in reducing the cost of transporting payloads to Earth orbit.

Although designs are currently being advanced to develop more economical reusable ground to orbit space shuttles, there is one fundamental problem that appears to be insolvable. This problem can be called the "initial mass problem" and is inherent in all space vehicles propelled by chemical rocket engines. This problem can best be described by considering the well known "rocket equation" (1).

$$M_1/M_2 = \exp(\Delta V/c) \qquad (1)$$

In this equation $M_1$ and $M_2$ represent a rocket vehicle's total mass before and after burning its engine to achieve a velocity change denoted by $\Delta V$. The engine's exhaust velocity is denoted by c. The ratio of initial mass to final mass represented by $M_1/M_2$ is called the "mass ratio". Thus, the amount of fuel $M_f$ required to achieve a velocity change $\Delta V$ is given by $M_f = M_1 - M_2$. The initial mass $M_1$ can be calculated by multiplying the mass ratio by the vehicle's final mass $M_2$. Consequently, in order to keep the vehicle's initial mass $M_1$ (and required fuel load $M_f$) as low as possible, the mass ratio should be kept as low as possible. For any given $\Delta V$, it follows from equation (1) that the mass ratio can be reduced only by increasing the exhaust velocity c. Unfortunately, chemical rocket engines have a definite upper limit on c that cannot be exceeded because of fundamental thermodynamics. This upper limit is about 4.50 km/sec. Since the minimum $\Delta V$ required to reach low Earth orbit when aerodynamic drag and gravity losses are taken into consideration is about 9.00 km/sec the lowest possible mass ratio corresponding to this $\Delta V$ for single stage launch vehicles is 7.39.

In order to illustrate the effect of the initial mass problem suppose that the final "dry mass" $M_2$ of a single stage ground to orbit chemically propelled launch vehicle is 100,000 kg. Since the minimum mass ratio required to achieve Earth orbit is 7.39, the minimum required initial mass $M_1$ would have to be 739,000 kg and the required fuel load would be 639,000 kg. Construction experience has shown that the minimum structural mass required for a cryogenic fuel tank is about 10% of the maximum fuel load. Thus, the mass of the fuel tank alone would be about 63,900 kg. This only leaves about 36,100 kg for the remaining structural mass of the vehicle including the payload. These calculations clearly illustrate that it requires a truly enormous launch vehicle, with an enormous fuel load, to orbit even a relatively low mass payload. (The initial mass of the U.S. Space Shuttle is over 2,222,000 kg but the maximum payload is only 30,000 kg.) This is the initial mass problem inherent in all rocket vehicles propelled by chemical rocket engines. Of course, staging does alleviate this problem but when completely reusable launch vehicle designs are contemplated, staging does not offer any significant advantage in terms of reducing overall operational costs. (The U.S. Space Shuttle is considered to be a one and one-half stage vehicle.)

Engineers have studied the initial mass problem for many decades. Since the crux of the problem involves the inherently low exhaust velocities of chemical rocket engines, attempts have been made to develop entirely new engines. But the problem is not simply to develop an engine capable of generating higher exhaust velocities. The engines suitable for launch vehicles must be capable of generating very high thrust to mass ratios. For example, the total thrust developed by a launch vehicle that is launched in the conventional vertical attitude must obviously be greater than the total initial weight of the vehicle if it is to climb off the launch pad.

Ion engines have very high exhaust velocities but have absolute upper bounds on their thrust to mass ratios which are small fractions of unity. Thus, they are totally unsuitable for launch vehicles. Nuclear rocket engines are capable of generating fairly high thrust to mass ratios but the danger of accidentally spraying a highly radioactive exhaust stream over large portions of the Earth's surface render such engines totally impractical. Actually, the nuclear reactors required for these high power engines have inherently high dead inertial mass so that their overall performance is quite limited. But even if there were no possibility of accidents, such engines used aboard manned vehicles would require large amounts of radiation shielding to protect the passengers. This would substantially increase the vehicle's dead inertial mass. Thus, nuclear propelled launch vehicles for manned space travel really do not offer any significant performance advantage.

Other, more exotic rocket engines, have been proposed such as microwave and laser propelled rocket engines. In these engines, a high power microwave or laser beam is directed at the launch vehicle which is captured and focused onto a suitable working fluid such as hydrogen. The working fluid is thereby heated to very high temperatures and expelled out of a conventional rocket nozzle with exhaust velocities significantly higher than those obtainable with chemical rocket engines. (See for example, the papers: "Microwave Rocket Concept," *International Astronautical Congress,* Vol. 16, Athens, 1965, pp. 175-199 by J. L. Schad and J. J. Moriarty; and "NASA's Laser Propulsion Project," *Astronautics & Aeronautics,* Sept. 1982, pp. 66-73 by L. W. Jones and D. R. Keefer.) Unfortunately, all of these attempts at circumventing the initial mass problem have failed by a wide margin. Thus, it is now believed that single stage, reusable shuttle vehicles propelled by chemical rocket engines will be the most economical transportation system for launching manned vehicles to low Earth orbit (See, "The Future Space Transportation Systems Study," *Astronautics & Aeronautics,* June 1983.)

If chemical rocket engines are to be used in any extensive ground-to-orbit space transportation system, there is another important problem to be considered besides the initial mass problem. This problem concerns environmental pollution. If the only practical method available for leaving the Earth's surface on journeys into outer space is at the expense of discharging thousands tons of combustion products into the biosphere, the ability of the biosphere to absorb this pollution will eventually set an upper limit on the rate at which mankind can travel there.

Although microwave and laser propelled launch vehicles were found to be technically impractical for launching manned space vehicles, they had one common and very important characteristic: the energy generating mechanism used to accelerate the vehicle is located off the vehicle. Thus, the amount of energy that can be used to accelerate the vehicle is unlimited. Moreover, since the energy generating source is physically removed from the vehicle, the vehicle is not burdened by having to accelerate its inertial mass. In principle, the combination of these two operating characteristics has the potential of giving a "telepropelled" vehicle very high performance. Unfortunately, the underlying physical principle used to accelerate these microwave and laser propelled launch vehicles was still based upon Newton's third law of motion and therefore still required the expulsion of large quantities of heated exhaust gases through a rocket nozzle at very high velocity. Thus, in this respect, the microwave and laser propelled launch vehicles were still classical rocket propelled vehicles. Although these vehicles were no longer burdened by having to carry the energy generating source, they were still burdened by having to carry a substantial fuel load for the rocket engines. The underlying physical principle used to generate vehicle thrust was still based on Newton's third law of motion.

The manned Earth to orbit transportation system disclosed herein differs fundamentally from all those of the prior art in that the vehicle thrust forces are not generated by expelling exhaust gases at high velocity out of an exhaust nozzle and applying Newton's third law of motion. Rather, it is based on the principle of electromagnetic propulsion. It, therefore, represents the ultimate and final step in designing the most powerful and economical method for propelling launch vehicles—the complete removal of not only the energy generating source from the vehicle, but also the thrust generating source as well, thereby enabling the thrust forces propelling the vehicle to be essentially unlimited without having to expel any reactive mass whatsoever. Thus, the initial mass problem and the pollution problem are both completely circumvented while enabling the vehicle performance to be virtually unlimited.

In the prior art of Earth to orbit transportation systems it was long recognized that if the required payloads were relatively small and on the order of 100 kg and if there were essentially no acceleration limits that could be exerted on them, the launching system could be a relatively simple catapult whereby the required orbital velocities are reached before the payload leaves the catapult. Since an ordinary gun or cannon is essentially a device for accelerating bodies to very high velocities, it was pointed out over two centuries ago by Isaac Newton in his *Principia* that a cannon could, in principle, be used as a catapult to launch an object into Earth orbit. A cannon accelerator could obviously be reusable and would therefore represent a very economical means for transporting small payloads to Earth orbit. (See for example, the article "Shells Into Orbit," *Machine Design,* Jan. 7, 1965, pp. 115-117.) It is interesting to note that this cannon fired launching method was also used by Jules Verne in his famous novel, *From the Earth to the Moon.* Verne's travelers were placed inside a hollow projectile, and then fired toward the moon at seven miles a second from the mouth of a huge cannon. Unfortunately, the human passengers would have never survived the enormous acceleration loads.

There is another catapult method that can be used to accelerate bodies to high velocities. This method involves the use of magnetic forces. The basic principle was recognized over 100 years ago by Michael Faraday. These accelerators have become known by various names, the most popular of which are: "electromagnetic guns," "electromagnetic launchers," and "mass drivers." Various types of electromagnetic accelerators have been built, tested and patented since the early 1900s. (See, "An Electrical Runway," *The Engineer,* Vol. 182, Oct. 25, 1946, pp. 379-370; "Theory of an Electromagnetic Mass Accelerator for Achieving Hypervelocities," Langley Research Center, June 1961 by K. Thom and J. Norwood; and "Magnetic Levitation and Propulsion, 1975," *IEEE Transactions on Magnetics,* Vol. MAG-11, July 1975, pp. 981-995.)

Recently published papers appearing in the literature propose using electromagnetic accelerators for catapulting low mass projectiles directly from the Earth's surface into orbit and beyond. (See, for example, "Electromagnetic Railgun Launchers: Direct Launch Feasibility," *AIAA Journal,* Vol. 20, No. 7, 1982, pp. 978-985 by R. S. Hawke et al; and "Ablation and Deceleration of Mass Driver-Launched Projectiles for Space Disposal of Nuclear Wastes," AIAA Paper No. 81-0355, AIAA 19th Aerospace Sciences Meeting, St. Louis, Mo. Jan. 12-15, 1981 by C. Park and S. W. Bowen.)

All of the prior art electromagnetic accelerators designed for launching payloads directly into Earth orbit have one common characteristic—very high acceleration. Thus, the payloads are inherently small and are, in fact, called "projectiles". When one contemplates using electromagnetic accelerators for catapulting manned space vehicles directly into orbit from the Earth's surface, the technical problems appear to be insurmountable. Consequently, when such launching systems are described in various publications, the publications are usually science fiction. The main reason for this situation involves acceleration.

One of the major considerations involved in the design of manned launch vehicles is acceleration. If ordinary human passengers are to have access to outer space, the acceleration loads should not exceed approximately 6g's. If this constraint were placed on the design of electromagnetic accelerators, the required length would be enormous. This length can be determined by the well known equation $$V = \sqrt{2as} \qquad (2)$$

that gives the terminal velocity V of a body moving with uniform acceleration a over distance s. Hence, by substituting V=9000 m/sec and a=6g=58.8 m/sec², it follows that s=V²/(2a)=689 km. Constructing a perfectly straight electromagnetic accelerator this long on the Earth's surface is impossible because of the Earth's curvature. A tunnel would have to be excavated deep underground to a depth of about 8,500 m (27,887 ft.). Unfortunately, it is completely impossible to excavate a large diameter tunnel underground to this depth utilizing prior art tunneling machines or methods.

However, there are other problem that appears to be fundamentally impossible to circumvent. Since atmospheric drag would prevent the accelerator from accelerating a vehicle beyond a certain velocity (well below 9 km/sec) if the vehicle were exposed to the open atmosphere, the entire accelerator would have to be completely enclosed within a giant vacuum tube over 689 km long with a pressure not exceeding $10^{-6}$ torr. This introduces two new fundamental problems that have no solutions in the prior art. It is physically impossible to create a vacuum of $10^{-6}$ torr by mechanical pumping. A vacuum this high (which is equivalent to that found in large space simulation chambers) can only be created with very exotic pumps such as "diffusion pumps" or "cryogenic pumps". These pumps are very large relative to the volume evacuated, they require long pumping times (that can be several days for large chambers) and consume large amounts of energy. Thus, the possibility of achieving a vacuum of $10^{-6}$ torr inside a tube with a diameter of several meters and a length exceeding 689 km mounted inside an underground tunnel is a practical impossibility. Furthermore, even if such a vacuum could be created inside the tube, there would still be the problem of designing a vacuum seal for the end of the tube that would allow a vehicle moving at 9 km/sec to pass through it, into the outside atmosphere, without being destroyed in the process.

When large electromagnetic accelerators for space transportation are described in the scientific literature, they are usually sited on other celestial bodies without atmospheres such as the Moon where atmospheric drag is zero. See, "Electromagnetic Mass Drivers," *Progress in Astronautics and Aeronautics*, Vol. 57, 1977, pp. 37–61 by F. Chilton et al. and "the Colonization of Space," *Physics Today*, Vol. 27, Sept. 1974, pp. 32–40 by G. O'Neill. The "impossiblity" of launching manned vehicles directly into Earth orbit by an electromagnetic catapult was pointed out by Arthur C. Clarke in his publication "Electromagnetic Launching As A Major Contribution To Space-Flight," *Journal of the British Interplanetary Society*, Vol. 9, No. 6, Nov. 1950, pp. 261–267.

Prior art electromagnetic accelerators solve the problem of atmospheric drag by sealing off the end of the accelerator tube with a thin diaphragm and evacuating the entire tube prior to actual launch. The projectile breaks through the diaphragm at the end of each launch and, unfortunately, the air reenters the tube destroying the vacuum. A new diaphragm is mounted across the end of the tube and the tube is re-evacuated before the next launch. (See, for example, "Electro Magnetic Propulsion Alternatives," paper presented at the 1979 Princeton Symposium on Space Manufacturing, Princeton, N.J., May 1979 by H. Kolm et al.) Since the diameters and lengths of prior art electromagnetic accelerators are only a few centimeters and a few meters respectively, this solution is quite satisfactory. But the vacuum tube of an electromagnetic accelerator designed to launch manned vehicles would have to have an overall diameter of at least 6 m. The atmospheric pressure acting on a diaphragm with this diameter would be about 644,232 lbs. or 322 tons! In order to support this load, the physical mass of the "diaphragm" would have to be at least 100 kg. Such a mass would completely destroy a vehicle striking it at orbital velocities.

Finally, even it were possible to evacuate a large diameter tube with a length of hundreds of kilometers to a pressure not exceeding $10^{-6}$ torr equipped with a vacuum seal mounted on the end that allows a vehicle to pass through it, into the outside atmosphere with a velocity of 9 km/sec without being destroyed, there would still remain the most difficult problem of all, the thermal barrier. Since the accelerator is several hundred kilometers long, the vehicle would be forced to enter the atmosphere with a very low climb angle that is almost tangent to the Earth's surface. For example, if the accelerator is 689 km long, the climb angle would only be about 3°. Consequently, the vehicle would be catapulted out the end of the accelerator at a relatively low altitude, with a climb angle of only 3°, and plung directly into the dense lower levels of the atmosphere at 9 km/sec. Thus, the vehicle would be rammed into a 35,000° K "thermal barrier" at hypervelocity that would cause it to disintegrate long before it could climb out of the atmosphere.

Since each of these problems are considered to be fundamentally insurmountable in their own right, the possibility of catapulting a manned space vehicle from the surface of the Earth directly into orbit solely by means of an electromagnetic accelerator is believed to be a physical impossibility—not a near term impossibility, but an impossibility for the distant future as well.

However, I believe that I have developed practical solutions for each of these problems that are well within current engineering feasibility. I have brought these solutions together to construct not only an electromagnetic accelerator for launching manned space vehicles directly into orbit, but a comprehensive, reusable, electromagnetically propelled space transportation system capable of providing direct transportation between the Earth's surface, the Moon, and even interplanetary space. Moreover, the system is designed such that all of the electrical energy used to operate the accelerator is supplied free of charge by utilizing the very object that all launch vehicles are designed to overcome—the Earth's gravitational field. In fact, the proposed system was invented as a result of viewing the Earth's gravitational field as a powerful ally, rather than as a harsh enemy that must be conquered by applying the traditional brute force techniques of building more powerful rocket engines for propelling more massive launch vehicles. By adopting this underlying design methodology, nature herself can give mankind essentially unlimited launch capability for leaving the Earth's surface and traveling into the new frontier of outer space on an unprecedented scale, on a scale previously believed to be possible only in the realm of science fiction.

BRIEF SUMMARY OF THE INVENTION

With the foregoing in mind the present invention provides an electromagnetically propelled space transportation system for transporting passengers and/or freight between the Earth's surface and orbiting spaceports via reusable spaceplanes. Each spaceplane is equipped with a plurality of superconducting propulsion coils extending along its fuselage and is accelerated to orbital velocities inside a vacuum tube by a 1,530 km long electromagnetic linear acclerator. The vehicle coils provide noncontacting vehicle propulsion, guidance and levitation via magnetic forces without consuming any energy on-board the vehicle. The spaceplane is accelerated by magnetic forces generated by the electromagnetic driving coils of a plurality of linear synchronous motors operating in parallel and mounted around the external circumferential periphery of the vacuum tube. These driving coils are pulsed sequentially so as to form a group of traveling sine waves synchronized to move along the tube with the vehicle and provide a precisely controlled driving thrust by interacting magnetically with the passive superconducting propulsion coils mounted on the vehicle in parallel rows around its circumferential periphery. The electrical energy used to energize the driving coils is stored inside a bank of thick cylindrical capacitors extending 360° around the entire 1,530 km long vacuum tube. Computer controlled electrical switching circuits connected to vehicle position sensors automatically connect and disconnect the various capacitors to the driving coils so as to form a parallel group of moving magnetic fields synchronized to move in precise relationship with the vehicle coils so as to provide essentially continuous propulsive thrust, lift, and guidance simultaneously.

The launch vehicle is designed as a reusable spaceplane with movable wings and other movable aerodynamic surfaces that are retracted during launching and extended during landing. The vehicle's overall length is 270 m (886 ft.) including a detachable hypervelocity nose cone that is jettisoned before landing, and has a maximum diameter of 6 m (19.69 ft.). The typical gross launch mass is 2,500,000 kg. The spaceplane is equipped with a relatively small on-board rocket propulsion system for carrying out various orbital maneuvers such as orbit circularization after launch, orbital plane changing maneuvers, and for providing a relatively small retro thrust for returning to Earth. The electromagnetic accelerator is capable of launching the spaceplane directly to geosynchronous orbit with a useful deliverable payload of 300,000 kg. It is also capable of launching the spaceplane directly onto interplanetary trajectories with hyperbolic excess velocities on the order of 8.50 km/sec.

A graphite nose plug is mounted at the tip of the nose cone such that when the spaceplane is catapulted out of the accelerator and into the open atmosphere, an intense bow shock is generated. This bow shock is composed of hot gases and is completely ionized. By mounting a plurality of superconducting coils along the inside lateral walls of the nose cone, it is possible to envelop the entire external surface of the nose cone within an axial magnetic field. This magnetic field will interact with the ionized shock wave such that the shock wave is deflected radially outward away from the nose cone and spaceplane. This method of deflecting the shock wave by magnetic forces allows the spaceplane to pass through the atmosphere essentially without any speed or time limitations. It enables the spaceplane to penetrate completely through the thermal barrier with impunity.

The spaceplane reenters the Earth's atmosphere nose first with a shallow almost tangential, reentry angle and is decelerated primarily by the magnetic deflector coils. The spaceplane is further decelerated by deploying a small parachute system. The movable wings and tail surfaces are deployed only after reentry is completed and when the vehicle has slowed to about Mach 1.0 at an altitude of about 30,000 m (98,425 ft.). After the wings and tail surfaces are deployed, the nose cone is jettisoned and is recovered by a parachute recovery system.

The spaceplane is also equipped with six internal air-breathing jet engines which are turned on after the nose cone is jettisoned. These jet engines give the spaceplane a sustained, powered flight capability. A landing field is provided near the beginning of the electromagnetic accelerator where the spaceplane is landed, under power, like a commercial airliner. After landing, the spaceplane is refurbished, reloaded, refitted with another nose cone and catapulted back into space with a relatively short turn-around time.

The electromagnetic accelerator can be controlled to catapult a spaceplane with a launch velocity that can vary over a wide range, essentially independent of vehicle mass. This allows the spaceplane to be used for a wide variety of missions ranging from trips to low Earth orbit, to round trip interplanetary missions to other celestial bodies. In order to take full advantage of this launcher capability, an extremely long accelerator design was selected (1,530 km) to reduce the acceleration loads required for high energy missions. This operating flexibility allows the accelerator to be used for accelerating relatively small, specially designed, unmanned vehicles with very high accelerations (e.g. exceeding 50 g) for carrying out extremely fast unmanned interplanetary missions to many destinations throughout the entire solar system.

One of the most important design features of the electromagnetic accelerator is the tube evacuation system. This system is critical because the required vacuum must be on the order of $10^{-6}$ torr. Since the tube is over 1,530 km long the possibility of attaining this degree of vacuum inside the tube (which is installed in an underground tunnel) by prior art pumping methods over a reasonable time period has been a practical impossibility. The solution to this problem was found by utilizing the accelerator itself as a giant vacuum pump. In particular, a specially designed, giant free-moving air-tight piston, with an outside diameter equal to the inside diameter of the accelerating tube having flat transverse faces is constructed and designed to move through the entire tube driven by the powerful magnetic forces of the accelerator's drive coils. Since the tube is straight, this "evacuation piston" can be very long (e.g., 200 m or more) with thousands of superconducting propulsion coils (similar to those mounted on the spaceplane) to provide an enormous driving force. After the piston is inserted into the tube, a flat air-tight door directly behind it is closed. The contacting surface area between the lateral walls of the sliding piston and the inside walls of the tube is very great such that the piston provides a moving barrier that is absolutely air-tight. The piston is initially positioned with its flat rear face flush up against the flat forward face of the door. The evacuation process begins by moving the piston from its initial position, through the tube, thereby forcing out the air through the other end which is temporarily left open to the outside atmosphere. The piston can be driven completely through the tube in about 24 hours.

Another air-tight door with a flat face, is mounted near the end of the tube. This door is closed when the forward face of the piston is flush against it, thereby sealing the tube and preserving the vacuum inside it. The piston is then driven back through the tube to the entrance and withdrawn through an air-lock. This tube evacuation process is extremely simple and will be capable of producing a vacuum well below the required $10^{-6}$ torr.

The problem of sealing the vacuum tube with a vacuum seal that allows a vehicle to pass through it without being destroyed is solved by creating an axial magnetic field at the end of the tube and sealing it with a very thin diaphragm having a high magnetic susceptibility such that the inward atmospheric pressure force is exactly balanced by an outward magnetic force created by the magnetic field. A fast acting airtight pressure door mounted inside the tube several hundred meters from the end is closed immediately after a vehicle passes it, which prevents the air from entering the accelerating tube after the vehicle breaks through the diaphragm. This door is opened just prior to the next launch after a new diaphragm is mounted and after the relatively small portion of the tube between the diaphragm and the door is re-evacuated.

Since the Earth's surface is curved, the construction of a perfectly straight 1,530 km long electromagnetic linear accelerator will require tunneling deep into the Earth to a depth of about 46 km. This depth is many times deeper than any previous tunnel. The maximum rock temperature will be 800° C. to 1,100° C. (1,472° F. to 2,012° F.) and the maximum rock pressure will be about 0.015 mb (225,000 lbs./in$^2$). Unfortunately, it is impossible to excavate a large diameter tunnel to this depth using prior art tunneling methods and machines. Therefore, the present application also includes a detailed disclosure of a new deep Earth tunneling method and machine that is specifically designed to carry out this excavation. The machine is capable of penetrating completely through the Earth's crust and into the upper mantle to almost any depth provided the surrounding rock is reasonably solid and free of bodies of molten magnet. The disclosure of this deep Earth tunnel boring machine is considered to be an important part of the basic application.

The tunnel path is designed such that the end penetrates the Earth's surface near the summit of a high mountain, and the beginning is at sea level. A system of two, annular, co-axial, high pressure water conduits, are mounted around the accelerator corridor. The outer conduit faces the rock walls and is designed to heat the water flowing through it by absorbing substantial amounts of geothermal energy from the surrounding rock. The inner conduit, which surrounds the accelerator corridor, serves as a cooling system. A network of interconnecting reservoirs is constructed near the summit of the mountain to collect melted snow and feed it into both conduits. Since there is a substantial gravitational potential difference between the beginning of the tunnel at sea level, and the end of the tunnel high in the mountains, the water flowing through both conduits can be used to convert this gravitational potential diffence into electrical energy. This is accomplished by feeding the water through a system of hydroelectric turbine generators. The electrical energy obtained therefrom is more than enough to power the electromagnetic accelerator. Consequently, all of the electrical energy used to launch the space vehicles is obtained free-of-charge by utilizing the Earth's gravitational field. Therefore the system is, in reality, a gravity powered transportation system wherein the electromagnetic accelerator converts the gravitational energy (obtained from the hydroelectric turbine generators) into propulsive energy for launching the space vehicles. A substantial amount of additional electrical energy is obtained by also feeding the hot water into a geothermal electric generating plant. The total amount of electric power generated from the hydroelectric and geothermal power plants exceeds 270 GW.

DRAWINGS

These and other advantages and features of the invention will be apparent from the disclosure, which includes the specification with the foregoing and ongoing description, the claims, and the accompanying drawings wherein:

FIG. 5 is a schematic longitudinal cross section illustrating the design and construction of the forward portion of a deep Earth gravity powered hydraulic tunnel boring machine;

FIG. 6 is a schematic longitudinal cross section of one of one of the hydraulic rock cutting systems;

FIG. 7 is a schematic transverse cross section of one of the hydraulic rock cutting systems;

FIG. 8 is a schematic longitudinal horizontal cross section through the forward portion of the hydraulic deep Earth tunnel boring machine further illustrating the design and construction of the high pressure water inlet and slurry discharge conduits;

FIG. 9 is a schematic transverse cross section through the forward portion of the tunnel boring machine further illustrating the design and constrution of the hydraulic drilling cone rotating inside the protective pressure shield;

FIG. 10 is a schematic longitudinal cross section illustrating the design and construction of the rear portion of the hydraulic deep Earth tunnel boring machine;

FIG. 11 is a schematic transverse cross section through the rear portion of the boring machine;

FIG. 12 is a schematic transverse cross section through the main body of the boring machine illustrating the design and construction of the hydraulic molten glass injection system used in construcitng the high pressure tunnel liner;

FIG. 13 is a schematic transverse cross section through the main body of the boring machine illustrating the design and construction of the main pressure hull and the high pressure water cooling system;

FIG. 14 is a schematic longitudinal cross section through a portion of the main body of the boring machine further illustrating the design and construction of the main pressure hull and the high pressure water cooling system;

FIG. 15 is a schematic transverse cross section through the tunnel during the escavation illustrating the glass tunnel liner and the moving support structure that is connected to the rear of the boring machine;

FIG. 17 is a schematic transverse cross section through the completed tunnel illustrating the annular hot and cold water conduits and the electromagnetic accelerator;

FIG. 18 is a schematic longitudinal cross section through the completed tunnel illustrating the annular hot and cold water conduits and the eletromagnetic accelerator;

FIG. 19 is a schematic transverse cross section through the vacuum tube illustrating the driving coils of the electromagnetic accelerator mounted in rows around the external circumferential periphery of the vacuum tube and opposite the superconducting propulsion coils of the spaceplane that are mounted in rows around the circumferential periphery of the spaceplane's fuselage;

FIG. 20 is a perspective longitudinal view illustrating the rows of the electromagnetic driving coils opposite rows of the spaceplane's propulsion coils;

FIG. 21 illustrates the tube evacuation system wherein the accelerator is used to drive a large diameter free-moving air-tight piston equipped with superconducting magnetic propulsion coils, through the tube thereby forcing out air through one of its ends;

FIG. 22 is a schematic transverse cross section of the entrance air-lock to the electromagnetic linear accelerator and vacuum tube;

FIG. 23 is a schematic longitudinal cross section of the entrance air-lock to the electromagnetic accelerator and its vacuum tube;

FIG. 24 is a schematic longitudinal cross section illustrating the design and construction of a magnetic diaphragm mounted at the end of the accelerator's vacuum tube;

FIG. 25 is a schematic longitudinal cross section illustrating the design and construction of an electromagnetically propelled reusable spaceplane in its launch configuration with retracted wings, tail surfaces, jet engine ducts and landing gears;

FIG. 26 is a schematic transverse cross section through the line A—A of FIG. 25 illustrating the construction of the double deck passenger cabin of an electromagnetically propelled reusable spaceplane;

FIG. 27 is a schematic horizontal longitudinal cross section of an electromagnetically propelled spaceplane in its launch configuration illustrating the retracted wings, tail surfaces, jet engine ducts and landing gears;

FIG. 28 is a transverse cross section through the end of the spaceplane's fuselage illustrating the exhaust nozzle of the spaceplane's chemical rocket engine surrounded by the exhaust ducts of six electron cyclotron resonance plasma engines;

FIG. 29 is a schematic transverse cross section through the center of a detachable hypervelocity nose cone illustrating its design and construction;

FIG. 30 is a schematic longitudinal cross section through the vertical mid-plane of a detachable hypervelocity nose cone further illustrating its design and construction;

FIG. 31 is a transverse cross section through the center of a detachable hypervelocity nose cone illustrating the axial magnetic field lines generated by its internal superconducting shock wave deflector coils;

FIG. 32 is a longitudinal cross section through the vertical mid-plane of a detachable hypervelocity nose cone illustrating how the shock wave is deflected away from the nose cone by the magnetic field generated by the superconducting magnetic deflector coils;

FIG. 36 is a schematic longitudinal vertical view of an electromagnetically propelled reusable spaceplane returning from space in its landing con figuration with its wings, tail surfaces, jet engine ducts, and landing gears deployed after its.nose cone is jettisoned;

FIG. 37 is a transverse view of an electromagnetically propelled reusable spaceplane returning from space in its landing configuration;

FIG. 38 is a plan view of an electromagnetically propelled reusable spaceplane returning from space in its landing configuration;

DESCRIPTION OF THE PREFERRED EMBODIMENT

The purpose of the present invention is to provide an electromagnetically propelled transportation system that is capable of launching reusable manned space vehicles from the Earth's surface directly into orbit and beyond. The primary propulsion system is provided by an evacuated electromagnetic accelerator extending along a straight path embedded deep below the Earth's surface. In order to achieve the required launch velocities at the end of the accelerator without subjecting the passengers to intolerably high acceleration loads, the accelerator must be many hundreds of kilometers long. An electromagnetically propelled vehicle emerging from the end of the acelerator at orbital velocities, traverses through the atmosphere, and follows a ballistic trajectory to the desired orbit. A relatively small secondary on-board propulsion system utilizing conventional rocket engines is provided for circularizing the vehicle's trajectory in the desired orbit and for carrying out other orbital maneuvers such as plane changes. The vehicle is designed to be reusable in that it can be decelerated via atmospheric breaking and landed on a conventional landing field. Thus, the vehicle is equipped with movable wings and other aerodynamic control surfaces that are completely retracted during launching and extended during landing. The reusable space vehicles described in this transportation system will be referred to as electromagnetically propelled "spaceplanes".

Figure 1:
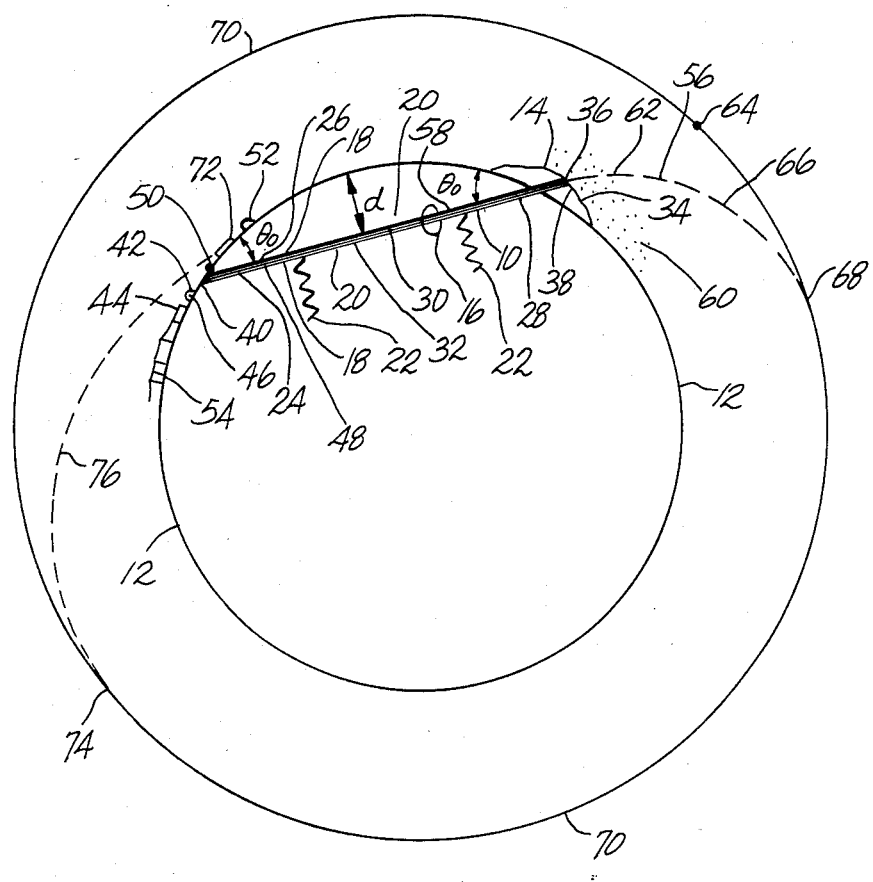
FIG. 1 is an exaggerated overall view of a 1,530 km long electromagnetic linear accelerator embedded deep underground and emerging near the summit of a high mountain.

FIG. 1 is an exaggerated overall view of an optically straight tunnel 10 penetrating deep into the Earth 12 beginning at sea level and ending near the summit of a high mountain 14. A system of two annular co-axial water conduits 16,18 are mounted inside the tunnel 10 adjacent each other and extend along entire reach of the tunnel 10. The outer conduit 16, faces the hot rock walls 20 and is designed to heat the water flowing through it by absorbing substantial amounts of natural geothermal energy 22 from the surrounding rock 20. The inner annular conduit 18 is mounted inside the cylindrical vacant region 24 of the hot water conduit 16 but is thermally insulated from it by a thick jacket of thermal insulation 26. The vacant region 28 inside the inner conduit 18 forms an optically straight central cylindrical corridor 30 which extends along the entire reach of the tunnel 10. The electromagnetic accelerator 32 is mounted inside this corridor 30. The inner annular conduit 18 completely surrounds the electromagnetic accelerator 32 and serves as a cold water cooling system for the accelerator 32.

A network of interconnecting reservoirs 34 is constructed near the end of the tunnel 10 high up in the mountains to collect melted snow and rain water. The water collected in this reservoir system is fed into the annular hot and cold water conduits 16,18 via a central feeder conduit 38. The conduits 16,18 carry the water all the way down from the end 36 of the tunnel 10, which is at a relatively high elevation, to the beginning 40 of the tunnel at sea level. Consequently, there is a significant gravitational potential difference between each end of the tunnel which appears in the form of water pressure. This gravitational potential difference is converted into electrical energy by feeding the water through a system of hydroelectric turbine generators 42 installed near the beginning of the tunnel 10. A substantial amount of additional electrical energy is generated by also harnessing the geothermal energy 22 absorbed by the hot water. This is accomplished by feeding the hot water into a geothermal electric generating plant 44 constructed near the hydroelectric generating plant 46.

The electrical energy generated from the hydroelectric turbine generators 42 is used to charge up a bank of high voltage sleeve capacitors 48 mounted adjacent the cylindrical inside walls of the cold water conduit 18. This capacitor bank 48 serves as the primary energy storage system for the electromagnetic accelerator and extends along its entire length.

Additional electrical energy is used to charge up a large superconducting inductive energy storage system 50 that is installed near the tunnel entrance 40. This superconducting system 50 is utilized as a secondary energy storage system for the electromagnetic accelerator 32 which can be released into the accelerator 32 for boosting the magnetic propulsive thrust to extremely high levels.

A cryogenic propellant manufacturing plant 52 is also constructed near the tunnel entrance 40 for manufacturing liquid oxygen and liquid hydrogen for the spaceplane's auxiliary propulsion system. All of the electrical energy used to operate this plant comes from the hydroelectric and geothermal electric generating plants 46,44.

All of the remaining excess electrical power generated by the hydroelectric and geothermal power plants 46,44 not used for launching space vehicles or manufacturing cryogenic propellants is fed into various electric power grids 54 and sold as commercial power to various utility companies. Thus, the proposed transportation system will not only generate all of the electrical energy needed to operate it, but a significant amount of additional electrical energy that is sold as excess power. Therefore, the system is also a large power generating complex for generating a vast amount of net electrical power that is fed into a world wide electric power grid. All of this electric power is clean, continuous and renewable. There is zero environmental pollution.

In view of the above operating principles, the system is a gravity powered space transportation system. Gravitational energy is converted into electrical energy, and this electrical energy is converted into propulsive energy by the electromagnetic accelerator. The net power output fed into the electric grid 54 is hydroelectric and geothermal.

The electromagnetic accelerator 32 accelerates the spaceplanes 56 inside a vacuum tube 58 in order to eliminate aerodynamic drag. Each spaceplane 56 is accelerated through the vacuum tube 58 by non-contacting magnetic forces generated by 18 independent linear synchronous motors with driving coils mounted along 18 parallel rows and extending around the outside circumferential walls of the vacuum tube 58 in 20° intervals. The electromagnetic driving coils of each motor are sequentially pulsed so as to form 18 localized magnetic waves moving in parallel 360° around the outside circumferential periphery of the launch tube 58 that is precisely controlled (via vehicle position sensors, switching circuits and control computers) to accelerate the spaceplane according to a precalculated acceleration profile. The spaceplane 56 is catapulted out of the end of the accelerator near the top of a high mountain 14 (which reduces atmospheric drag) and enters the open atmosphere 60 with a precalculated Mach number exceeding Mach 30. Since the elevation angle $\theta_o$ (relative to the local horizon) of the vehicle's trajectory leaving the accelerator 32 is relatively small, the spaceplane traverses through the atmosphere 60 along a shallow flight path 62.

Suppose that the destination of a particular spaceplane flight is to rendezvous with an orbiting spacestation (i.e., spaceport) 64 in low Earth orbit. After traversing through the atmosphere 60, the spaceplane 56 coasts along an elliptical free-fall ballistic trajectory 66 with an apogee 68 that intersects the desired orbit 70. When the spaceplane 56 passes through its apogee point, it fires its on-board rocket engine to circularize its trajectory to the desired orbit 70. This circularization $\Delta V$ maneuver is relatively small for inclined low Earth orbits and is on the order of about 50 m/sec. The timing of the launch and circularization maneuver is designed to place the spaceplane 56 very close to the spaceport when orbit insertion is completed. The actual rendezvous and docking is achieved by small thruster rockets.

After the passenger and/or cargo transfer is completed, the spaceplane 56 initiates a sequence of events which ends with the spaceplane 56 landing back at a landing field 72 next to the entrance to the accelerator. This sequence begin by decoupling from the orbiting spaceport 64 and applying relatively small retro propulsion at a certain point 74 designed to produce a shallow reentry trajectory 76 close to the landing field 72. When the spaceplane 56 begins to reenter the very thin upper regions of the upper atmosphere 60, it is decelerated by magnetic forces generated by a plurality of superconducting shock deflector coils mounted inside the nose cone. After the spaceplane is decelerated to about Mach 4, a Small parachute system Is deployed to further decelerate the spaceplane.

When the spaceplane is slowed to about Mach 1 at an altitude of about 30,000 m (98,425 ft.) the drag parachutes and the hypervelocity nose cone are jettisoned. After this is accomplished, the wings and tail surfaces are deployed. Six air-scoops and exhaust ducts are opened for operating six high thrust jet engines mounted inside the rear fuselage of the spaceplane. Thus, the vehicle is transformed from a cigar-shaped, needle-nosed ballistic missile into a jet propelled aircraft. The air-breathing jet engines are capable of propelling the spaceplane with a sustained cruising speed of about Mach 0.5 an altitude of 20,000 ft. and an operational range of about 500 km. Unlike the U.S. Space Shuttle Orbiter, which becomes a glider after reentry and is landed without power, the spaceplane becomes a jet propelled subsonic aircraft after reentry and lands as a powered flight aircraft similar to large jumbo jets.

As is illustrated in FIG. 1, the landing field 72 is located very close to the entrance to the electromagnetic accelerator 32. After the landing is completed, the wings, tail surfaces and engine ducts are retracted back into the fuselage. The spaceplane is refurbished, re-loaded, refitted with another nose cone and catapulted back into orbit with a very short turn-around time. These ground operations are designed to be routine and resemble the routine flight operations of airliners landing and taking off at a large commercial airport.

In order to take full advantage of the fact that the energy generating source of the vehicle's main propulsion system and its thrust generating mechnism is removed from the vehicle and is independent of it, this transportation system will be designed to launch the reusable spaceplanes on many different missions including direct ascent to geosynchronous orbits and even onto various round-trip interplanetary trajectories. It will also be designed to launch large unmanned electromagnetically propelled vehicles onto very high speed hyper bolic interplanetary trajectories for reconnaissance missions to other planets or their satellites. This is possible because the performance of the vehicles operating in this system is not dependent on the vehicles but rather on the electromagnetic accelerator which remains fixed on Earth and not subject to any energy or inertial limitations. Thus, the physical size and power of the eletromagnetic accelerator determines the performance of the entire system.

Before considering any detailed system design, it is important to have some general understanding of the required length of the electromagnetic accelerator in order for it to be able to launch a manned space vehicle onto various orbital trajectories around the Earth or onto various escape trajectories for interplanetary missions. Thus, a fairly detailed parametric analysis was performed to calculate the required accelerator lengths L necessary to achieve various launch velocities $V_o$ associated with various mission objectives. The maximum underground tunnel depths d and the corresponding Earth entry and exit angles $\theta_o$ were also calculated. These design parameters are also illustrated in FIG. 1.

The results of this study are given in Tables 1–5. Each table corresponds to a specific mission. The first four tables relate to missions performed by manned reusable spaceplanes. The fifth table relates to unmanned high speed interplanetary missions. The acceleration a, given in each table is assumed to be the primary independent operating parameter. The possible accelerations that are allowed for the manned missions described in Tables 1–4 range from a low of 2 g to a high of 8 g and are assumed to be within the range of human tolerance. (prior art manned launch vehicles had maximum accelerations exceeding 7 g.) For simplicity, the tunnel depth d is calculated under the assumption that both ends are at sea level.

The amount of additional in-orbit propulsion that the vehicle must supply (via on-board rocket propulsion) in order to circularize its launch trajectory to the desired orbit is given by $\Delta V$. Since this velocity increment is also equal to that required to send the vehicle back into the atmosphere (with a low angle of incidence) the total on-board propulsion required for a round-trip mission is $2\Delta V$. Notice that in Table 1, $2\Delta V = 0.096$ km/sec while in Table 2, $2\Delta V = 4.245$ km/sec. Thus, direct launches to geosynchronous orbit will require a substantial amount of on-board rocket fuel while launches to inclined, low Earth orbits require very little on-board rocket fuel. In missions to geosynchronous orbit, the circularization maneuver at apogee is combined with the required plane change maneuver. (If the accelerator were located on the Earth's equator, the plane change maneuver would be unnecessary and the required $\Delta V$ would be much lower.)

TABLE 1

Design Parameters Of An Electromagnetic Linear Accelerator For Launching Manned Vehicles To A 200 km High Inclined Circular Parking Orbit
$V_0 = 8.763$ km/sec; $V_1 = 7.966$ km/sec; $2\Delta V = 0.096$ km/sec

| 1 (g) | L (km) | d (km) | $\theta_0$ (deg) | T (min) |
|---|---|---|---|---|
| 2.0 | 1958.80 | 75.64 | 8.83 | 7.45 |
| 2.5 | 1567.04 | 48.31 | 7.06 | 5.96 |
| 3.0 | 1305.87 | 33.51 | 5.88 | 4.97 |
| 3.5 | 1119.31 | 24.60 | 5.03 | 4.26 |
| 4.0 | 979.40 | 18.83 | 4.40 | 3.73 |
| 4.5 | 870.58 | 14.87 | 3.91 | 3.31 |
| 5.0 | 783.52 | 12.04 | 3.52 | 2.98 |
| 5.5 | 712.29 | 9.95 | 3.20 | 2.71 |
| 6.0 | 652.93 | 8.36 | 2.93 | 2.48 |
| 6.5 | 602.71 | 7.12 | 2.71 | 2.29 |
| 7.0 | 559.66 | 6.14 | 2.51 | 2.13 |
| 7.5 | 522.35 | 5.35 | 2.35 | 1.99 |
| 8.0 | 489.70 | 4.70 | 2.20 | 1.86 |

The total time that the vehicle is accelerated inside the electromagnetic accelerator is denoted by T. For example, it follows from Table 1 that in order to achieve a launch velocity $V_o = 8.763$ km/sec with a constant acceleration of 3.5 g, the spaceplane would have to be accelerated for 4.26 minutes and the accelerator would have to be 1,119.31 km long. The maximum depth d of the tunnel would be 24.60 km. The vehicle's initial climb angle $\theta_o$ would be 5.03°. There are no plane change maneuvers required for orbit insertion into the 200 km high circular parking orbits. For flights to geosynchronous orbits, a plane change of 40° is included in the orbit insertion maneuver.

TABLE 2

Design Parameters Of An Electromagnetic Linear Accelerator For Launching Manned Vehicles To Geosynchronous Orbit
$V_0 = 11.421$ km/sec; $V_1 = 10.383$ km/sec;
$2\Delta V$ (i = 40°) = 4.245 km/sec

| a (g) | L (km) | d (km) | $\theta_0$ (deg) | T (min) |
|---|---|---|---|---|
| 2.0 | 3327.58 | 220.83 | 15.12 | 9.71 |
| 2.5 | 2662.06 | 140.43 | 12.05 | 7.77 |
| 3.0 | 2218.39 | 97.19 | 10.01 | 6.47 |
| 3.5 | 1901.47 | 71.26 | 8.57 | 5.55 |
| 4.0 | 1663.79 | 54.48 | 7.49 | 4.86 |
| 4.5 | 1478.92 | 43.01 | 6.66 | 4.32 |
| 5.0 | 1331.03 | 34.82 | 5.99 | 3.88 |
| 5.5 | 1210.03 | 28.76 | 5.44 | 3.53 |
| 6.0 | 1109.19 | 24.16 | 4.99 | 3.24 |
| 6.5 | 1023.87 | 20.58 | 4.60 | 2.99 |
| 7.0 | 950.74 | 17.74 | 4.27 | 2.77 |
| 7.5 | 887.35 | 15.45 | 3.99 | 2.59 |
| 8.0 | 831.90 | 13.58 | 3.74 | 2.43 |

In the lunar missions described in Table 3, very little orbital plane change maneuvers are required. The accelerator launches the spaceplane on a direct ascent ballistic transfer trajectory which intersects the Moon's orbit after a flight time of 72 hours. The spaceplane approaches the Moon along a hyperbolic trajectory (relative to the Moon) with an asymptotic velocity $V_\infty$ (i.e., hyperbolic excess velocity) of 0.900 km/sec. At an altitude of 200 km, (when the vehicle's velocity is 2.500 km/sec) retro propulsion is applied to place the vehicle in a 200 km high circular lunar parking orbit. This retro maneuver requires a $\Delta V$ of 0.900 km/sec. When the propulsion requirements for guidance and for relatively small plane change maneuvers are added, the total $\Delta V$ required for lunar orbit insertion is about 1.10 km/sec. The spaceplane then rendezvous with a near-by orbiting lunar spaceport via small rocket thrusters. After the docking maneuver is completed, the spaceplane is coupled to the lunar spaceport. Passengers and/or cargo are transferred between the spaceplane and orbiting lunar spaceport. (A fleet of small ferry vehicles provide transportation between the orbiting lunar spaceport and various lunar colonies located across the Moon's surface.) After the passenger and/or cargo transfer is completed, the spaceplane returns to Earth along the same basic transfer trajectory by applying positive rocket propulsion. The required $\Delta V$ for leaving lunar orbit and returning to Earth is about 1.10 km/sec. Thus, the total on-board rocket propulsion required for round-trip, stop-over missions to lunar orbit and return is only $2\Delta V = 2.20$ km/sec. Since this represents relatively small on-board rocket propulsion capability it is clear that this electromagnetic launching system will open the door to very low cost commercial flights to the Moon for ordinary passengers. It will enable the colonization of the Moon to proceed on a scale previously believed to be impossible outside the realm of science fiction.

TABLE 3

Design Parameters Of An Electromagnetic Linear Accelerator For Launching Manned Vehicles To The Moon
$V_0 = 12.158$ km/sec; $V_1 = 11.053$ km/sec; $2\Delta V = 2.20$ km/sec

| a (g) | L (km) | d (km) | $\theta_0$ (deg) | T (min) |
|---|---|---|---|---|
| 2.0 | 3771.08 | 285.08 | 17.19 | 10.34 |
| 2.5 | 3016.87 | 180.94 | 13.68 | 8.27 |
| 3.0 | 2514.06 | 125.10 | 11.37 | 6.89 |
| 3.5 | 2154.90 | 91.66 | 9.73 | 5.91 |
| 4.0 | 1885.54 | 70.06 | 8.50 | 5.17 |
| 4.5 | 1676.04 | 55.29 | 7.55 | 4.60 |
| 5.0 | 1508.43 | 44.75 | 6.79 | 4.14 |
| 5.5 | 1371.30 | 36.96 | 6.17 | 3.76 |
| 6.0 | 1257.03 | 31.04 | 5.66 | 3.45 |
| 6.5 | 1160.33 | 26.44 | 5.22 | 3.18 |
| 7.0 | 1077.45 | 22.79 | 4.85 | 2.95 |
| 7.5 | 1005.62 | 19.85 | 4.52 | 2.76 |
| 8.0 | 942.77 | 17.44 | 4.24 | 2.58 |

The interplanetasry missions given in Table 4 can be either non-stop, free-fall round-trip trajectiories, or round-trip, stop-over missions at the target planet similar to the above described lunar missions. In the case of non-stop, free-fall trajectories, the total propulsive velocity change is estimated to be about 1.0 km/sec. For the stop-over missions (at Venus or Mars) the total required velocity change for orbit insertion and ejection (plus guidance and orbital changes) is estimated to be 5 km/sec. Notice that this onboard rocket propulsion is about equal to that required for missions to geosynchronous orbit. It should be noted that in all of the missions, timing is critical. The vehicle must not only be launched with a precise, precalculated velocity $V_o$ but also at a certain time. This is especially true for lunar and interplanetary missions.

TABLE 4

Design Parameters Of An Electromagnetic Linear Accelerator For Launching Manned Vehicles Onto Interplanetary Trajectories
With $V_\infty = 4.0$ km/sec $V_0 = 13.043$ km/sec;
$V_1 = 11.857$ km/sec; $2\Delta V = 1$ to 5 km/sec

| a (g) | L (km) | d (km) | $\theta_0$ (deg) | T (min) |
|---|---|---|---|---|
| 2.0 | 4339.91 | 380.48 | 19.89 | 11.09 |
| 2.5 | 3471.93 | 240.79 | 15.79 | 8.87 |
| 3.0 | 2893.27 | 166.22 | 13.11 | 7.39 |
| 3.5 | 2479.95 | 121.69 | 11.21 | 6.34 |
| 4.0 | 2169.95 | 92.96 | 9.79 | 5.55 |
| 4.5 | 1928.85 | 73.34 | 8.70 | 4.93 |
| 5.0 | 1735.96 | 59.34 | 7.82 | 4.44 |
| 5.5 | 1578.15 | 49.00 | 7.11 | 4.03 |
| 6.0 | 1446.64 | 41.15 | 6.51 | 3.70 |
| 6.5 | 1335.36 | 35.04 | 6.01 | 3.41 |
| 7.0 | 1239.97 | 30.20 | 5.58 | 3.17 |
| 7.5 | 1157.31 | 26.30 | 5.21 | 2.96 |
| 8.0 | 1084.98 | 23.11 | 4.88 | 2.77 |

The tables also give values for the atmospheric exit velocities $V_1$ associated with the various missions. The altitude at which a vehicle leaves atmosphere is assumed to be 40 km. The values of $V_1$ are determined from ballistic trajectory calculations. The launch velocities $V_o$ however, were calculated on the basis of $V_1$. The difference between $V_o$ and $V_1$ is due primarily to two independent effects. The first, and most important, concerns the negative effect of atmospheric drag, and the second concerns the positive effect the Earth's rotation. (The launch velocity $V_o$ is measured relative to the Earth's surface but the exit velocity $V_1$ is measured relative to the Earth's center.)

Figure 2:
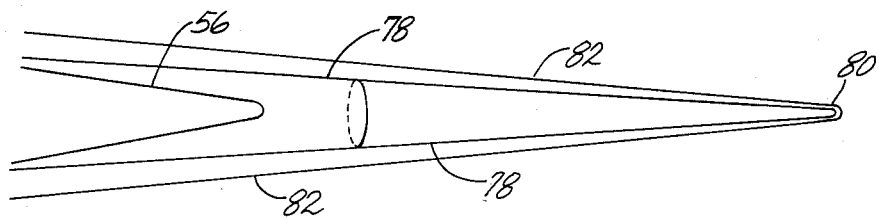
FIG. 2 illustrates the forward section of a reusuable spaceplane enclosed within a protective nose cone moving through the atmosphere at hypersonic speed.

Since the launch angle $\theta_o$ is relatively low, the potential effect of atmospheric drag can be fairly high. However, since the end of the accelerator will be located near the summit of a high mountain range (exceeding 12,000 feet elevation) rather than at sea level, this high launch altitude will tend to reduce the effect of atmospheric drag. Moreover, the vehicle's aerodynamic drag coefficient in its launch configuration (with its wings and all other aerodynamic control surfaces retracted) will be extremely low. As illustrated in FIG. 2 the spaceplane's long hypervelocity nose cone 78 is specifically designed to generate a small bow shock 80 well ahead of the main body of the spaceplane 5 thereby allowing the spaceplane to move behind and completely inside the shock cone 82 without any contact. This flight mode through the atmosphere will significantly reduce aerodynamic drag. The detailed design of the hypervelocity nose cone will be disclosed later.

As pointed out above, the Earth's rotation will also affect the value $V_1$. In this case, since the accelerator is oriented to launch the spaceplanes in an easterly direction, the low launch angle $\theta_o$ will tend to increase $V_1$ above $V_o$. If the latitude of the accelerator is 39° N, this increase will be about 0.360 km/sec. In order to simplify the calculations, the overall effect of combining the negative influence of atmospheric drag with the positive influence of the Earth's rotation, will be assumed to result in a 10% reduction of $V_1$ relative to $V_o$. This assumption is well within the results given in the paper cited above by C. Park and S. Bowen. It is also well within the low drag results obtained by Hawke et al in their paper also cited above. It should also be noted that the aspect ratio (length to diameter ratio) of the spaceplane will be about 40 to 1. This will also result in a very low drag coefficient.

TABLE 5

Design Parameters Of An Electromagnetic Linear Accelerator For Launching High Speed Unmanned Interplanetary Vehicles With $V_\infty = 40.0$ km/sec $V_0 = 45.681$ km/sec; $V_1 = 41.528$ km/sec; $\Delta V \approx 3$ km/sec

| a (g) | L (km) | d (km) | $\theta_0$ (deg) | T (min) |
|---|---|---|---|---|
| 50.0 | 2129.35 | 89.49 | 9.61 | 1.55 |
| 55.0 | 1935.77 | 73.87 | 8.73 | 1.41 |
| 60.0 | 1774.46 | 62.01 | 8.00 | 1.29 |
| 65.0 | 1637.96 | 52.80 | 7.38 | 1.20 |
| 70.0 | 1520.97 | 45.50 | 6.85 | 1.11 |
| 75.0 | 1419.57 | 39.62 | 6.39 | 1.04 |
| 80.0 | 1330.84 | 34.81 | 5.99 | 0.97 |
| 85.0 | 1252.56 | 30.82 | 5.64 | 0.91 |
| 90.0 | 1182.97 | 27.49 | 5.32 | 9.86 |
| 95.0 | 1120.71 | 24.66 | 5.04 | 0.82 |
| 100.0 | 1064.68 | 22.25 | 4.79 | 0.78 |

Figure 3:
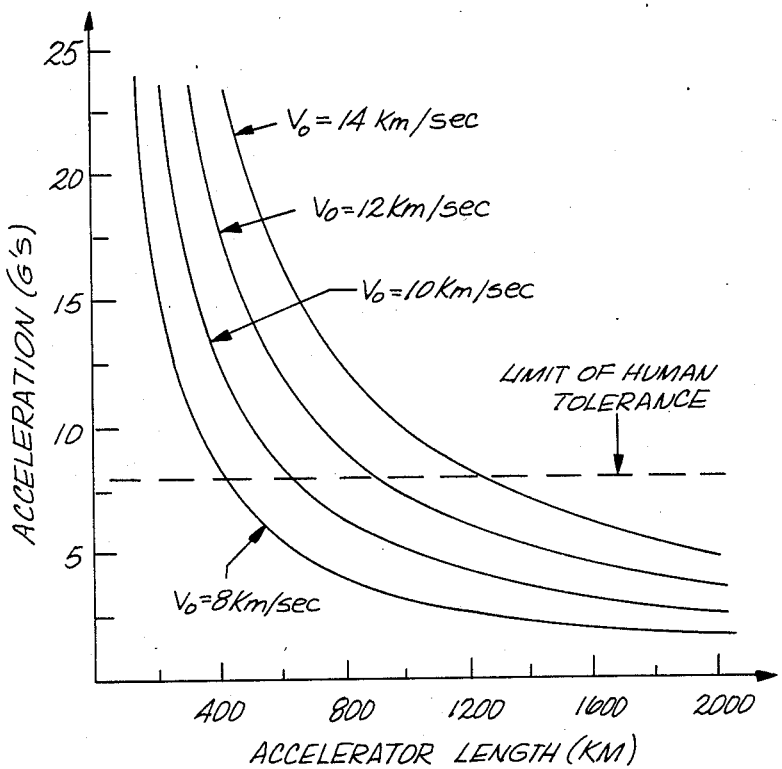
FIG. 3 is a system of parametric curves illustrating vehicle acceleration versus accelerator length for different launch velocities.

FIG. 3 is a system of parametric curves illustrating vehicle acceleration versus total accelerator length L for different values of launch velocity $V_o$. This figure, together with Tables 1-5 clearly demonstrate the tremendous performance potentials of very long electromagnetic accelerators.

In order to keep the launch acceleration required to achieve the various missions as low as possible, the overall length of the accelerator should be as long as possible. However, if the accelerator is to exceed a length of 1,000 km, there are only a few locations within the continental United States where it can be installed. For example, since the accelerator should be oriented in a westerly to easterly direction with its exit end located near the summit of a high mountain, the end of the accelerator should be located in the Rocky Mountains because there are no suitable mountains east of the Rocky Moutains.

There is another important consideration that must be taken into account before a suitable site can be selected for the accelerator. The spaceplane will generate a tremendous sonic boom when it emerges out of the launch tube in excess of Mach number 30. Although the shock cone will be relatively small (See FIG. 2) the sonic boom that it generates will be about one order of magnitude above that generated by a supersonic Concorde. This is because the amount of energy transferred to the shock wave by a spaceplane will be many times greater than that given by a Concorde. Consequently, the end of the electromagnetic accelerator must be located in a remote, uninhabited region far removed from the nearest community. This uninhabited region should have a radius of at least 50 km (31 miles).

Another important consideration is the physical shape of the mountain at the end of the accelerator. Since the end of the launch tube will rise at a shallow angle, the mountain should be fairly broad along an east-west direction near the summit. If this condition is not satisfied, it will be impossible for the end of the launch tube to approach the summit along a path that remains completely underground.

One possible location for the end of the accelerator is near the summit of Quandary Peak, Colo. which has an elevation of 4,348 m (14,265 ft.). The position coordinates of the summit of this mountain are: longitude 106°:05′ W, latitude 39°:24′ N. This mountain has an ideal shape and is located in a very remote region in the Rocky Mountains. The nearest major community is Denver, Colo. which is located over 100 km from the mountain. The nearest small community is Leadville, Colo. which is 25 km to the southwest. (The population of this town is less than 200.)

For maximum length, the beginning of the accelerator should be located somewhere along the Pacific Coast. Therefore, the Pacific Coast represents a curve of possible locations for the beginning of the tunnel. Another curve of possible locations can be obtained from the fact that in order for the accelerator to launch vehicles in a due easterly direction, the latitude coordinate at each end of the accelerator should be equal. The intersection of these two curves represents one possible location that satisfies both of these conditions. However, by taking advantage of the particular shape of the Northern Calif. coast line (which arcs upward in a northwesterly direction) the length of the accelerator can be increased by moving the initial point upward about 1° in latitude. This shift upward will also enable the initial point to be anchored to the geologic "North American Plate". Thus, the entire tunnel will be confined within this plate which moves slowly in geologic time as one rigid body. With this shift, the ideal initial point would be close to Eureka, Calif. The position coordinates of this city are: longitude 124°10′ W, latitude 40°45′ N. An optically straight electromagnetic linear accelerator connecting these two end points would be 1,530 km long and would have a maximum depth of 46 km. The corresponding Earth entry and exit angle $\theta_o$ of the tunnel would be 6.89°. This is the tunnel path selected for the preferred embodiment of the electromagnetic accelerator.

This preferred tunnel path will pass through a region in the western United States known geologically as the "Basin and Range" region. This region is one of the richest geothermal energy regions in the United States. The tunnel's point of maximum depth will lie under a point located about 100 miles north of Ely, Nev. At this point, the "Moho discontinuity" (which separates the Earth's crust from the mantle) is about 30 km deep. Consequently, the proposed accelerator tunnel will penetrate completely through the Earth's crust and extend into the upper mantle to a depth of about 46 km. The maximum expected rock temperature at this depth will be about 800° C. to 1,200° C. However, the entire tunnel path will be confined to the Earth's lithosphere which is solid down to a depth of 100 to 200 km. Thus, the proposed accelerator tunnel will have hundreds of kilometers of very hot rock walls exceeding 700° C. This represents a vast reservoir of natural geothermal energy that will be harnessed to generate enormous amounts of free electric power on a truly gigantic scale.

Although the Basin and Range region contains numerous pockets of molten rock or "magma" that lie within 30 km of the surface, these magma bodies are relatively small in overall volume. Thus, it will be highly unlikely that the proposed tunnel path will actually encounter any of these magma bodies. By analyzing seismic waves propagated into the Earth along the tunnel path, it will be possible to detect any magma bodies along the proposed path before any tunneling begins. In the unlikely event that a magma body will be encountered, the initial point of the tunnel can be shifted so as to avoid any contact with it (A fairly good geothermal analysis of the Basin and Range region can be found in the book: *Understand The Earth—A Reader In The Earth Sciences*, The M.I.T. Press, Cambridge, Mass., 1971, pp. 81-86, edited by I. G. Gass et al.).

Table 6 gives the required vehicle accelerations that must be generated by the proposed 1,530 km long electromagnetic accelerator in order to carry out all of the missions described in tables 1-5. It also gives the hyperbolic excess velocity for Earth escape missions that can be achieved by a manned vehicle when the launch acceleration is 8 g.

TABLE 6

Required Vehicle Accelerations For Various Missions Via Direct Launch From A 1,530 km Long Electromagnetic Linear Accelerator

| $V_0$ (km/sec) | Mission | a (g) | T (min) |
| --- | --- | --- | --- |
| 8.763 | Inclined Low Earth Orbit (200 km) | 2.56 | 5.82 |
| 11.421 | Geosynchronous Orbit | 4.35 | 4.47 |
| 12.158 | Lunar Orbit (200 km) | 4.93 | 4.19 |
| 13.043 | Interplanetary (Venus, Mars) $V_\infty = 4.0$ km/sec | 5.67 | 3.91 |
| 15.489 | Interplanetary (Jupiter) $V_\infty = 8.37$ km/sec | 8.00 | 3.29 |
| 45.681 | High Speed Interplanetary $V_\infty = 40$ km/sec | 69.59 | 1.12 |

Figure 4:
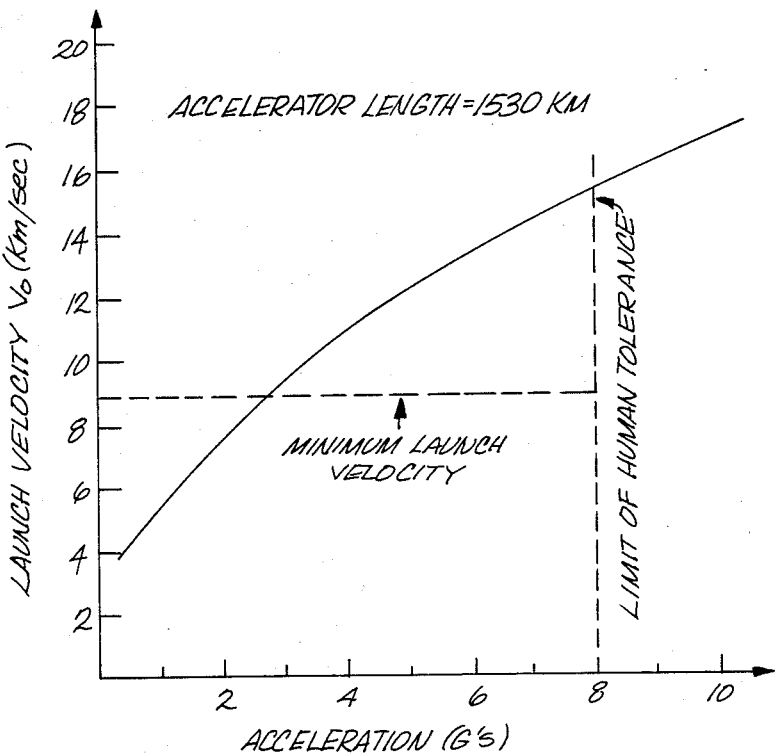
FIG. 4 is a graph of vehicle launch velocity versus vehicle acceleration corresponding to a 1,530 km long electromagnetic linear accelerator.

Notice that by accelerating the vehicle at 8 g, this electromagnetic accelerator will be actually capable of launching manned interplanetary space vehicles on direct transfer trajectories to Jupiter. Consequently, by applying the principle of gravity propulsion during the Jupiter encounter, the vehicle could then be propelled to any other planet or destination throughout the entire Solar System. (See for example my publication, *Utilizing Large Planetary Perturbations For The Design of Deep-Space, Solar-Probe, and Out-of-Ecliptic Trajectories*, Jet Propulsion Laboratory, Technical Report No. 32-849, Dec. 1965.) FIG. 4 is a graph of vehicle launch velocity versus vehicle acceleration corresponding to the proposed 1,530 km long, 46 km deep, electromagnetic linear accelerator.

In order to construct the proposed electromagnetic accelerator, it will be necessary to excavate an optically straight, 1,530 km long tunnel that penetrates into the Earth's upper mantle to a depth of 46 km below sea level. However, since the rock temperature and pressure at this depth are on the order of 1,000° C. (1,832° F.) and 230,000 lbs./in² respectively, it will be totally impossible to carry out the required excavation with prior art excavating methods and tunnel boring machines.

Thus, at first glance, it may appear that I have invented a transportation system that is impossible to construct! The required tunnel is at least one full order of magnitude deeper than any previously excavated tunnel. Excavating such a tunnel is considered to be a physical impossibility in the prior art because the compressional forces generated by the overlaying rock will immediately collapse into any cavity that is excavated at the required depth.

In order to provide a practical means by which the required excavation can be carried out, I have invented a new method and tunnel boring machine that is capable of boring a large diameter hole through solid rock at almost any depth regardless of rock temperature or pressure. Since excavating the 1,530 km long, 46 km deep tunnel must be accomplished before the proposed electromagnetic accelerator can be constructed, I shall digress at this point to disclose this novel, deep Earth tunneling technique and show how it can be applied in the present situation.

This deep Earth tunnel boring method is based on combining two prior art methods for excavating rock—high speed water erosion jets and thermal shock. High speed water erosion involves compressing ordinary water to a very high pressure and ejecting it out a small nozzle so as to form a narrow jet of water moving in excess of 200 m/sec. By directing this high pressure water jet on a rock face, a hole can be drilled very rapidly. High pressure water jets have an effect similar to that of a continuous series of solid projectiles striking the rock surface. The drilling rates can be extremely high regardless of how hard the rock may be. For a detailed technical description of rock drilling with high speed water jets see "Rock Penetration by High Velocity Water Jet," *International Journal of Rock Mechanics and Mining Science*, Vol. 2, No. 2, July 1965, by I. W. Farmer and P. B. Attewell.

Rock excavation by thermal shock involves generating sudden temperature gradients within the rock by applying an external heat source or an external cold source that has a temperature significantly above or below the ambient rock temperature respectively. The resulting temperature gradients create sudden thermal stresses that can fracture and degrade the hardest of rock. The rock face can be made to literally self-destruct simply by applying water to the rock with a significant temperature difference. The excavation can proceed essentially without having to expend any energy beyond that which is required to clean out the resulting rubble. For a detailed technical description of this excavation method see U.S. Pat. No. 3,152,651 entitled "Excavating Apparatus and Method," by S. L. Ross.

Although the water jet and thermal shock methods of rock excavation have undergone extensive field and laboratory testing, they have never been used in the design of large diameter, deep Earth, tunnel boring machines. However, these methods will be combined in a synergistic relationship to provide a radically new tunnel boring machine of tremendous power that is capable of boring through solid rock at essentially unlimited depth.

One of the most important reasons why the water jet and thermal shock methods can be utilized in carrying out the required excavation is that they are both essentially unaffected by tunnel depth. In fact, the method and the tunnel boring machine that I have designed to carry out the excavation utilizing these techniques, will actually operate more efficiently at deeper tunnel depths.

Since the required tunnel has a maximum depth of 46 km (150,920 ft) the design strategy in the construction of my tunnel boring machine will be based upon viewing this great depth as an asset rather than a liability. This will be achieved by utilizing the gravitational potential difference between the Earth's surface and the tunnel boring machine deep underground to supply all of the energy required to perform the actual rock penetration and excavation. The deeper the tunnel, the greater the energy availability. Moreover, as the tunnel depth increases, the ambient rock temperature and internal compressive forces automatically increase. If water at a temperature of 30° C. is applied (even gently) to a rock wall at 500° C., the resulting thermal shock will instantly fracture the rock. This fracturing is amplified manyfold when the rock is also under high compressive loads. Thus, by applying the water in the form of a high-pressure cutting jet, the combined affects are awesome. (See, "The Effect of Pre-heating on Jet Cutting of Rocks," *International Journal of Rock Mechanics, Mining Science and Geomechanics*, Vol. 15, 1978, pp. 59–68 by O. McNary.) Thus, my deep Earth tunnel boring machine will be able to pulverize and bore through the hardest of rock no matter how deep it may be.

The actual method by which the Earth's gravitational field can be harnessed to supply all of the energy needed to bore through the rock requires some explanation. In order to create an initial gravitational potential difference that can be utilized to power my deep Earth tunnel boring machine, he tunneling will have to proceed in two stages. The first stage will involve boring an initial section of tunnel to as great a depth as possible using a conventional mechanical tunnel boring machine. (See, "Deep In The Earth With The Monster Moles," *Popular Science*, August 1973, pp. 84–132, by R. Gannon.) After this initial tunnel section is bored, the conventional boring machine is withdrawn and replaced with my gravity powered hydraulic boring machine. Since the maximum vertical depth of a conventional boring machine is about 4,000 m (13,123 ft) and since the initial inclination of the tunnel is 6.89°, this first section will be about 33 km long.

The hydraulic boring machine will be fed a continuous supply of water by a high pressure water conduit that is supported by a heavy duty supporting structure mounted on treads. The water conduit and its supporting structure are connected to the end of the hydraulic boring machine and moves along the tunnel behind it. Since the entire tunnel is perfectly straight, the moving supporting structure can be designed as a very long rigid truss structure mounted on heavy duty heat resistant belts without requiring any tracks. Initially, this supporting structure is about 33 km long. As the boring machine begins to bore through the rock along a straight path, the length of the supporting structure is continuously increased by adding on new sections from the tunnel's entrance. The initial length of the water conduit, riding on the moving support structure, is also about 33 km long and is constructed with thick-walled stainless steel. As the boring machine advances into the tunnel, the conduit is also continuously lengthened by bolting on additional sections from the entrance.

With an initial vertical depth of 4,000 m, the hydrostatic water pressure inside the conduit available at the hydraulic boring machine will be 3,920 N/cm$^2$ (5,685 lbs /in$^2$). This water pressure is sufficiently high such that it can be fed directly into the hydraulic water jet erosion nozzles for pulverizing the rock without requiring any precompression whatsoever. The water is gravitationally compressed free-of-charge by the Earth's gravitational field. At a depth of 46,000 m (150,920 ft) the available water pressure will be 45,110 N/cm$^2$ (65,427 lbs/in$^2$). This is a truly enormous pressure which is generated free-of-charge by the Earth's gravitational field merely by feeding water, at ordinary atmospheric pressure, into the conduit from the tunnel's entrance. In general, if d denotes the depth of the tunnel boring machine in meters and g denotes the Earth's gravitational constant (9.80 m/sec$^2$) then the energy density E (Joules/kg) of the compressed water inside the conduit entering the boring machine is given by $$E = gd \text{ (Joules/kg)} \tag{3}$$

Consequently, the initial energy density of the water when the boring machine begins operation at a depth of 4,000 m will be 39,200 Joules/kg. At the maximum mum depth of 46,000 m, this energy density will grow to 450,800 Joules/kg.

By constructing the high pressure stainless steel water conduit with extremely smooth, polished inside walls, frictional losses will be relatively small and can be neglected. Consequently, the total hydraulic drilling power P (watts) that this gravity powered hydraulic tunnel boring machine is able to concentrate on the rock face of the tunnel is given by $$P = E\dot{m} = gdm \tag{4}$$

where $\dot{m}$ (kg/sec) denotes the total mass flow rate of water projected onto the rock face. In order to illustrate the enormous drilling power that my machine can achieve by simultaneously projecting thousands of individual high pressure water jets onto the rock face, suppose that the combined mass flow rate m of all of the water jets is 10,000 kg/sec. (This mass flow rate could be easily supplied by a main water inlet conduit with an inside diameter of only one meter. The volume flow rate would only be 10 m³/sec and the flow speed would only be 12.73 m/sec or 41.77 mph.) Consequently, the minimum and maximum drilling power corresponding to the 4 km and 46 km drilling depths would be 392 MW and 4,508 MW respectively. The true significance of these numbers can only be understood by comparing them with prior art continuous tunnel boring machines. The most powerful and largest conventional hard rock tunnel boring machines have maximum drilling powers of about 1 MW (1,342 HP). Moreover, due to the nature of these machines, this power represents the practical upper limit. Consequently, my gravity powered hydraulic boring machine has the potential of operating with drilling powers thousands of times greater than the most powerful prior art hard rock continuous tunnel boring machines. Moreover, all of this enormous drilling power is supplied free-of-charge by the Earth's gravitational field!

This is how the Earth's gravitational potential difference between the top of the tunnel and the boring machine at the bottom of the tunnel can be harnessed and converted directly into the energy used to bore the tunnel through the rock. This boring method is thousands of times more powerful than conventional prior art boring methods—in fact, there is almost no limit on the drilling power.

The water jets (assisted by a thermal shock effect) pulverize the rock into fine grain particles. These particles mix with the spent water to form a slurry. The slurry is pumped into the main body of the boring machine and fed through a dewatering system. The pulverized rock is separated from the water and transported out of the tunnel by a high speed conveyor belt mounted on the moving support structure. The spent filtered water is transported out of the tunnel inside a specially designed linear boiler/steam pipeline system, that is also mounted on the moving support structure. As in the design of the water inlet conduit, the conveyor system and the water discharge conduit are continuously lengthened by adding on new sections from the tunnel's entrance.

The energy required to transport the pulverized rock and spent water out of the tunnel is also obtained free-of-charge by harnessing the natural geothermal energy surrounding the deeper portion of the tunnel. This energy is harnessed by utilizing the tunnel as a giant oven, heated by geothermal energy. The linear boiler begins at the end of the boring machine and extends for several hundred kilometers where the surrounding rock temperature exceeds 500° C. The linear boiler is designed as a cylindrical water conduit with external walls painted carbonblack and designed for absorbing infrared heat radiation. The water heating process is enhanced by a plurality of wide radiation absorbing carbonblack metallic fins with very high thermal conductivity mounted longitudinally on the conduit and extending for several meters radially outward from each side. After extending from the boring machine for several hundred kilometers this linear boiler portion of the water discharge conduit ends. The radiation fins are removed and replaced with a thick jacket of evacuated multilayer thermal insulation. Thus, while passing through the relatively cool portion of the tunnel near the entrance, the water discharge conduit is designed as a thermally insulated high pressure steam pipeline.

The spent water removed from the filtering system is compressed (by a hydraulic compressor system) inside the boring machine and injected into the linear boiler. The compressed water is heated while passing through the boiler by absorbing geothermal energy. The compressed liquid water is heated to very high temperatures, vaporizes into steam and is superheated to higher temperatures that approaches the temperature of the surrounding rock. By the time the water reaches the end of the boiler, it is completely transformed into high pressure superheated steam at very high temperature. It then enters the thermally insulated portion of the discharge conduit and transported to the surface. After reaching the surface, the high pressure superheated steam is fed into a plurality of steam turbines for generating electric power inside a geothermal power plant.

Some of the electric power generated by this plant will be fed into a plurality of electric motors and used for moving the conveyor belt loaded with the pulverized rock out of the tunnel. It will be shown herein that the total amount of electric power generated by this geothermal power plant will be many times greater than what is needed for moving the pulverized rock out of the tunnel on the conveyor belt. This excess electric power will be fed into the U.S. electric power grid and sold as commercial power to various utility companies. The amount of revenue generated by this sale will even exceed the total cost of excavating the entire tunnel and installing the electromagnetic linear accelerator.

Notice that the energy required for boring through the rock inside the tunnel is supplied free-of-charge by harnessing the Earth's gravitational field; and the energy required for removing the rock out of the tunnel is supplied free-of-charge by harnessing the Earth's geothermal energy field. Thus, the entire tunnel excavation and construction project is not only energy self-sufficient, but it will pay for itself many times over even before it is completed! In this respect, the tunneling project will resemble operating a gold mine—only in this case, the gold is geothermal energy which (unlike a gold mine) is guaranteed to be there.

It should also be pointed out and emphasized that this deep Earth gravity powered tunneling method will also enable a tremendous amount of hydraulic rock boring power to be concentrated on the drilling face. Conventional boring machines can only generate about 1,000 KW of mechanical power because this power is generated inside the boring machine at the drill site. In my gravity powered boring machine, the hydraulic boring power is generated all along the tunnel as the water descends to lower levels. Consequently, the rate of tunnel boring will be many times faster than what is possible with conventional boring machines. This is a critically important factor because the required tunnel is many hundreds of kilometers long.

Farmer and Attewell have shown (in their above-mentioned paper) that the amount of hydraulic energy required to excavate one cm³ of hard rock (i.e., specific energy) using water jet erosion drills with jet stream diameters of 4 to 5 mm, range from 2,000 to 5,000 Joules/cm$^3$. When the effects of thermal shock are combined with that of a high pressure water jet, as in the present deep Earth tunnel boring machine, the required specific energy should be much lower. Therefore, it is reasonable to assume that in this case, the average specific energy will not exceed 2,000 Joules/cm$^3$ ($2\times10^9$ Joules/m$^3$). If r(m) denotes the radius of the excavated tunnel, the tunnel boring rate l(m/sec) is given by $$\dot{l} = \frac{P}{\pi r^2 \sigma} \quad (5)$$

where P denotes the hydraulic power (in watts) and where $\sigma$ denotes the average specific energy (in Joules/m$^3$) for excavating the rock.

In the preferred embodiment of the accelerator tunnel r=8 m. Hence if the average hydraulic boring power is P=$2\times10^9$ watts, the machine will be able to advance at an average rate of 0.004974 m/sec or 429.72 m/day (1,409.84 ft/day). If this pace could be maintained non-stop, it could be completed in 3,407 days or 9.33 years. Since the usual tunneling rate of conventional hard rock boring machines is about 50 m/day, it would require about 660 days to simultaneously bore the 33 km long initial tunnel sections at each end using two boring machines. Hence, the entire 1,530 km long, 46 km deep tunnel could be excavated in 4,067 days or 11.14 years.

Besides having an enormous boring power, there is another important design feature which distinguishes my gravity powered hydraulic boring machine from all others in the prior art. Since this boring machine is designed to penetrate deep into the Earth's interior where the ambient rock pressures are exceedingly high, the machine will also be designed to automatically line the tunnel walls with a thick pressure layer to prevent internal collapse. This thick pressure layer will be composed of high strength glass composite material (such as silica) which can be manufactured on the boring machine by continuous - flow, mass production techniques using automated electric furnaces. These furnaces draw electric power from electric cables fed into the tunnel from the outside. Since the bulk modulus of glass composite material is extremely high, the resulting pressure layer will be much stronger than a similar layer composed of high strength steel.

There is another important advantage for utilizing glass composite material rather than steel for the tunnel liner. Silica glass has a much higer melting point than steel and could therefore withstand enormous compressive load even if the ambient rock temperature exceeds 1,200° C. (2,192° F.). Since the softening point of silica glass is 1,600° C. (2,912° F.) the liner could even withstand situations where an underground fissure in the surrounding rock wall exposes the tunnel liner to a body of very hot magma at 1,200° C.

The raw material (such as high grade quartz sand) used for manufacturing the glass tunnel liner is transported to the boring machine on the inbound run of the pulverized rock conveyor. This conveyer system is mounted on the tracked support structure and moves through the tunnel behind the boring machine. As in the design of all other systems carried on the support structure, the conveyor system is continuously lengthened by adding on new sections from outside the tunnel. Molten silica glass is continuously manufactured inside the electric furnaces and fused to the hot rock walls by a plurality of very high pressure molten glass injector systems. These high pressure molten glass injector systems are mounted near the forward end of the machine and extend all around its circumferential periphery. Thus, the molten glass is uniformly applied between the rock surface and the lateral walls of the machine, 360° around its circumferential periphery. The details of this molten glass continuous tunnel lining system will be given below.

There is still another unique feature of the overall design of the deep Earth tunnel boring machine that is radically different from all other boring machines. This machine is very long—perhaps exceeding 500 m in overall length. The primary reason why the machine is so long is because it will allow the glass tunnel liner to cool for several hours between the rock wall and the lateral walls of the boring machine, while simultaneously maintaining a very high outward pressure all over the surface of the glass liner in the radial direction, and while the machine continuously advances through the tunnel. Thus, by the time the machine moves completely past any point on the tunnel liner, the glass has had sufficient time to cool and become sufficiently strong to withstand any inward compressive forces exerted by the surrounding rock. The fact that the entire tunnel is absolutely straight allows the boring machine to be as long as desired. In fact, the longer it is the easier it will be to guide it along a perfectly straight path.

Although the deep Earth hydraulic tunnel boring machine will be completely automated, it will be designed with permanent living facilities for a small maintenance crew. This crew would monitor the various sytems and perform routine repair work. Since the required tunnel is very long, it would be very tedious and time consuming to have to transport repair personnel hundreds of kilometers in and out of the tunnel to fix the machine every time it breaks down. Thus, the machine will be analogous to a huge manned submarine capable of diving down to the deepest depths of the ocean. But the hull of the deep Earth boring machine will be significantly stronger than the strongest hull on the deepest diving submarine.

These are the general operating principles of my gravity powered hydraulic deep Earth tunnel boring machine. Unlike prior art tunnel boring machines, the efficiency and rock penetrating power of this machine actually increases with increasing tunnel depth. Since the ambient rock temperature deep inside the tunnel will be on the order of 1,000° C., the high pressure water jets striking the rock face will automatically generate high temperature gradients. These temperature gradients will result in internal thermal stresses that—by themselves—can fracture and break down the rock. Thus, the combination of thermal stresses and high pressure water jets, acting on the rock face simultaneously, will represent an extremely effective means for rapidly boring through even the hardest of rock formations. Moreover, unlike prior art tunnel boring machines, there is no physical contact between the rock cutting systems and the rock face. Thus, mechanical breakdown due to friction and worn out rock cutting parts will be significantly reduced.

In order to amplify the effect of the thermal shock, the inlet water can be pre-cooled and the inlet water conduit can be thermally insulated. This pre-cooling process could be achieved by a cryogenic refrigeration system by running the uninsulated stainless steel pressure conduit through a long tank of liquefied air at cryogenic temperature. As soon as the water temperature drops to 0° C., it could be withdrawn from the cryogenic tank and wrapped with a thick layer of thermal insulation. (An alternative method for providing cold inlet water would be to capture a large iceberg, maneuver it close to a port near the tunnel entrance, and obtain the ice water from it.) The effect of the high pressure water jets could be amplified by mounting thousands of individual water jet nozzles on the forward cutting end of the machine that simultaneously project thousands of high velocity water jets onto the rock face. Thus, the tunneling rate is essentially determined by the diameter of the inlet water conduit and by the rate at which the spent water and pulverized rock can be removed from inside the tunnel. The tunnel boring can be carried out continuously, 24 hours a day without overheating. With this machine, the hard rock tunneling is fundamentally transformed from the traditional process involving and handling solids, to a process involving and handling fluids. In fact, it can be viewed as a tunneling machine that transforms a continuous, hard rock tunneling machine into a soft ground slurry mole.

FIG. 5 is a schematic longitudinal cross section illustrating the design and construction of the drilling end of my deep Earth hydraulic tunnel boring machine 84. In order to allow the machine to penetrate deep into the Earth where the compressive rock pressures are extremely high, the drilling end is designed as a rotating concave cone 86 that is enclosed within, and protected from the surrounding rock 88 by an outer reinforced cylindrical pressure shield 90. The rotating drilling cone 86 is designed with an annular, 50 cm wide transverse flange 92 at its base. The outer and inner diameters of this flange 92 are 16 m (52.49 ft) and 15 m (49.21 ft) respectively. The longitudinal length of the drilling cone 86 is 50 m (164.04 ft). The cone 86 is truncated near the apex with a transverse circular cross section 94. A circular slurry discharge conduit 96, with an inside diameter of 50 cm (19.69 in) is connected to the truncated cone. The cone 86 is mounted inside the pressure hull 90 such that it can rotate about its longitudinal axis 98.

According to the above dimensions, the total lateral surface area of the drilling cone 86 is 1,230 m². A plurality of hydraulic rock cutting systems 100 are mounted over this surface with a uniform distribution of 3 cutting systems for each square meter of the cone's surface. Thus, there are a total of 3,690 such systems 100. They are symmetrically mounted in a conformal triangular matrix grid 102 with the center of each cutting system positioned at the verticies of curved triangles. All of these rock cutting systems 100 project high speed water jets 104 inward towards the central longitudinal axis 98 of the rotating drilling cone 86.

Another plurality 106 of rock cutting systems are mounted on the rotating transverse flange 92 and project jet streams 107 in the forward direction. These systems are mounted in two concentric circles 108,110. The outer circle 108 has a diameter of 15.75 m (51.67 ft) and the inner circle 110 has a diameter of 15.25 m (50.03 ft) There are 240 symmetrically mounted hydraulic cutting systems 100 around each of these circles. Thus, the drilling cone 86 contains a total of 4,170 hydraulic rock cutting systems 100.

FIGS. 6 and 7 are schematic longitudinal and transverse cross sections respectively, illustrating the design and construction of one hydraulic rock cutting system 100. As is shown in these figures, a high speed jet nozzle 112 is mounted along the longitudinal axis 114 of a double walled mounting cylinder 116. The nozzle 112 is mounted on a movable ball joint 118 located near the forward end of the nozzle 112. The mounting is such that the nozzle 112 can be swiveled on its ball joint 118 to project its jet stream 120 in any direction within a cone of angles deviating up to 30° from the longitudinal central axis 114 of the mounting cylinder.

The ball joint 118 is itself mounted on a rigid reinforced mounting platform 122. Two nozzle remote control servo systems 124,126 are also mounted on this platform 122. The first servo controller 124 controls the movement of the nozzle 112 on its mounting ball joint 118 such that its jet stream 120 can be projected in any desired direction within the limits of its cone angle. The second remote control servo system 126 controls the diameter of the jet stream 120. This diameter can range from 0 cm (in which case the nozzle 112 is turned off) to a maximum of 1.0 cm (in which case the output power of the nozzle is maximum). This servo jet stream controller 126 is also capable of changing the jet stream pattern from a parallel stream, with zero divergence, to a diverging stream with a selected divergence angle. Both of these remote control nozzle servo systems 124,126 are connected to a central rock boring control computer 128 via control cables 130,132 respectively. The computer 128 generates all of the control signals for operating the nozzle 112.

Only about 2 cm of the full length of the nozzle 112 extends beyond its ball joint mounting 118. This snub-nosed end portion 134 of the nozzle 112 has an external diameter of 1.5 cm. As is illustrated in FIGS. 6 and 7 this snub-nosed end portion 134 of the nozzle 112 is surrounded by an annular slurry intake duct 136. The conduit of this annular intake duct is represented by the mounting cylinder 116. The inner walls 138 of the annular slurry intake conduit 116 surround the jet nozzle 112 mounted inside it thereby blocking any water or pulverized rock from passing behind the ball joint 118. The high speed water jet 120 projected out of the movable nozzle 112 strikes the rock in front of it thereby pulverizing it into small particles that are mixed with the spent water. The particle size is sufficiently small so as to allow the particles to remain in suspension in the spent water thereby creating a slurry. Most of this slurry is removed through the annular conduit 116 which operates by creating a pressure differential. A rotating high speed annular screw 140 is mounted inside the forward end of the slurry conduit which generates a lower relative pressure around the annular intake duct 142. The inside wall diameters of the annular slurry discharge cylinder 116 are 12 cm and 4 cm respectively. Thus, the cross sectional area is 100.53 $cm^2$. If the operating diameter of the jet stream is 0.7 cm, its cross sectional area is 0.38 $cm^2$. Hence, in this case the cross sectional area of the slurry discharge cylinder 116 will be about 261 times larger than that of the jet stream. Consequently, most of the slurry is immediately ingested into the annular conduit 116 as soon as it is formed before it can accumulate. The nozzle 112, slurry discharge conduit 116, ball joint 118, mounting platform 122 and servo controllers 124, 126 represent one of the 4,170 hydraulic rock cutting systems 100 mounted on the drilling cone 86 shown in FIG. 5. FIGS. 6 and 7 also illustrate a portion of the external surface 144 of the drilling cone 86 near the rock cutting system 100. Each rock cutting system 100 is rigidly mounted behind the drilling cone 86 such that the slurry conduit 116 is perpendicular to the local tangent plane of the drilling cone surface. The external cone surface 144 is beveled inward slightly around the slurry discharge conduit 116 and the edges are rounded. A network of rotating high pressure water inlet conduits 146 and slurry discharge conduits 148 are rigidly mounted behind the drilling cone's surface 144 for feeding water to each nozzle 112 and removing the slurry from the slurry discharge conduit 116. The high pressure inlet water is fed into the movable nozzle 112 by means of a short flexible hydraulic pressure hose 150 that connects the nozzle to the water feeder conduit 146. The slurry discharge conduit 116 is connected to the feeder slurry conduit 148 by a short rigid conduit 152.

FIG. 8 is a horizontal longitudinal cross section illustrating the design and construction of the main water inlet conduit 154 and the main slurry discharge conduit 156 that passes into the main body 158 of the boring machine 84. The slurry discharge conduit 156 is connected to a rotating cylindrical sleeve valve 160. The other end of this sleeve valve 160 is connected to a rotating cylindrical central slurry conduit 162 that is rigidly mounted to the end of the rotating drilling cone 86. All of the slurry feeder conduits 148 are connected to this central rotating slurry discharge conduit 162.

The high pressure water inlet conduit 154 is connected to an annular section of conduit 164 that surrounds the inner slurry conduit 156. This non-rotating annular conduit section 164 is connected to a rotating annular sleeve valve 166. This rotating annular sleeve valve 166 surrounds the rotating cylindrical sleeve valve 160 of the slurry conduit 156. The other end of the rotating annular sleeve valve 166 is connected to a rotating annular central water inlet conduit 168 (that surrounds the rotating central slurry conduit section 162) and is rigidly mounted on the end of the rotating drilling cone 86. All of the water inlet feeder conduits 146 that feed water to the individual jet nozzles 112 are connected to this rotating central annular water conduit 168. All of these conduits are thermally insulated.

These two concentric sleeve valve conduit systems form a double walled rotating sleeve valve system that allows the slurry discharge to be fed from the rotating slurry feeder conduits 148 mounted on the rotating drilling cone 86, to the non-rotating main slurry discharge conduit 156 while simultaneously feeding the high pressure inlet water from the main non-rotating water inlet conduit 154 to all of the rotating water feeder conduits 146 mounted on the rotating drilling cone 86.

Each jet nozzle 112 will generate a substantial propulsive reactive thrust. It is possible to utilize this natural propulsive thrust to rotate the entire drilling cone 86 as it bores through the rock. For example, by directing all of the jet streams 104 in a slightly clockwise (or counter clockwise) direction, a tremendous roll torque will be generated which will rotate the cone 86 in the counter clockwise (or clockwise) direction. The rotation rate can be varied to any desired value by controlling the direction of the jet streams. This is the basic torque generating mechanism for rotating the drilling cone 86 about its longitudinal axis 98 as it advances forward.

A remote control servo breaking system 170 is provided for applying external mechanical breaking torque on the rotating drilling cone 86. This system 170 is also connected to the central rock boring computer 128. Notice that by varying the mechanical breaking torque, and simultaneously varying the jet stream torque, the boring machine 86 will obtain complete roll control guidance and stability.

FIG. 9 is a schematic transverse cross section through the forward portion of the boring machine 84 along the line $L_1-L_1$ shown in FIG. 5. Since the non-rotating cylindrical outer hull 90 of the boring machine 84 is designed as a pressure shield against the tremendous compressive forces of the surrounding rock 88, it is constructed with super reinforcement capable of withstanding the full compressive forces of rock at essentially any depth. The outer skin 172 of the pressure hull 90 is fitted with an 8 cm (3.15 in) thick layer of high strength tungsten-carbide. This outer skin armor plating is bonded to an 8 cm thick cylindrical layer of high strength stainless steel 174. These two layers 172, 174 are backed up by the primary pressure shell—a 50 cm (19.69 in) thick layer of super high strength silica glass 176. This glass pressure shell is then encased within an inner layer of 8 cm thick high strength stainless steel 178. This super reinforced multilayer pressure hull is 74 cm (29.13 in) thick and completely surrounds the entire forward portion of the boring machine 84. Moreover, all of this superstructure is itself reinforced with numerous thick walled transverse pressure bulkheads 180 and longitudinal truss beams 182.

A plurality of small diameter (0.20 cm) hydraulic water injection conduits 184 passes through the outer hull 90 and injects a film of high pressure water 186 between the surrounding rock walls 88 and the outer pressure hull 90. The tungsten-carbide outer skin armor 172 is beveled slightly inward around the orifice of each hydraulic water injection conduit 184 which forms a 6 cm (2.36 in) diameter shallow cavity 188 surrounding each orifice. The water pressure in this cavity 188 can be extremely high. The water from all the surrounding injectors 184 join to create a pressure film of water that completely surrounds the pressure hull 90. This pressurized water suspension system supports the cylinder 90 and acts as a lubricant for advancing the front section of the boring machine 84 into the rock ahead of it.

The water injection conduits 184 extend in concentric circles 190 all around the circumferential periphery of the outer hull 90 of the drilling cone. They also extend along parallel rows 192 all the way past the end of the cone to point A (FIG. 5). These injector conduits 184 are connected to hydraulic water compressors 194. These compressors 194 are equipped with remote control servo systems 196 for controlling the output pressure generated by these hydraulic compressors 194. These servo controllers 196 receive command signals from the central rock drilling computer 128.

In order to protect the inside walls of the drilling cone 86 from the erosion effects of pulverized rock moving across its surface, it is fitted with an 8 cm thick armored layer of tungsten-carbide 198. This outer skin 198 is bonded to an inner layer of 8 cm thick stainless steel 200.

The general operating principles of the hydraulic drilling cone 86 are as follows: The drilling cone 86 is forced forward toward the rock 202 in front of it by applying hydraulic fluid pressure on a transverse annular thrust plate 204 (FIG. 5). As the drilling cone 86 advances into the rock 202, the 480 forward hydraulic rock cutting systems 106 mounted on the 50 cm wide rotating flange 92, cut a narrow annular channel 206 into the rock 202 just wide enough to move in the armored forward rim 208 of the pressure hull 90. All of the rock 210 behind the rim 208 inside the drilling cone 86 is no longer under the tremendous compressional forces of the rock 202 outside the cone. Since the compressional forces acting on the rock 202 outside the pressure hull 90 cannot be transmitted along the tunnel path, the pressure hull 90 serves as a pressure shield for all of the rock 210 inside the drilling cone 86.

While the small annular channel 206 is being cut by the 480 forward rock cutting systems 106, the 3,690 transverse hydraulic rock cutting systems 100 mounted around the inside walls of the rotating drilling cone 86 proceed to pulverize all of the rock 210 captured inside the cone by projecting high speed water jets at it from all directions, 360° around its circumferential periphery and across its entire 50 m length. As the drilling cone 86 moves forward, the rotating transverse rock cutting systems 100 gradually reduces the diameter of the rock 210 until it reaches the end 94 of the drilling cone. At this point, the rock is completely pulverized into small particles which, when mixed with the spent water, becomes a slurry 212. Most of this slurry 212 passes out of the drilling cone through the main slurry discharge conduit 96. A rotating screw 214, mounted inside the conduit 96 just behind the entrance 94, keeps the slurry 212 moving through the conduit 96. In order to prevent any excess amount of slurry from accumulating around the inside walls of the drilling cone 86, a plurality of additional slurry removal conduits 216 are provided. These conduits 216 are cylindrical with inside diameters of 12 cm (4.72 in). They are rigidly mounted along the inside walls of the drilling cone 86 (FIG. 8) and positioned around the rock cutting units 100. The other end of these conduits 216 are connected to the slurry feeder conduits 148. Each of these slurry removal conduits 216 is equipped with a rotating internal screw 218 mounted near its entrance duct to create a pressure differential for sucking up the slurry and forcing it into the slurry feeder conduits 148. However, it is not desirable to remove all of the slurry from the rotating drilling cone 86. A layer of slurry about 1 cm thick should remain between the hard rock surface and the inside walls of the drilling cone to serve as a lubricant. This slurry lubricant will allow the drilling cone to be rotated with relatively little torque. It would be very difficult to rotate the drilling cone if it were rammed up against the hard rock surface. This slurry shield will also reduce the effects of erosion on the surface of the drilling cone as it rotates.

One of the most important operating features of this deep Earth tunneling machine is that it is self-cooling. This is extremely important because the ambient rock temperature at a depth of 46 km below sea level will be on the order of 1,000° C. (1,832° F.). Since the underlying physical principle used for excavating the rock is based on rock erosion by high speed water jets, the boring machine will actually cool itself, and the rock while it is operating. This cooling effect is very strong because the initial water temperature used by the erosion jets is designed to be very low (close to the freezing point) and because the specific heat of water is about four times greater than that of the surrounding rock. For example, suppose that the water-to-rock mass ratio for the machine operating at the maximum depth of 46 km is 3 to 1. Thus, it requires 3 kg of water to excavate 1 kg of rock. The machine is designed to operate with an initial water temperature $T_w = 5°$ C. Suppose that the ambient rock temperature $T_r = 1,000°$ C. Consequently, the resulting rock temperature $T_s$ after it is excavated (and mixed with the water to form the slurry) can be calculated by solving the equation $$(3 \ kg)S_w(T_s - T_w) = (1 \ kg)S_r(T_r - T_s)$$

where $S_w$ and $S_r$ denote the specific heat of water and the rock being excavated respectively. For water, $S_w = 4188$ Joules/kg°C. For the rock, $S_r = 1047$ Joules/kg°C. (See "High-Temperature Mechanical, Physical and Thermal Properties Of Granitic Rock—A Review," *International Journal of Rock Mechanics, Mining Science & Geomechanical Abstracts*, Vol. 20, No. 1, pp. 3-10, 1983 by F. E. Heuze.) The solution of this equation is $T_s=81.5°$ C. (178.8° F.). Thus the boring machine will transform the initial 1,000° C. rock face of the tunnel, into an 81.5° C. slurry that is pumped into the main body of the boring machine.

Essentially all prior art hard rock tunnel boring machines excavate rock by inducing mechanical stress using drilling heads that are in direct contact with the rock. This process results in a significant increase in the temperature of the excavated rock. Since there is no heat sink to absorb this heat, the entire drilling machine becomes much hotter than the surrounding rock. However, if the surrounding rock is already at a temperature of 1,000° C., the machine would be rendered completely inoperable after a few minutes of operation. Thus, the self-cooling feature of my hydraulic deep Earth tunnel boring machine is an important operating feature that cannot be over-emphasized.

In order to achieve an optimum drilling process, various sensors 220 are mounted at certain positions across the inside surface of the concave drilling cone 86 and at various positions around the outer cylindrical pressure hull 90. These sensors 220 monitor different parameters such as temperature, pressure, water jet velocity, water and slurry mass flow rates, tunneling speed, rotation rate, torque, vibration, stress, etc. All of these parameters are encoded into signals and transmitted to the central rock boring computer 128. The computer 128 processes this data and transmits optimized control commands to all of the thousands of servo controllers to achieve a smooth, uniform and rapid boring process. The system is completely automatic.

In view of the above operating principles, the drilling cone basically operates by transforming the rock going into it, from a highly compressed solid, to a pulverized slurry with essentially zero internal compression.

It should be pointed out and emphasized that this concave drilling cone hydraulic deep Earth tunneling method offers two unique operating features that are totally new to the art of deep Earth tunnel boring. The first feature is that instead of having to excavate all of the rock across the full diameter of the tunnel at the ultra high compressive forces of the surrounding rock, only a narrow annular channel has to be excavated at these pressures. By cutting this narrow annular channel, the compressive forces acting on 90% of the remaining rock that has to be excavated is completely eliminated. It is excavated with essentially zero internal compression—regardless how deep it is.

The second important operating feature is that in view of the long tapered geometry of the drilling cone, much more rock surface is exposed to the rock cutting systems. This allows the enormous total drilling power to be distributed over a greater area. It enables the tunnel boring process to proceed without having to concentrate extremely high drilling power on relatively small areas of rock surface. This, in turn, allows the power density of the drilling process to be significantly reduced without having to reduce the total drilling power of the boring machine. This is extremely important in the present situation where the total drilling power can exceed 4 GW.

FIG. 10 is a schematic longitudinal cross section illustrating the design and construction of the rear portion of the boring machine 84. As is illustrated in FIG. 10 a rigid moving supporting structure 222 is connected to the end of the boring machine 84 and advances through the tunnel behind it. This entire support structure 222 (and all of its component parts) is made of heat resistant materials such as titanium carbide and various refractory materials capable of withstanding temperatures exceeding 1,500° C. A very high pressure, thermally insulated, water inlet conduit 224 is carried on the supporting structure 222 and extends all the way into the boring machine 84. The conduit 224 has a clear inside diameter of 150 cm (59.05 in) and is constructed with high strength stainless steel tubing with a wall thickness of 7 cm (2.76 in). In order to reduce skin friction, the internal walls of this water conduit 224 are made very smooth and then polished to achieve a smoothness approaching that of a glass surface. A 10 cm (3.94 in) thick jacket 226 of evacuated multilayer thermal insulation is mounted around the external wall of the water conduit 224 in order to thermally isolate it from the hot interior of the tunnel 10.

As described above, the actual water pressure of the nozzles will be equal to the hydrostatic pressure of the water head that is generated by the vertical depth of the boring machine. Thus, when the boring machine is at its maximum depth of 46,000 m, the water pressure will be $4.508 \times 10^7 \text{N/cm}^2$ or 4,600 kg/cm². Since the water jet velocity u(m/sec) generated by a pressure P(kg/cm²) is given by the formula $$u = 14.0\sqrt{P} \qquad (6)$$

it follows that the jet velocity at the maximum tunnel depth will be about 950 m/sec. (See *Novel Drilling Techniques,* Pergamon Press 1968, pp. 39–44 by W. C. Maurer.) High pressure water jet streams with velocities of this magnitude are extremely powerful and could instantly pulverize any rock no matter how hard it may be, that gets into its path. (See the above mentioned reference by Farmer and Attewell.) At the initial depth of 4,000 m, the water pressure is 400 kg/cm² and the corresponding jet velocity u=280 m/sec. This velocity is also sufficiently high for pulverizing any rock in its path.

Neglecting frictional losses, the power output P(KW) of a water jet with cross sectional area a(cm²) and pressure P(kg/cm²) is given by the formula $$P = 0.137 a P^{1.5} \qquad (7)$$

Consequently, if the boring machine is at the initial depth of 4,000 m, then in order to generate an effective boring power of 2 GW on the rock, the average jet stream diameter of the 4,170 jet nozzles will be 0.746 cm. At the maximum depth of 46,000 m, the average power could be increased to 4 GW. In this case the average jet stream diameter would be 0.169 cm. (The boring power would be 35 GW if the stream diameters were 0.5 cm at this depth.)

In order to comprehend the truly enormous power densities that can be generated by a single jet nozzle, suppose that its stream diameter is only 0.5 cm (0.2 in) at the maximum depth. Then, by equation (7) the jet stream projecting on the rock face would have a power of 8,392 KW (11,262 HP). But this single nozzle would only weigh a few kilograms and its overall length would be less than 20 cm (7.87 in)! The corresponding propulsive reactive thrust that would be generated by this single nozzle would be 17,667N (3,972 lbs). Hence, the rotational torque that can be generated by all of the 3,690 lateral jet nozzles is tremendous. (In order to prevent any uncontrolled spin up of the drilling cone 86 due to excessive torque, the jet nozzles will have to be set near their lowest torque levels.) By projecting the water jets slightly clockwise (or counterclockwise) and towards the rear of the machine, both rotational torque and forward propulsive thrust can be generated simultaneously.

The average power output of each nozzle in the hydraulic boring machine would be about 480 KW (644 HP). Two of these nozzles will generate more power than the total boring power of conventional large diameter hard rock tunnel boring machines. However, the maximum power output of a single nozzle (operating with a stream diameter of 1.00 cm) when the boring machine is at maximum depth will be 33,570 KW (45,048 HP). This is about 34 times greater than the total boring power of the largest, most modern, prior art hard rock tunnel boring machine! The total average drilling power of this deep Earth tunnel boring machine is about 2,000 times greater than the most powerful prior art hard rock tunnel boring machines.

The drilling cone 86 of this gravity powered hydraulic deep Earth tunnel boring machine is rotated about 4 revolutions per minute around its longitudinal central axis as it advances forward. This rotation exposes all of the rock surface 210 inside the drilling cone 86 to the high speed water jets of thousands of hydraulic rock cutting nozzles and the rock is pulverized laterally and uniformly across the entire rock surface. Since the rock surface also receives a severe thermal shock by the cold incoming water (which will be about 5° C.), it is fractured almost instantly by internal thermal stresses. Thus, the rock penetration by the water jets will be very rapid. (The actual specific energy required to excavate the rock by the water jets would probably be considerably less than 2,000 Joules/cm$^3$.)

As described above (FIG. 5) the resulting pulverized rock inside the drilling cone 86 is mixed with the spent water and forms a slurry. This slurry is withdrawn from the drilling cone 86 through the central discharge conduit 96 mounted at the end of the drilling cone. This conduit 96, together with many other feeder conduits 148 mounted around the drilling cone 86, feed the slurry into the main thermally insulated slurry discharge conduit 156 which passes into the main body of the boring machine 84. The inside diameter of this slurry pipeline 156 is 2 m (6.56 ft) and has the capacity of moving 12 m$^3$ of slurry per second at a flow speed of 3.82 m/sec (8.55 mph). This conduit 156 is also fitted with a 10 cm thick jacket 228 of evacuated multilayer thermal insulation.

As is illustrated in FIGS. 10 and 11 the slurry 230 is fed into a large dewatering system 232 installed near the end of the boring machine. This dewatering system 232 is composed of 100 separate high capacity centrifuges 234 operating in parallel. A network of relatively small feeder conduits 236 transports the slurry from the main conduit 156 and feeds it into the various centrifuges 234 while a network of continuous belt conveyors 238 receive the dewatered pulverized rock 240 discharged from the centrifuges 234 and carry it to a second stage dewatering system 242 comprising a system of continuous belt presses 244. After removing essentially all of the water from the pulverized rock, it is loaded onto the outgoing run 246 of a high speed conveyor system 248 that is mounted on the moving support structure 222 and transported out of the tunnel.

The water removed from the pulverized rock is fed into a system of large hydraulic turbine compressors 250 powered by high pressure water taken from the main inlet water conduit 224 via conduits 252. These compressors 250 compress the water to about 40 Atm and injects it, along with the water used to power the compressors, into a water discharge conduit 254. As described above, the first portion of this water discharge conduit is designed as a linear boiler for vaporizing the water by absorbing geothermal energy and the remaining portion is designed as a thermally insulated steam pipeline.

At a point B, not too far behind point A (FIG. 5), the external diameter of the pressure hull 90 is decreased from 16.0 m (52.49 ft) to 14.8 m (48.56 ft.). This opens a cylindrical annular cavity 256 that is 60 cm thick around the entire main body 158 of the boring machine 84 from point B and extending all the way to the end of the macine at point D (FIG. 10). As the machine moves forward, a plurality of high temperature, servo controlled hydraulic injectors 258 inject very high temperature molten silica glass 260 directly into this annular cavity 256 at high pressure (on the order of 2,000N/cm$^2$). These molten glass hydraulic injectors 258 extend about two meters in the longitudinal direction (FIG. 5) and extend 360° completely around the circumferential periphery. FIG. 12 is a transverse cross section through the main body 158 of the boring machine further illustrating the design and construction of the molten glass hydraulic injectors 258. As the boring machine advances forward, the cavity 256 is continuously filled with a 60 cm thick layer of molten silica glass 260 at very high temperature (on the order of 1,700° C.).

By the time the molten glass reaches point C (FIG. 5) it has cooled (via heat transfer to the surrounding rock and to an internal cooling system) such that it is no longer fluid, although it is still relatively soft and plastic. At this point, a plurality of small diameter (0.2 cm) hydraulic injectors 262 injects a high temperature, high pressure lubricating film 264 between the molten glass layer 260 and the outer pressure hull 266 surrounding the main body 158 of the boring machine 84. The molecular structure of this hydraulic lubricating fluid 264 is designed to prevent the fluid from mixing with, or penetrating into, the molten glass layer 260. The hydraulic injectors 262 extend in concentric circles 268 all around the circumferential periphery of the outer pressure hull 266 from point C, all the way to the end of the boring machine 84 at point D. The detailed construction of this system is very similar to that described above for injecting high pressure lubricating water 186 between the forward section of the pressure hull 90 and the surrounding rock 88. As in the previous system, this system is composed of a plurality of servo controlled high pressure hydraulic injectors 262 that pass through the pressure hull 266, a system of servo controlled hydraulic compressors 270 for compressing the fluid 264 to a precalculated pressure, and a reservoir 272 of this hydraulic lubricating fluid stored on-board the boring machine. A recycling system 274 is also provided for recovering the fluid 264 at the end of the machine and recycling it back through this lubricating system.

The hydraulic fluid pressure in this lubricating system is maintained about equal to that of the initial molten glass injection pressure. Consequently, this system enables the initial outward pressure which is exerted by the molten glass on the surrounding rock walls 88, to be maintained during the entire cooling process until the glass liner has completely hardened. Thus, it is impossible for the surrounding rock to collapse inward on the glass tunnel liner while it is still soft.

The distance between points C and D is on the order of 300 to 400 m depending upon how fast the boring machine bores through the rock. If the machine moves at a fairly high rate, the distance between C and D could exceed 400 m. Conversely, if the machine moves at a relatively slow rate, this distance could be less than 300 meters. The distance between points C and D is designed to allow the newly applied molten glass tunnel liner 260 at point C to cool and harden before it reaches the end of the machine at point D.

The hydraulic pressure of the molten glass acting on the 60 cm wide transverse annular plate 204 at point B (FIG. 5)(that extends 360° around the circumferential periphery of the main body of the machine) generates a tremendous amount of forward thrust. This hydraulic thrust generating system represents the basic motive source for driving the machine forward. For example, a molten glass pressure of 2,000N/cm$^2$ (2,900 lbs/in$^2$) acting on this thrust plate 204 will generate a forward thrust of $6.0 \times 10^7$N or 43,580 tons!

The forward thrust generated by this system is probably much greater than what is actually needed. Of course, this forward thrust can be reduced by reducing the hydraulic pressure in the molten glass injectors 258. But a certain minimum pressure is required to prevent the surrounding rock from collapsing into the cavity 256. This minimum pressure acting on the thrust plate 204 will probably generate much more forward thrust than is required. Consequently, a powerful breaking system will have to be provided.

Actually, a very powerful breaking system already exists. The computer controlled hydraulic water injection system that injects high pressure lubricating water 186 around the forward end of the pressure hull 90 can also be utilized as an extremely powerful breaking system. For example, by reducing the water pressure in this system, the amount of lubricating water will be reduced thereby increasing the friction between the surrounding rock 88 and the outer skin 172 of the pressure hull 90. This will generate more than enough breaking force to cancel out any excess forward thrust generated by the thrust plate 204. Since the outer skin 172 of the pressure hull 90 is 8 cm thick tungsten-carbide, there will be relatively little skin erosion. Moreover, this breaking action will tend to reheat the surrounding rock back to very high temperatures after it is cooled by the 480 forward shooting water jets. This frictional reheating process may even result in the rock being melted when it meets the molten glass layer 260 at point B. This would be a ideal situation as it would reduce the thermal shock caused by introducing the molten glass 260 into the annular cavity 256 along the inside walls of the surrounding rock.

The breaking thrust would be computer controlled by the rock boring computer 128 (by varying the amount and pressure of the injected lubricating water). Thus, by simultaneously varying this breaking thrust, and the molten glass injection pressure (via the servo controlled hydraulic molten glass injectors 258) it will be possible to generate essentially any amount of net forward thrust desired to achieve an optimum boring rate. Thus, the molten glass tunnel lining system not only provides a continuous 60 cm thick silica glass tunnel liner 276, but also provides the basic thrust for driving the boring machine forward with enormous force.

Since the entire tunnel path is perfectly straight, the distance between points C and D can be any desired length. The entire boring machine can exceed 500 m (1,640 ft) if necessary. In fact, the longer the machine, the easier it will be for it to follow a straight line. Thus, by the time it takes the machine to move completely past a new section of tunnel liner, the glass composite material has cooled to become extremely hard. Thus, the process of constructing the tunnel liner 276 is continuous and very simple. The process is essentially identical to that of injecting pressurized molten glass into a cylindrical shell mold that is continuously lengthened. The resulting liner 276 is continuous, without any joints or seams, and has a compressive strength many times greater than a similar liner made of the highest strength steel. The compressive strength of pure silica glass is about 10$^6$N/cm$^2$ or $1.45 \times 10^6$ lbs/in$^2$. Consequently, a 60 cm thick tunnel liner of this material will be physically impossible to collapse inward under compressional forces generated by the surrounding rock. Moreover, this tunnel liner is literally fused into the surrounding solid rock, not bolted to it as in steel tunnel liners.

In order to achieve very high strength, the tunnel liner 276 will be composed of very high quality silica glass. This glass is manufactured inside the gravity powered hydraulic boring machine. High purity quartz sand 278, that is required for manufacturing high quality silica glass, is transported into the tunnel and delivered to the boring machine by utilizing the inbound run 280 of the conveyor system 248 that is used for transporting the dewatered pulverized rock out of the tunnel. The conveyor 248 continuously feeds the sand 278 to a plurality of electrically heated furnaces 282 located near the molten glass hydraulic injectors 258. These furnaces 282 are fed electric power by power cables 284 that are also carried on the moving support structure 222. Molten silica glass is continuously extracted from the furnaces 282 and fed to a plurality of hydraulic compressors 286 via thermally insulated conduits 288 where it is compressed to very high pressure before being fed into the injectors 258 via high pressure thermally insulated conduits 290.

The construction of the cylindrical pressure hull 266 around the main body 158 of the boring machine 84 is different from the pressure hull 90 surrounding the drilling cone 86. FIG. 13 is a schematic transverse cross section through the main body of the boring machine along the line $L_2$—$L_2$ shown in FIG. 5. Since this hull 266 has to support the high compressional forces of the injected hydraulic lubricating fluid 264, it is constructed with a super reinforced structure capable of withstanding enormous compressional loads. Thus, in this respect it is similar to the design of the forward pressure hull 90. However, unlike the design of the forward hull 90, this hull 266 will have a heat exchanger built into its structure for cooling the silica glass tunnel liner 260. FIG. 14 is a schematic longitudinal cross section of an enlarged portion of the central pressure hull 266 further illustrating its design and construction.

As is shown in FIGS. 13 and 14 the hull 266 is designed as a multiwalled super reinforced hull 266 with a heat exchanger 292 embedded inside two adjacent walls. The outer skin 294 of the multiwalled pressure hull 266 is constructed as an 8 cm (3.15 in) thick cylinder of high strength tungsten-carbide with an external diameter of 14.8 m (48.56 ft). This outer cylinder 294 is bonded to a 12 cm (4.72 in) thick layer of high strength stainless steel 296. The heat exchanger 292 is designed as a high pressure stainless steel, single layer coil 298 that winds around the inside walls 300 of the stainless steel layer 296 from point C and extends all the way to the end of the machine to point D. The inside conduit diameter of this heat exchanger coil 298 is 5 cm (1.97 in) and contains flowing cooling water at very high pressure taken directly from the main water inlet conduit 154. The initial temperature of this circulating cooling water is about 5° C. (41° F.). The inside portion of the cooling coil 298 is embedded in another 12 cm thick layer 302 of high strength stainless steel. The stainless steel high pressure water cooling coil 298 is embedded between the outer 296 and inner 302 layers of stainless steel pressure cylinders such that there is no vacant space between the outside walls of the coil 298 and the surrounding cylinders 296,302 on each side. Thus, the two stainless steel cylinders 296,302 are mounted adjacent each other in contact relationship, with the cooling coil 298 completely embedded between them. One-half of the diameter of each conduit 304 of the coil 298 is embedded in the outer stainless steel cylinder 296, and the other half of the diameter of the conduit 304 is embedded in the inner stainless steel cylinder 302. This mounting design will maximize the thermal contact between the cooling coil 298 and the two surrounding stainless steel pressure cylinders 296,302. As a result, the thermal contact with the outer tungsten-carbide pressure cylinder 294 will be maximized. In order to allow the lubricating hydraulic injector conduits 262 to pass between adjacent water cooling conduits 304 of the cooling coil 298, the separation distance between the outer walls of adjacent cooling conduits 304 will be 3 cm (1.18 in).

A 2 cm thick layer of thermal insulation 306 is mounted along the inside walls 308 of the inner stainless steel cylinder 302. This entire structure is reinforced with the primary pressure cylinder—a 50 cm (19.69 in) thick silica glass pressure shield 310 encased between two 8 cm (3.15 in) thick cylinders of stainless steel 312. This super reinforced multiwalled main pressure hull 266 is 100 cm (39.37 in) thick and extends from the end of the forward pressure hull 90, to the end of the boring machine at point D. As in the design of the forward pressure hull 90, all of this lateral structure is reinforced with numerous thick walled transverse pressure bulkheads 314 and longitudinal truss beams 316.

In order to thermally isolate the interior 318 of the main body of the boring machine from the extremely hot external environment, a 10 cm (3.94 in) thick blanket 320 of evacuated multilayer thermal insulation is mounted all across the internal lateral walls 322 of the last layer of stainless steel 312.

The inlet cooling water circulated through the cooling coil 298 is drawn directly from the main water inlet conduit 154 by a high pressure feeder conduit 324 at about 5° C. If the inside and outside wall diameters of the cooling conduit 304 are 6 cm and 8 cm respectively, and if the length of the cooling coil 298 (between points C and D) is 350 m, then the total length of the cooling conduit 304 is $1.58 \times 10^5$ m. If the flow speed is 5 m/sec, it will require 8.80 hours for the water to circulate through the coil. The discharge temperature will be about 400° C. Since the water pressure will always remain above the critical point (218 Atm) the water remains in the liquid state while circulating through the coil. The water is withdrawn from the cooling coil 298 in a thermally insulated high pressure conduit 326, mixed with the water recovered from the slurry, and injected into the boiler of the discharge conduit 254. This mixing will therefore assist in heating and compressing the slurry water before it is injected into the boiler.

This cooling system will enable the molten glass injected at point C with a temperature of about 1,700° C. to cool to about ambient rock temperature (at about 800° to 1,000° C.) at the deepest part of the tunnel before it reaches the end of the boring machine at point D. At this temperature, the 60 cm (23.62 m) thick silica glass tunnel liner 276 will be extremely hard and capable of withstanding all of the compressive forces that the surrounding rock can exert on it.

It should be pointed out that since the specific heat of water is about 4 times greater than that of molten rock, the boring machine will actually be capable of tunneling right through pockets of molten rock or magma. The water jet streams will cool and solidify the molten rock in front of the drilling cone 86. This rock will be excavated as the machine moves forward. The construction of the glass tunnel liner does not require that all of the surrounding rock be solid. When the molten glass tunnel liner is injected into the annular cavity, the cooling system will cool it below its melting point (1,600° C.) even though the surrounding rock is in a molten state. Thus, the glass tunnel liner will harden to its solid state and remain hard even when the surrounding rock is all molten.

The deep Earth hydraulic boring machine 84 is also equipped with an extremely accurate automatic guidance system 328. This system is based upon varying the lubricating water pressure and the molten glass pressure in certain rows of the servo controlled hydraulic water injectors 184 and the hydraulic molten glass injectors 258. For example, if the on-board navigation system 330 determines that the boring machine should be moved slightly to the right (or left) the pressure in the hydraulic injectors 184 and 258 on the left (or right) hand side of the machine are increased respectively. Similarly, the machine can be made to move slightly up (or down) by increasing the pressure in the lower (or upper) injectors respectively. The operating pressure of each water injector 184 and each molten glass injector 258 is individually controlled by a central navigation and guidance computer 332. The design of the navigation system 330 is based on an extremely accurate multiple beam laser alignment system that follows a system of laser beams 334 that are propagated into the tunnel from the entrance. This system will be able to keep the boring machine moving along a truly optically straight line with a maximum error of less than 0.2 cm (0.20 in) for hundreds of kilometers. This will enable the foundation of the electromagnetic accelerator to have a nearly perfect alignment. (For information on laser guided tunnel boring see the article, "Laser—An Economic Guide To Straight Tunneling," *Mining Engineering*, May 1970, pp. 74–75, by W. C. Schafer.)

FIG. 15 is a schematic transverse cross section of a completed portion of the tunnel showing the rock walls 336, the 60 cm (23.62 in) thick silica glass tunnel liner 276 and the moving support structure 222 mounted on heavy duty heat resistant tank-like tractor belts 338. The support structure 222 is partitioned into five basic carrying levels. The first level 340 is a thermally insulated passageway 342 enclosing the cold water high pressure inlet conduit 154. The conduit 154 is supported inside the passageway 342 by a plurality of pairs of thermally insulated suspension cables 344 separated by about 5 m intervals. The interior walls 346 of the passageway 342 are covered by a 10 cm thick blanket of evacuated multilayer thermal insulation 348.

The second level 350 of the moving support structure 222 is another thermally insulated passageway that is completely enclosed with a thick blanket of additional evacuated multilayer thermal insulation 348. This passageway 350 carries all of the electrical cables 352 (including the high voltage power cables 284 used for operating the electric furnaces 282). These cables 352 also include various control cables, telemetering cables, data transmission cables, and closed circuit TV cables. A water cooling conduit 354 is also mounted inside this passageway 350 for cooling the cables 352.

The third level 356 carries the moving outgoing belt 246 of the conveyor system 248. This belt 246 is supported by a plurality of rollers 358 and is loaded with dewatered pulverized rock 240. The belt is 2 m (6.56 ft) wide and moves at about 5 m/sec(11.18 mph). It has the capacity of carrying out 2 m$^3$ of pulverized rock per second. A plurality of thermally insulated, water cooled motor/generators 360 assist in moving the belt 246. When the belt is moving up the incline towards the tunnel entrance, these motor/generators 36 function as traction motors. When the belt is moving down the incline towards the center of the tunnel, these units 360 function as generators thereby converting dynamic breaking power into electric power. This electric power is fed into the power cables and used to power the other units operating as traction motors. In order to prevent any residual water inside the pulverized rock 240 from escaping into the tunnel as steam, the lateral walls 362 of the third level 356 are made air tight.

The fourth level 364 of the moving support structure 222 carries the incoming belt 366 of the conveyor system 248. This belt 366 is supported by a plurality of rollers 368, and carries quartz sand 278 to the boring machine for manufacturing the silica glass tunnel liner 276. This level 364 is left open so that the hot environment inside the tunnel will pre-heat the incoming quartz sand efore it reaches the boring machine. When the boring machine is near its deepest level, this pre-heating can heat the sand to about 1,000° C. This will reduce the amount of electric power needed to operate the electric furnaces 282 for manufacturing the molten silica glass. A plurality of spaced apart linking drive trains 370 connect some of the rollers 358 of the outgoing belt 246 with some of the rollers 368 of the incoming belt 366. This system will reduce the amount of motive power required to move the pulverized rock up an incline, while providing additional breaking force when the pulverized rock is moving down an incline. (The amount of pulverized rock carried out of the tunnel on the conveyor will be about ten times greater than the amount of quartz sand carried into the tunnel.)

The primary motive source for moving the conveyor belt is located outside the tunnel. A plurality of large electric traction motors operating in tandem are mounted near the tunnel entrance and generate a pulling force on the outgoing run 246 of the conveyor on the order of 500 tons. In order to handle a force of this magnitude, a plurality of flexible high strength stainless steel ribbons are embedded longitudinally inside the belt.

The fifth and top level 372 of the moving structure 222 carries the water discharge conduit 254. As described above, the first part of this conduit 254 is designed as an enormous boiler several hundred kilometers long. The remaining portion is designed as a thermally insulated high pressure steam pipeline. FIG. 15 illustrates the design and construction of the boiler portion of the conduit. The central part 374 of the boiler 376 is a cylindrical stainless steel pressure conduit 254 with an inside diameter of 3 m (9.84 ft) and 5 cm (1.97 in) thick walls 378. The conduit 254 is centrally mounted on the support structure 222 such that its longitudinal central axis 380 is coincident with that of the tunnel. The inside and outside walls of the conduit 254 are painted carbonblack and designed for absorbing maximum radiant heat energy from the surrounding tunnel walls and transferring it to the water moving inside. The water heating process is amplified by a plurality of 4 m (13.12 ft) wide radiation absorbing carbonblack stainless steel fins 382. These fins 382 pass completely through the conduit 254 thereby partitioning the interior of the conduit into a plurality of separate passageways 384. Thus, the radiant heat energy absorbed by the fins 382 is conveyed directly into the interior of the conduit 254 and transferred (by convective heat transfer) to the water flowing over the interior fin surfaces 386.

It is important to understand the operating principles of the water discharge system as it results in revolutionary operating features of enormous significance. When the boring machine is at its maximum depth of 46 km, the surrounding tunnel walls will be at a temperature of about 1,000° C. (1,832° F.). (For simplicity, I shall assume that the maximum temperature occurs at the maximum depth and that the temperature decreases with decreasing depth.) After separating the spent water from the pulverized rock by the dewatering system, the water is compressed to about 40 Atm (588 lbs/in$^2$) and injected into the boiler at about 90° C. (194° F.). This compression step is accomplished by a plurality of hydraulic compressors powered by bleeding off some of the high pressure inlet water from the inlet conduit 154. After the compression is completed, the water used to compress it is mixed with the slurry water and injected into the boiler together. The total mass, volume, and velocity flow rates of the injected water are about 10,000 kg/sec, 10 m$^3$/sec, and 1.41 m/sec (3.16 mph) respectively. Consequently, since the boiling temperature of water at this pressure is 250° C. (482° F.), it will only require about 10 km of travel through the boiler 376 to absorb enough geothermal heat from the surrounding rock to raise the water temperature to the boiling point. However, since the inclination of the tunnel at the maximum depth is zero, the increase in vertical elevation after traveling 10 km would only be 7.90 m. The average water density during this time will be about 875 kg/m$^3$. Thus, neglecting frictional losses, the total hydrostatic pressure loss experienced by the liquid water climbing 7.90 m is only 6.80N/cm$^2$ (9.86 lbs/in$^2$ or 0.67 Atm).

During the time that the water is vaporized into steam, its temperature remains essentially constant. However, since the latent heat of vaporization of water is fairly high, the amount of additional geothermal energy absorbed by the water in order to vaporize it into steam is very high. It will require about 40 km of travel through the boiler beyond the boiling point to achieve complete vaporization.

After the water begins to vaporize into steam, its density undergoes a substantial decrease. In particular, the water density before and after vaporization is 814.00 kg/m$^3$ and 18.24 kg/m$^3$ respectively. Consequently, the additional hydrostatic pressure loss experienced by the water moving through the 40 km vaporization portion of the boiler will be limited by the combined effects of low tunnel inclination and a significant decrease in density. The increase in vertical elevation of the steam moving through this 40 km portion of the tunnel will be 189.51 m. Hence, the pressure loss through this section will be 9.80×18.24×189.51N/m$^2$=3.39N/cm$^2$ (4.91 lbs/in$^2$ or 0.33 Atm).

In view of the increase in the specific volume of the water during the vaporization process, the water is accelerated from its initial velocity of 1.41 m/sec to 77.56 m/sec (173.50 mph). And this directed stream velocity steady increases as the specific volume increases. Since the conduit 254 is absolutely straight, this velocity build up will generate extremely high terminal velocities. Thus, in this respect, the linear boiler also serves as a linear accelerator for the water moving through it.

After traversing through another 100 km of the linear boiler the steam will be superheated to about 500° C. At this temperature, the density will have decreased to 10.39 kg/m$^3$. During this period, the steam would climb 1,579.01 m higher in elevation. The average density would be (10.39+18.24)/2=14.32 kg/m$^3$. Hence, the resulting pressure loss through this section would be 22.16N/cm$^2$ (32.14 lbs/in$^2$ or 2.19 Atm).

Finally, after traversing another 200 km, the superheated steam would be heated to its maximum temperature of about 800° C. This will occur when the steam temperature and the ambient rock temperature are equal. At this temperature (and a pressure of 40 Atm−0.67 Atm−0.33 Atm−2.19 Atm=36.81 Atm) the density of the superheated steam will be 7.52 kg/m$^3$. Hence, the average steam density while passing through this section will be (10.39+7.52)/2=8.96 kg/m$^3$. The increase in elevation will be 7,889.13 m. Consequently, the gravitational pressure drop through this section will be 69.27N/cm$^2$ (100.47 lbs/in$^2$ or 6.84 Atm). The resulting pressure will be 36.81−6.84=29.97 Atm.

The boiler portion of the discharge conduit ends when the surrounding rock temperature falls below the steam temperature. In the above example, this occurs at a point 350 km behind the boring machine. Consequently, the linear boiler is 350 km long. At the end of the boiler, the radiation absorbing fins 382 are removed (along with the internal fin sections 386) and replaced with a 20 cm thick jacket of evacuated multilayer thermal insulation. Thus, the discharge conduit is transformed from a high temperature steam boiler, into a high temperature, thermally insulated steam pipeline.

Continuing with the above example, the temperature and pressure of the superheated steam entering the thermally insulated steam pipeline discharge conduit will be 80° C. and 29.97 Atm respectively. Consequently, the corresponding density will be 6.09 kg/m³. The remaining portion of the tunnel will involve a climb of 36,378 m. Thus, if the density remained constant, the resulting gravitational pressure drop would be 217.2N/cm² (315.05 lbs/in² or 21.4 Atm). The steam would emerge from the tunnel with a pressure of 8.53 Atm. However, at this pressure, the density would be only 1.82 kg/m³. Thus, it can be assumed that the average steam pressure while traversing the steam pipeline will be $(1.82+6.09)/2=3.96$ kg/m³. With this average density, the pressure drop will be 141.0N/cm² (204.51 lbs/in² or 13.92 Atm). Since the flow velocity will be very high, there will be essentially no decrease in steam temperature. Thus, the steam will appear at the tunnel entrance with a temperature of 800° C. (1,47° F.) and a pressure of 16.05 Atm. Neglecting frictional losses, the total hydrostatic pressure loss suffered by the water climbing through a vertical elevation of 46 km will only be about 24 Atm.

If the discharge water remained in the liquid state, the boring machine would have to generate a pumping pressure of 45,111N/cm² or 4,452 Atm to expel the water out of the bottom of the tunnel. Consequently, in order to pump out the water at a rate of 10,000 kg/sec, the required pumping power that would have to be generated by the boring machine would be 4.5 GW. This represents more power than 3.5 Hoover Dams operating at maximum generating capacity! Therefore, the design strategy of utilizing the tunnel as an oven for vaporizing the discharge water inside the discharge conduit is an extremely important operating feature of my boring machine. With this design methodology the energy required to compress the water used by the hydraulic rock cutting nozzles at the bottom of the tunnel is obtained free-of-charge by utilizing the Earth's gravitational field—and the energy required to transport the water back out of the tunnel is obtained free-of-charge by utilizing the Earth's geothermal energy field.

But there is an even more profound result of this water discharge system. During the heating and vaporizing process taking place inside the linear boiler, the water is accelerated to extremely high velocities and reaches the end of the tunnel as a gas moving at 290.57 m/sec (649.98 mph). Since the mass flow rate of the gas is 10,000 kg/sec, the kinetic power contained in this directed exhaust stream is 422 MW. This power can be harnessed by feeding it into a bank of high speed impulse type electric turbine generators. Assuming an operating efficiency of 90%, this system could generate 380 MW of electric power.

However, this system is designed to only harness the kinetic power of the directed exhaust stream, not the thermal power. Thus, for simplicity, can be assumed that after the directed kinetic energy is extracted, the steam still has a temperature of 800° C. and a pressure of 16.05 Atm (but with zero bulk velocity). The thermodynamic parameters comprising temperature $T_1$, pressure $P_1$, specific enthalpy $H_1$, and specific entropy $S_1$, of this gas will be: $T_1=800°$ C., $P_1=16.26$ Bar, $H_1=4151.14$ Joules/gm, $S_1=8.2732$ Joules/gm°K. This high pressure steam (at 236 lbs/in²) can therefore be fed into a bank of high pressure steam turbine electric generators for generating more electric power. Assuming that these turbines expand the steam in an isentropic process down to 1.0 Bar (approximately ambient atmospheric pressure) the resulting thermodynamic parameters of the steam leaving these turbines will be: $T_2=316.36°$ C, $P_2=1.00$ Bar, $H_2=3107.44$ Joules/gm, $S_2=8.2732$ Joules/gm°K. Hence, the amount of output work $\hat{W}_2$ generated by one kilogram of steam flowing through these second stage turbines will be $\hat{W}_2=1000(H_1-H_2)=1.0437$ MJ. Consequently, since the mass flow is 10,000 kg/sec, the total output power will be 10.4 GW. If the electric turbine generators are 90% efficient, the electric power output will be 9.39 GW.

A third power generating stage can generate even more electric power by harnessing the high temperature steam discharged from the second stage turbines Since the discharge temperature is 316.36° C. (601.45° F.) this steam represents an enormous high temperature heat reservoir that can be harnessed by a bank of closed cycle Rankine heat engines utilizing the cool water of the Pacific Ocean (near Eureka, Calif.) as the low temperature heat reservoir. The temperature of this heat sink will average about 12° C. (53.6° F.). The operation of the third stage involves taking the steam discharged from the second stage turbines and injecting it into a bank of high temperature heat exchangers that represent the high temperature heat reservoir of the Rankine heat engines. The shaft outputs of these heat engines are coupled directly to high efficiency electric generators for generating electric power. The steam circulates through the heat exchangers heating the working fluids of the Rankine engines. Since the low temperature heat reservoir is 12° C., it can be assumed that the discharge temperature leaving these heat exchangers will be 30° C. (86° F.). Thus, all of the latent heat of vaporization will be absorbed by the working fluids of the Rankine engines circulating through these heat exchangers. The incoming steam will be cooled and condensed to fluid (i.e., water) while circulating through these heat exchangers, and the incoming cold liquefied working fluid of the Rankine engines are simultaneously heated, vaporized, and superheated to about the inlet temperature of the incoming steam. The thermodynamic parameters of the water leaving the high temperature heat exchangers of the Rankine engines are: $T_3=30°$ C., $P_3=1.00$ Bar, $H_3=125.80$ Joules/gm, $S_3=0.4365$ Joules/gm°K. Hence, the thermal energy $\hat{Q}_{in}$ absorbed by the working fluids of the Rankine engines circulating through the high temperature heat exchangers from one kilogram of steam entering these heat exchangers will be $\hat{Q}_{in}=1000(H_2-H_3)$ $2.98\times10^6$ Joules.

The Carnot efficiency $\eta$ of the Rankine engines will be $$\eta = \frac{(316.36 + 273.15) - (12.00 + 273.15)}{316.36 + 273.15} = .5163$$

Thus, it can be assumed that the overall operating efficiency will be 45%. Since the mass flow rate of steam entering the heat exchangers is 10,000 kg/sec the resulting electric output power generated by the third stage will be $10,000\times(2.98\times10^6)\times0.45$ watts=13.42 GW.

The total electric power output is represented by combining the outputs of all three stages and is 0.42 GW+9.39 GW+13.42 GW=23.23 GW. This represents more bulk electric generating capacity than 18 Hoover Dams operating at maximum capacity! But the entire tunneling project would only need about 0.23 GW to operate. This would include operating the conveyor system and supplying electric power to the boring machine. Hence, the excess electric generating power would be about 23 GW. Consequently all of this excess power can be fed into the U.S. national electric intertie power grid and sold as commercial power to various utility companies for distribution all over the entire United States. Based on a sale price of 12¢/KW-hr the potential income revenue that could be generated by selling this enormous excess electric power would be $66 million per day or about $24 billion per year Since this income revenue would far exceed the total cost of the project, the entire system could be constructed at zero cost—in fact, the construction project will generate a huge net income of enormous magnitude even before the project is completed.

It should be emphasized that the power generating capability of the system depends upon where the boring machine is when the recovered slurry water is discharged into the linear boiler. For example, the above analysis will be even more impressive when the machine is beyond the half way point. However, my Purpose is not to conduct a detailed analysis of the energy generating capability of the tunnel boring machine, but rather to illustrate the potential magnitude that it is capable of generating—and its enormous economic benefit As pointed out above, the initial tunnel boring will be carried out by a conventional tunnel boring machine down to a depth of about 4,000 m. This is required in order to create the initial gravitational potential difference that is utilized to power the deep Earth tunnel boring machine. In particular, it is utilized to compress the water, via gravitational compression (i.e., hydrostatic pressure) for powering the high pressure hydraulic water jet nozzles. But when the hydraulic boring machine begins operation, the temperature of the surrounding rock will be too low to vaporize the water passing through the linear boiler. Thus, in view of the shallow angle at which the tunnel is bored into the Earth, the boring machine will have to tunnel many kilometers before the surrounding rock temperature will be high enough to vaporize the water.

For a first order approximation of rock temperature T at various depths d, the rock temperature can be expressed by a linear equation $$T = T_o + K d \quad (8)$$

where $T_o$ denotes the average rock temperature a few meters below the surface and where K denotes the temperature gradient in °C. per km. For example, if the temperature gradient K just east of Eureka, Calif. is 20° C./km, and if $T_o = 10$° C., then the rock temperature at a depth of 4 km will be 90° C. (194° F.).

In order to be able to begin vaporizing the discharge water moving through the linear boiler, the ambient rock temperature would have to be about 150° C. In view of equation (8), it would require a tunnel depth of 7 km to reach this temperature. The tunnel would have to be 61 km long to reach this temperature. Thus, the gravity powered boring machine would have to tunnel about 61 km−33 km=28 km without being able to utilize geothermal energy for vaporizing the discharge water. Thus, some system will have to be provided on-board the machine for pumping out the water in the liquid state all the way back up to the tunnel entrance. If the average (warm) water density is 850 kg/m$^3$, the hydrostatic water pressure at a depth of 7 km would be 5,831N/cm$^2$ (8,457 lbs/in$^2$ or 575.48 Atm). This pressure would have to be generated on board the boring machine in order to pump out the water in its liquid state.

Although this problem may appear to be insurmountable, there is one solution that is extremely simple and easy to carry out. Instead of feeding the water into the inlet conduit at ordinary atmospheric pressure, it can be precompressed to a high pressure and then injected into the inlet conduit. Of course, it would require a great deal of power and large compressors to carry out this pre-compression. However, there would be a lot of space outside the tunnel to install the necessary equipment. If the cold inlet water were precompressed to 5,000N/cm$^2$ (7,252 lbs/in$^2$ or 493.46 Atm) and if the mass flow were 10,000 kg/sec, then the power consumed by the compressors (operating at 100% efficiency) would be 500 MW. When this pre-compressed water reaches the boring machine, the pressure will be increased by an amount equal to the hydrostatic pressure of cold water at a depth of 7 km, which is 6,865N/cm$^2$. (The reason why the hydrostatic pressure of the inlet water is greater than that of the discharge water is due to the fact that the cold inlet water has a density of 1,000 kg/m$^3$ instead of 850 kg/m$^3$.) Thus, when the inlet water reaches the boring machine at a depth of 7 km, its water pressure will be equal to 11,865N/cm$^2$.

When the high pressure inlet water reaches the boring machine only one half is fed to the hydraulic rock boring jet nozzles. The other half is mixed with the spent water recovered from the dewatered pulverized rock and injected into the discharge conduit. The injection pressure after mixing one half of the inlet water at 11,865N/cm$^2$, with the recovered unpressurized slurry water, will be 11,865/2=5,933N/cm$^2$. This is more than enough pressure to force all of the water back to the surface. Thus, the pumping power is hydraulic. It is generated outside the boring machine and transmitted to it with the water used for carrying out the boring process. The required pumping equipment on-board the boring machine to drive all the water back to the surface is extremely simple. It is a high pressure mixing vessel!

Table 7 gives the tunnel depth d, tunnel inclination $\theta_o$ 0 and expected rock temperature corresponding to various distances D along with the proposed 1,530 km long tunnel starting from the tunnel entrance at sea level. The temperature calculations are based on equation (8)

with a temperature gradient K=21.50° C./km and an initial rock temperature $T_o=10°$ C. The temperature gradient is designed to generate a rock temperature of 1,000° C. at the maximum tunnel depth of 46.04 km. For simplicity, both ends of the tunnel are assumed to be at sea level and is symmetrical about the mid-point located 765 km from the tunnel entrance. The distance beyond the mid-point are given on the right hand side of Table 7. The tunel inclination $\theta$ is initially 6.89° and begins to gradually decrease until the mid-point where it is 0. Beyond the mid-point, the inclination begins to slowly increase until the end of tunnel is reached at a distance of 1,530 km where it is 6.89°. The Earth's radius is assumed to be 6378.16 km in these calculations.

TABLE 7

Tunnel Depth, Tunnel Inclination, And Rock Temperature Corresponding To Various Distances From The Entrance Of 1,530 km Long Tunnel With A Thermal Gradient K = 21.50° C./km

| D (km) | d (km) | d (ft) | θ | T (°C.) | T (°F.) | D (km) |
|---|---|---|---|---|---|---|
| 0 | 0.00 | 0 | 6.89 | 10.00 | 50.00 | 1,530 |
| 50 | 5.80 | 19,041 | 6.44 | 134.79 | 274.62 | 1,480 |
| 100 | 11.22 | 36,811 | 6.00 | 251.25 | 484.24 | 1,430 |
| 150 | 16.25 | 53.307 | 5.55 | 359.35 | 678.84 | 1,380 |
| 200 | 20.89 | 68,526 | 5.10 | 459.09 | 858.37 | 1,330 |
| 250 | 25.14 | 82,464 | 4.65 | 550.44 | 1,022.79 | 1,280 |
| 300 | 28.99 | 95,121 | 4.20 | 633.39 | 1,172.09 | 1,230 |
| 350 | 32.46 | 106,492 | 3.75 | 707.91 | 1,306.24 | 1,180 |
| 400 | 35.53 | 116,576 | 3.30 | 774.00 | 1,425.19 | 1,130 |
| 450 | 38.21 | 125,372 | 2.85 | 831.64 | 1,528.95 | 1,080 |
| 500 | 40.50 | 132,876 | 2.40 | 880.82 | 1,617.48 | 1,030 |
| 550 | 42.39 | 139,089 | 1.94 | 921.54 | 1,690.77 | 980 |
| 600 | 43.89 | 144,009 | 1.49 | 953.79 | 1,748.81 | 930 |
| 650 | 45.00 | 147,635 | 1.04 | 977.55 | 1,791.59 | 880 |
| 700 | 45.71 | 149,967 | 0.59 | 992.83 | 1,819.09 | 830 |
| 750 | 46.03 | 151,003 | 0.14 | 999.62 | 1,831.31 | 780 |
| 765 | 46.04 | 151,061 | 0.00 | 1,000.00 | 1,832.00 | 765 |

Figure 16A:
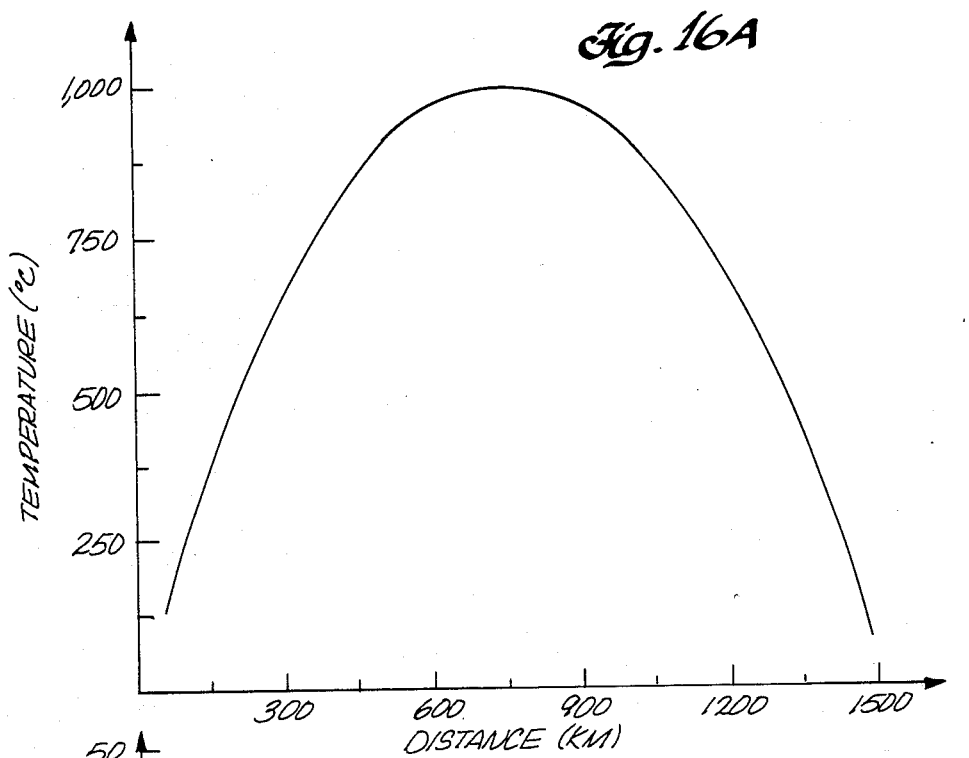
FIG. 16A is a graph showing the ambient rock temperature inside the tunnel as a function of distance from the tunnel's entrance.
Figure 16B:
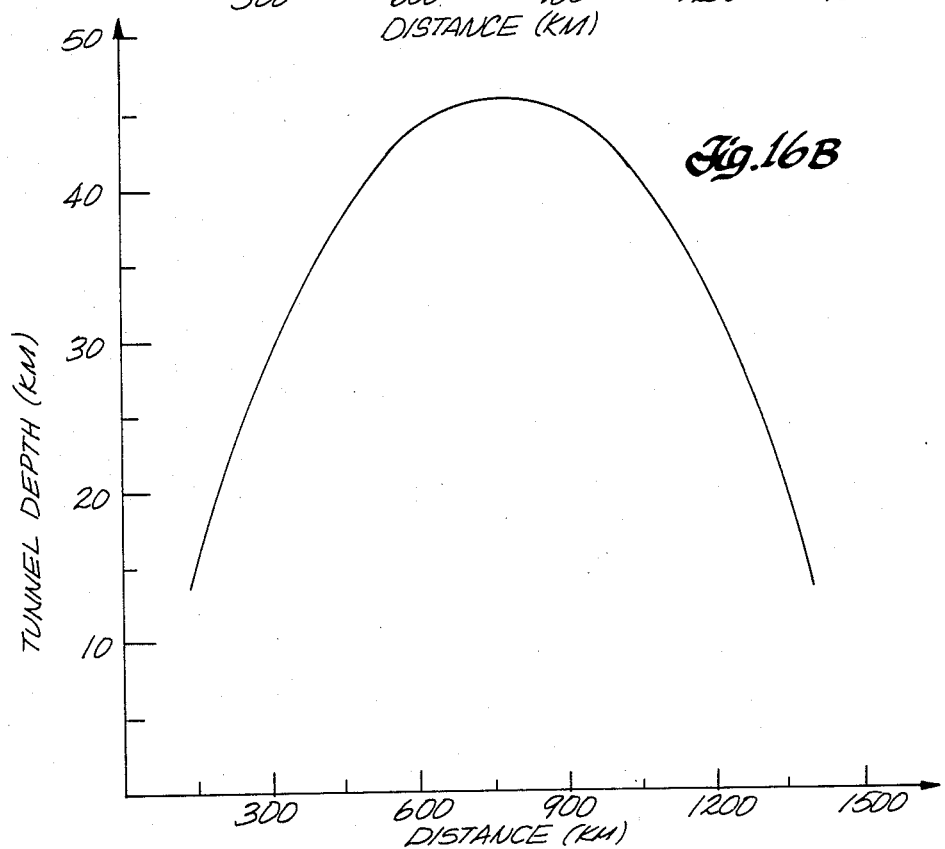
FIG. 16B is a graph showing the vertical tunnel depth as a function of distance from the tunnel's entrance.

FIGS. 16A and 16B are two graphs showing rock temperature T(°C.) inside the tunnel and the vertical depth d(km) veraus distance D(km) from the tunnel's entrance.

As pointed out above, the deep Earth gravity powered hydraulic tunnel boring machine is also designed to be manned by a human crew on a semipermanent basis. Thus, a system of thermally insulated living quarters 388 is provided for a crew of about 24 technicians. This crew could be broken down to 3, eight-hour shifts, so that a team of 8 crew members would be on duty 24 hours a day—non stop. Since the entire boring machine is completely automated, the crew would serve essentially as maintenance personnel. However, they would also be equipped with extensive on-board repair facilities where major repairs could be undertaken. Supply rooms would be stocked with many spare parts for almost every single system or component used on the machine. The primary purpose of the crew would be to keep the machine operating 24 hours a day without stopping. Thus, preventive maintenance would be the major activity. Access doors throughout the machine would enable crew members (dressed in protective thermal suits) to reach any part of it. The crew would be rotated with a fresh crew every three months. Transportation through the excavated tunnel, to and from the machine, could be accomplished with specially designed high speed transfer vehicles that travel between the glass tunnel liner 276 and the moving support structure 222.

A vast system of servo controlled closed-circuit TV monitors are mounted at various strategic positions on-board the boring machine to allow visual monitoring of all important subsystems. Various sensors are mounted throughout the machine and inside various subsystems. The signals generated by these sensors are fed into a central control computer 390 where they are processed. This central control computer 390 is linked with the tunnel boring computer 128 and the guidance and navigation computer 332. Other computers, such as an environmental control computer used for maintaining the living environments of the crew quarters are also linked to the central control computer 390. The central control computer 390 coordinates all operating systems so that the tunnel boring machine functions optimally and provides comprehensive operational information to the crew.

According to the above calculations, the entire 1,530 km long 46 km deep tunnel (including a 60 cm thick glass tunnel liner) would require about 12 years to construct. Since the design of the hydraulic tunnel boring machine is based on "state-of-the-art" technology, the project could begin immediately. It is well within current engineering feasibility.

One of the most fundamental assumptions used for "proving" the imposibility of catapulting manned space vehicles directly into orbit from the Earth's surface by an electromagnetic accelerator is that it would be physically impossible to construct a tunnel long enough and deep enough to achieve the required launch velocities. I believe that I have demonstrated that not only is such a tunnel possible to construct, but that its entire cost would be zero! In fact, the construction project would generate such an enormous amount of income revenue, that the total construction cost would be insignificant in comparison.

I have decided to devote considerable attention to the practical problem of excavating the tunnel because unless this tunnel can—in fact—be excavated, the proposed Earth based electromagnetic accelerator capable of catapulting manned space vehicles directly into orbit will be impossible to achieve. I believe that I have demonstrated that this tunnel can be excavated—and excavated with today's technology. I shall therefore devote the remainder of this disclosure to the design and construction of the actual electromagnetic accelerator, and to the design and construction of the launch vehicles that will use it.

As described above, the point where the tunnel reaches its maximum depth will be about 46 km (150,919 ft) below sea level and will be located directly under a point about 100 miles north of Ely, Nev. Since the Moho discontinuity in this region is about 30 km deep, the tunnel will penetrate about 16 km into the upper mantle. Seismic wave analysis taken along the surface above the tunnel line indicates that the rock at this depth is all crystalline (i.e., solid). In view of the melting temperatures of the rock, this information sets an upper bound on the tunnel temperature at about 1,250° C.

(2,282° F.). The actual maximun temperature (at a depth of 46 km) will be between 800° C. (1,472° F.) and 1,100° C. (2,012° F.). (See, "Density Distribution and Constitution of the Mantle," *Reviews of Geophysics,* Vol. 2, No. 1, Feb. 1964, pp. 35–88 by S. P. Clark, Jr., and A. E. Ringwood.) Consequently, in view of the steep temperature gradient near the Earth's surface, the rock walls of the tunnel will have a minimum temperature of 600° C. (1,112° F.) for almost 1,000 km (See Table 7).

In the art of thermodynamics, this natural geothermal environment represents a very high temperature heat reservoir of incredible magnitude. In terms of raw thermal generating capacity, it is equivalent to the high temperature boilers of thousands of the largest steam generating plants all lined up side by side operating simultaneously. In fact, it exceeds the combined thermal outputs of all of the power plants in the United States operating at maximum output—both nuclear and conventional power plants! One of the most important design features of the proposed transportation system is that this geothermal high temperature heat reservoir will be harnessed and converted into vast amounts of electric power on a stupendous scale.

My preferred method for harnessing this geothermal energy reservoir can be best described by referring to FIGS. 17 and 18. As illustrated in these figures, the 60 cm thick seamless silica glass tunnel liner 276 is fused to the hot outer rock walls, 360° around the circumferential periphery of the tunnel. Although its primary purpose is to prevent the tunnel from collapsing inward due to the enormous compressive forces in the rock, it is also designed to allow a relatively high thermal flux to pass through it. Although silica glass does not have a very high thermal conductivity, it is almost completely transparent to optical and near optical radiation. It is still fairly transparent in the infrared range with wavelengths between $1-5\times10^{-6}$ m. Consequently, one of the key design features of the glass tunnel liner will be maximizing heat transfer through the liner via radiative processes.

The intensity of blackbody radiation in the temperature range 600° C. and 1,000° C. is maximum between the infrared wavelengths $3.0\times10^{-6}$ and $2.0\times10^{-6}$ m respectively. Pure silica glass has good transparency in this infrared range. Thus, the expected rock temperatures inside the tunnel are ideal for radiative heat transfer through a silica glass tunnel liner.

As shown in FIGS. 17 and 18, a double walled annular hot water conduit 392 is mounted adjacent the glass tunnel liner 276 by a plurality of relatively short stand-off rods 394 fused into the tunnel liner 276. The gap between the hot water conduit 392 and the tunnel liner 276 is filled with a solid metallic filler material 396. This filler material 396 has a very high thermal conductivity and is designed to capture the radiative (and conductive) heat passing through the tunnel liner 276 and transfer it to the hot water conduit 392. This heat transfer medium 396 has a carbonblack surface 398 so as to maximize its absorption coefficient. The annular region 400 inside the double walled conduit 392 is filled with water 402 at a very high temperature and pressure. Notice that this annular hot water conduit 392 extends completely around the entire circumferential periphery of the tunnel liner 276. It therefore exposes considerable surface area to the heat source and acts as a heat exchanger, thereby heating the water flowing through it to a temperature close to that of the ambient rock temperature. The inside walls 404 of the annular hot water conduit 392 that are not adjacent the tunnel liner 276, are fitted with a 20 cm (7.87 in) thick blanket of evacuated multilayer thermal insulation 406. This thermal blanket 406 completely isolates the hot water conduit 392 from the interior portion of the tunnel.

Since the water pressure inside the hot water conduit 392 at the maximum depth of 46 km will be about $45,000N/cm^2$ (65,400 lbs/in² or 4,450 Atm) this hot water conduit 392 will be constructed with very high strength stainless steel with a wall thickness of 6 cm (2.36 in). This annular conduit 392 is reinforced with 36 internal, 6 cm thick, longitudinal plates 408 connecting the outer wall 410 with the inner wall 412. Thus, the annular hot water conduit 392 is partitioned into 36 separate hot water passageways 414. These plates 408 have carbonblack surfaces and also serve to increase the heat transfer between the outside heat source and the flowing water inside the conduit via thermal conductive and convective heat transfer processes.

A large system of reservoirs is constructed high in the Rocky Mountains near the end of the accelerator (at Quandary Peak, Colo.) for supplying water to the conduit 392. The cross sectional area of the conduit 392 between the end where the reservoir water is fed in, up to a certain point past the mid-point (which I will call the transition point) will be designed to be greater than that of the remaining portion. This is because it will be desirable to move the water through the conduit 392 at a relatively slow speed during the time it is being heated to its maximum temperature (beyond the deepest point), and then to accelerate it to a higher speed through the remaining portion of the conduit 392 where the rock walls have a lower temperature than the water temperature. This non-heating portion of the conduit is thermally insulated from its surroundings so that the temperature of the water inside it can be maintained near its maximum when it arrives at the geothermal electric generating plant (located near the entrance to the accelerator).

Thus, according to this design, the initial portion of the annular hot water conduit 392 between the inlet and the transition point (where it operates as a heat exchanger for heating the water) will have an outside diameter of 14.40 m (47.24 ft). The inside diameter of its inner wall 412 will be 13.16 m (43.18 ft). Hence, the cylindrical, high conductivity filler material 396, inside the gap between the glass tunnel liner 276 and the conduit 392 will be 20 cm (7.87 in) thick. Thus, the width of the annular region 400 containing the heating water is 50 cm (19.69 in) for this heating portion of the conduit. The total cross sectional area of this annular region 400 is 21.65 m² (232.99 ft²).

The inlet water from the reservoir system is designed to produce a flow speed of 8 m/sec (18.15 mph) through the heating portion of the conduit 392. This corresponds to a volume flow rate of 173.16 m³/sec and a mass flow rate of 173,165 kg/sec. It will require 26.56 hours or 1.11 days for the inlet water to reach the mid-point where the rock temperature is maximum (assuming for simplicity, that the rock temperature is an increasing function of tunnel depth d, independent of position and described by equation (8)). At this point, the water temperature will have a lower temperature than the ambient rock temperature. However, beyond the mid-point, the rock temperature begins falling and the water heating rate begins to slowly fall. At some point, located a few dosen kilometers beyond the mid-point, the ambient rock temperature will equal the rising water temperature. Thus, beyond this point, it will not be possible to heat the water to higher temperatures. It will be at its maximum temperature. This is the transition point where the water conduit 392 no longer functions as a heat exchanger, and becomes a thermally insulated water conduit. The thermally conductive filler material 396 is terminated at this point by an annular transverse insulating barrier that divides the two sections into two thermally insulated regions. The remaining gap between the conduit and the glass tunnel liner is evacuated to a very low pressure, filled with evacuated multilayer thermal insulation and permanently sealed. The outside diameter of the outer wall 410 of the conduit 392 is decreased to a new diameter of 14.10 m (46.26 ft) while the inside diameter of the inner wall 412 is expanded by 30 cm to a new diameter of 13.46 m (44.16 ft). Assuming that the wall thickness of the conduit 392 remains 6 cm, these dimension changes decreases the size of the annular region from a width of 50 cm down to only 20 cm (7.87 in). Thus, the cross sectional area is decreased by a factor of 2.5 which increases the flow speed of the hot water by a factor of 2.5 to 20 m/sec (44.74 mph). These dimension changes take place very gradually over a distance of 1,000 m such that the flow remains essentially laminar. The gap between the glass tunnel liner 276 and the conduit 392 is increased from 20 cm to 35 cm and is completely filled with evacuated multilayer thermal insulation. The thickness of the evacuated multilayer thermal insulation 406 surrounding the inside walls 412 of the conduit 392 is also increased from 20 cm to 35 cm. By increasing the flow speed by a factor of 2.5 and by thermally insulating the conduit 392 with thick jackets of evacuated multilayer thermal insulation, it will be possible to transport the hot water to the geothermal electric generating plant before it has time to cool to significantly lower temperatures. This temperature should be above 700° C. (1,292° F.). Since the hydrostatic pressure of this hot water will be 4,264N/cm² (421 Atm) it will remain liquid when it reaches the power plant.

It should be noted and emphasized that evacuated multilayer thermal insulation has an extremely low thermal conductivity. It is not only designed to block conductive heat transfer, but radiative heat transfer as well. Although it is usually used for preventing the ambient heat of the natural environment from entering a cryogenic substance at very low temperature, it can also be used for preventing heat in a substance at high temperature from escaping into the ambient environment. Its actual thermal conductivity is less than $10^{-7}$ W/(cm°C.). A 30 cm thick jacket of this insulation mounted around the outer and inner walls of the annular hot water conduit 392 will provide unprecedented thermal insulation. For example, it will enable the hot water inside the conduit at 800° C. to be transported 1,000 km without decreasing the temperature by more than 1° C. In actuality, it will not be possible to achieve this level of thermal insulation because of the heat loss through the supporting rods 394. However, these rods 394 will be specially designed to keep the heat loss as low as possible. Thus, by using such rods, together with evacuated multilayer thermal insulation, it will be possible to keep the water temperature from decreasing by more than about 10% of its maximum value.

Unfortunately, evacuated multilayer thermal insulation is very expensive. However, all of the material used in its construction is relatively inexpensive. Consequently, by employing large scale automated mass production techniques, it should be possible to reduce its cost by one or two orders of magnitude. A detailed technical description of evacuated multilayer thermal insulation can be found in the article, "Cryogenic Insulation Heat Transfer", *Advances in Heat Transfer*, Vol. 9, 1973, pp. 350–417 by C. L. Tien.

The accelerator tunnel is also equipped with a large internal cooling system. As shown in FIGS. 17 and 18, this system comprises a large diameter annular cold water conduit 416 that is installed along the inside walls of the annular hot water conduit 392. The cold water conduit 416 is anchored to the hot water conduit 392 by a plurality of thermally insulated radial stand-off rods 418 with very low thermal conductivity. Thus, the hot and cold water onduits are separated from each other by an annular gap 420 that is several centimeters thick. This gap 420 is completely filled with the evacuated multilayer thermal insulation 406 which surrounds the inside walls 412 of the hot water conduit 392. The cold water conduit 416 is mounted such that it is essentially completely thermally isolated from the hot water conduit 392. Since the maximum water pressure inside the cold water conduit 416 will be extremely high, its walls will be constructed with 6 cm thick high strength stainless steel.

Unlike the hot water conduit 392, the dimensions of the cold water conduit 416 remain unchanged. In the preferred embodiment, the external diameter of the outside walls 422 of the annular cold water conduit 416 is 12.76 m (41.86 ft) and the internal diameter of its inside wall 424 is 11.52 m (37.80 ft). Thus, the width of the annular region 426 in which the cold water flows is 50 cm (19.69 in). As in the design of the hot water conduit 392, the annular region 426 of the cold water conduit 416 is divided into 36 separate passageways 428 by 36 longitudinal plates 430 that connect the outer wall 422 to the inner wall 424. The total cross sectional area of the cold water conduit 416 is 19.07 m² (205.26 ft²).

The hot water and the cold water conduits both receive their inlet water from the same reservoir system constructed near the end of the accelerator. In order to obtain a high cooling capacity, the cold water flow speed in the cooling conduit 416 will be designed to be 10 m/sec (22.369 mph) This will give a volume flow of 190.69 m³/sec and a mass flow of 190,695 kg/sec. Consequently, the reservoir system will be designed to supply a total water intake of 363.86 m³/sec or 363,859 kg/sec.

There are already several reservoirs high in the Rocky Mountains near Quandary Peak, Colo. that could supply this water. For example, Dillon Reservoir, with an elevation of 2,750 m is a fairly large reservoir that is only a few kilometers north of Quandary Peak. It would be relatively easy to construct additional reservoirs in this region that are designed to capture and hold the water resulting from melting snow. The average snowfall in this region is many meters and is near the highest levels for any region in the United States.

Since the reservoir water originates from melted snow, the average temperature of the inlet water will be about 10° C. (50° F.). Thus, it is cooled by nature and is ideal for the cooling conduit 416. As is shown in FIGS. 17 and 18, the inside wall 424 of the annular coolng conduit 416 extends completely around the circumferential periphery of the accelerator corridor 432 and extends in the longitudinal direction over its entire 1,530 km length. Hence, it completely encloses the accelerator with a cylindrical stainless steel wall 424 containing cold water flowing at 190,695 kg/sec. The diameter of this accelerator corridor 432 is 11.52 m (37.80 ft). The electromagnetic accelerator will be constructed inside this 11.52 m diameter, 1,530 km long optically straight cylindrical corridor 432.

Since the accelerator corridor 432 is completely enclosed within a 50 cm thick annular conduit of cooling water moving at 10 m/sec (22.37 mph) the entire accelerator will be provided with a relatively cool operating environment. The cooling conduit 416 is separated from the hot water conduit 392 by a thick blanket of evacuated multilayer thermal insulation 406. Thus there is virtually zero heat transfer between the hot and cold water conduits. Even at the deepest point, 46 km below sea level, the accelerator corridor 432 should not exceed 20° C. (68° F.). Moreover, this cooling system will be easily capable of absorbing essentially any amount of heat generated by operating the accelerator at very high power levels and short cycle times (i.e., high launch rates).

Since the cooling water moves through the cooling conduit 416 at a uniform rate of 10 m/sec, it will require 42.50 hours or 1.77 days for the water to pass completely through the 1,530 km long tunnel. (The inside walls of the stainless steel cooling conduit are made extremely smooth to keep water friction to a minimum.) When the cold water finally emerges at sea level (near Eureka, Calif.) its temperature should not exceed 30° C. (86° F.). Thus, this cooling system will provide a very effective heat sink for cooling the entire accelerator—even when operating at extremely high power levels.

When the cooling water is discharged from the cooling conduit at Eureka, Calif., the water will have descended from an elevation of 4,348 m (14,265 ft) to sea level. The gravitational potential energy difference between the water inlet and outlet points is determined by equation (3) where d=4348 m. Consequently, the water leaving the cold water conduit 416 at sea level has a gravitational energy density of $gd = 9.8 \times 4348 = 42,610$ Joules/kg. As in the case of my gravity powered hydraulic boring machine, this gravitational energy density appears in the form of water pressure—hydrostatic water pressure given by $\rho gd$ where $\rho$ denotes the density of the cooling water (1,000 kg/m³). Hence, the water pressure at the discharge conduit will be $4.26 \times 10^7$ N/m² (421 Atm). However, unlike the hydraulic boring machine, this gravitationally compressed water does not have to be returned to the other end of the tunnel. Consequently, the high pressure discharge water can be utilized for generating electric power by feeding it into a bank of high pressure hydroelectric water turbines. With this design strategy, the cooling water will not only provide the 1,530 km long electromagnetic linear accelerator with a cool operating environment, but it will also provide a means for generating all of the electrical power required to operate it!

Although I shall give a more detailed analysis of the system's total electric generating capacity later on in this disclosure, it will be helpful to at least determine how much electric power can be generated from the pressurized water discharged from the cooling conduit by feeding it into a bank of high pressure hydroelectric turbine generators. The amount of electric power P(watts) that can be generated by a hydroelectric turbine operating with a water head h is given by the equation $$P = gh\dot{m}\eta \qquad (8)$$

where $\dot{m}$ denotes the mass flow rate of the water and where $\eta$ denotes the operating efficiency of the turbine. For state-of-the-art high pressure hydroelectric turbines $\eta = 0.95$. Consequently, the amount of electric power $P_c$ that can be generated by feeding the high pressure cooling water discharged from the accelerator's cooling conduit into a bank of hydroelectric water turbines is given by $P_c = gh\dot{m}_c\eta = 42610.40 \times 190,694.67 \times 0.95 = 7.719 \times 10^9$ watts = 7.719 GW. This represents a concentration of electric power production on an unprecedented scale. It is more electric generating power than the combined outputs of 6 Hoover Dams operating at maximum capacity. Electric power generation on a scale this large actually represents much more electric power than would be required to operate the electromagnetic accelerator—even when launching high mass vehicles at short time intervals. Consequently, the excess electric power not used by the accelerator is fed into the U.S. electric power grid and sold as commercial power to various utility companies.

Since all of this enormous electric power is generated by harnessing gravitational potential energy, the accelerator is really powered by the Earth's gravitational field—the system is really a gravity powered space transportation system! But all of this electric power is generated as a side benefit from the cooling system where the primary goal is to provide a cool operating environment for the electromagnetic accelerator. If the cold water system is able to generate all of this electric power as a helpful side benefit, just imagine how much electric power could be generated from the hot water system that is designed primarily for generating electric power!

In order to keep this part of my disclosure focused on the systems designed for installation inside the tunnel, I shall postpone further discussion on the production of electric power. This subject is extremely important and requires detailed analysis. It is one of the most important components of the proposed transportation system.

Since the entire tunnel is absolutely straight, the annular hot and cold water conduits 392,416 could be constructed in relatively long prefabricated sections, rolled into the tunnel, and rapidly assembled therein. Each section could be mass produced in special factories built near the tunnel entrance. This would avoid having to transport the sections long distances from remote factories. The workers assembling these sections inside the glass lined tunnel would have to wear special suits designed to insulate them from the hot tunnel environment. Large movable temporary cooling systems could also be provided for the workers inside the tunnel.

After constructing the hot and cold water conduits and turning on the water, a cool working environment will be created all along the 1,530 km long accelerator corridor 432. The next major component to be installed will be optically straight cylindrical vacuum tube 434. As illustated in FIGS. 17 and 18, this vacuum tube 434 is centrally mounted inside the accelerator corridor 432 with its longitudinal central axis coincident with the tunnel's central axis In the preferred embodiment, this vacuum tube 434 is constructed with 5 cm (1.97 in) thick, continuously drawn, seamless, pure silica glass with an outside diameter of 6.20 m (20.34 ft) and an inside diameter of 6.10 m (20.01 ft. Thus, the inside surface 424 of the cooling conduit 416 and the outside surface 436 of the vacuum tube 434 is separated by a 2.66 m (8.73 ft) gap or annular region 438. The vacuum tube 434 is mounted on and attached to the water cooling conduit 416 by a plurality of 2.66 m (8.73 ft) long stand-off rods 440. These rods 440 are attached to the glass vacuum tube 434 by fusing techniques which do not penetrate the glass walls of the vacuum tube 434.

Each stand-off rod 440 is equipped with a computer controlled system 442 by which the length of each rod 440 can be increased or decreased by minute amounts. With these systems 442, it is possible to keep the vacuum tube in perfect alignment accurate to 0.01 cm (0.004 in) over its entire 1,530 km length even if the tunnel walls shift out of alignment due to small movements in the surrounding rock. A system of laser beams 444 are propagated along parallel paths all around the circumferential periphery of the vacuum tube 434 in order to detect any part of the tube that falls out of alignment. The information generated by this detection system is transmitted to a computer and processed. Corrective control commands are generated and transmitted to the various servo controlled length changing systems 442 which automatically bring the vacuum tube 434 back into perfect alignment. This computer controlled laser alignment system is similar to the one disclosed in my U.S. Pat. No. 4,148,260, entitled "High Speed Transit System", filed Apr. 30, 1976.

Almost all of the electrical components and systems associated with the electromagnetic linear accelerator are mounted inside the 1,530 km long, 2.66 m thick, annular region 438 located between the cooling conduit 416 and the vacuum tube 434. Therefore, all of the cylindrical lateral walls enclosing the entire electromagnetic linear accelerator are in direct thermal contact with vast quantities of cooling water. The cooling conduit therefore provides a powerful heat sink for these electrical components and systems that may get very hot when local electric power surges of hundreds of kilowatts are discharged into the accelerating coils.

In the preferred embodiment, the electromagnetic accelerator is composed of 18 individual linear synchronous motors operating in parallel. They are mounted 360° around the external walls of the evacuated launch tube, in 20° intervals. Since it will be very difficult to provide routine maintenance for all of the electrical systems associated with the accelerator throughout the 1,530 km long tunnel, the accelerator design will incorporate the most reliable and maintenance-free hardware available. Thus, instead of using homopolar polar energy storage and generating systems for energizing the driving coils, an enormous capacitor bank 446 is used. Unlike homopolar generators, large energy storage capacitor systems have no moving parts and cannot wear out. If precautions are taken to avoid over-charging, their useful life expectancy can last indefinitely. This capacitor bank 446 will be installed inside the annular region 438 between the cooling conduit 416 and the vacuum tube 434. Thus, its geometry will be thick walled cylindrical, with the axis of the vacuum tube 434 extending along its longitudinal central axis. Its outside surface will be adjacent the water cooling conduit with a radius of 5.76 m (18.90 ft). The inside radius will be 4.66 m (15.29 ft). Consequently, the transverse cross sectional area of the capacitor bank 446 will be 36.01 m$^2$. Therefore, since its length is 1,530 km, its total volume will be $5.51 \times 10^7$ m$^3$. Assuming that the maximum stored energy density of the capacitors is $5 \times 10^5$ Joules/m$^3$, the total energy storage capacity of the bank will be about $2.75 \times 10^{13}$ Joules. This capacitor bank will represent the primary energy storage system of the accelerator. The detailed design, construction and operating principles of these high energy pulsed storage capacitors which comprise the primary energy storage system can be found in Chapter 1, pp. 1–51, of the book, *High Speed Pulse Technology Vol. III, Capacitor Discharge Engineering*, Academic Press, New York, 1976, by Frank B. A. Früngel. A detailed technical description of high power capacitor - inductor coil (drive coil) pulse systems can be found in the paper "Pulsed Power Packs A Punch," *IEEE SPECTRUM*, March, 1985, pp. 59–66, by W. F. Weldon. There will also be a large superconducting magnetic energy storage system constructed near the entrance of the accelerator. The superconducting system will be utilized as an external high voltage electric power source for feeding current to the capacitor bank to keep it fully charged. The details of this system will be described later.

In the preferred embodiment, the electromagnetic driving coils 448 of the accelerator and the superconducting vehicle propulsion coils 450 are rectangular with a slight curvature in the transverse direction so that they can be mounted flush against the external walls of the cylindrical vacuum tube 434 and against the internal walls of the cylindrical launch vehicle respectively. As is well known in the design of coaxial electromagnetic accelerators, the drive coils 448 are pulse coils operating at ambient temperature. The length of the driving coils 448 and corresponding vehicle coils 450 are the same. FIG. 19 is a schematic transverse cross section of the vacuum tube 434 illustrating the electromagnetic driving coils 448 mounted around its external circumferential periphery. FIG. 20 is a perspective longitudinal view illustrating rows of driving coils 448 opposite rows of vehicle propulsion coils 450 separated by the vacuum tube 434. As shown in these figures, the vehicle 452 is maintained such that each row of superconducting vehicle coils 450 is precisely aligned directly opposite the corresponding row of drive coils 448 during the entire acceleration process. In order to accomplish and maintain this rotational alignment, an active vehicle roll control system must be provided. The design of this system is suggested by viewing the transverse cross section of FIG. 19 as that of an ordinary reversible rotating synchronous electric motor. When this "rotating motor" is turned on, the armature (which is represented by the vehicle) will be rotated either in the clockwise or counterclockwise direction. tion.

In order to carry out this design concept for providing the vehicle with active roll control, each row of driving coils 448 will also be designed to generate a small amount of positive or negative rotating torque as in the design of ordinary rotating synchronous electric motors. This will be relatively easy to achieve as it involves adding an additional coil winding 454 on the driving coils 450 such that the relatively small magnetic field that it generates for producing roll torque is superimposed on the basic magnetic field that produces forward vehicle thrust. These rows 456 are then wired to each other as in the design of ordinary rotating synchronous motors. These new coil windings 454 are independent of the basic propulsion windings 458 so that a completely independent roll control system is provided along the entire accelerator. This active roll control system includes various vehicle roll sensors 450, automatic feed-back servo controls 462 and other electrical subsystems that are well known in the art of automatic control systems.

This technique of varying the resultant thrust vector of the driving electromagnets 448—by adding extra, independently controlled, coil windings 454—can be extended such that the accelerating electromagnets 448 not only provide both forward thrust and dynamic roll stability, but also levitation and translational guidance as well. By adopting this design technique, the electromagnetic accelerator will be able to exert tremendous forward thrust on the vehicle while simultaneously providing roll stability, levitation, and lateral guidance. The vehicle will be accelerated such that its longitudinal central axis is guided along the precise center line of the vacuum tube without deviating more than 1.0 cm (0.39 in) in any direction. A separation distance of 5 cm (1.97 in) is maintained between the outside walls of the vehicle and the inside walls of the vacuum tube 434. The separation distance between the driving coils 448 and the vehicle is 10 cm (3.94 in). For a detailed technical exposition of linear synchronous motor designs that combine propulsion and levitation utilizing the same vehicle coils, see the article "Characteristics of Superconductive Magnetic Suspension and Propulsion for High-Spaced Trains," *IEEE Proceedings*, Vol. 61, No. 5, May 1973, pp. 579–586 by E. Ohno. (This issue of the *IEEE Proceedings* is devoted to magnetic propulsion and levitation of high speed ground vehicles and contains many technical articles on this subject.) The detailed construction and fabrication of these superconducting coils 450 were described by J. R. Powell and G. T. Danby in their paper "Magnetic Suspension for Levitated Tracked Vehicles," *Cryogenics*, June 1971, pp. 192–204. Aside from the fact that the number of superconducting propulsion coils mounted on the spaceplane is much greater than the number used to propel the vehicle described in the Powell paper, and that there are 18 individual rows, instead of only 2, the basic design and operating principles of these coils are essentially identical to that described in this paper. This paper also gives a detailed description of the required cryogenic cooling system (pp. 201–203).

The driving coils 448 of the accelerator are connected to individual capacitors in the capacitor bank via electric cables 464 interfaced with switching circuits 466. The switching circuits 466 are actuated by photoelectric vehicle position sensors 468 and magnetometers 470 for sensing vehicle coils such that when a vehicle coil approaches a certain drive coil, a capacitor is discharged into the drive coil to provide a strong attractive magnetic pulling force on the vehicle coil. The capacitor and driving coil are tuned electrically such that as the vehicle coil passes by the driving coil, the current in the driving coil is reversed thereby changing the direction of its magnetic field, producing a strong repulsive magnetic pushing force on the vehicle coil for a pull-push effect. The roll control system operates in a similar manner by generating small pulsing sequences around the tube instead of along the tube (as in rotating synchronous motors). The entire accelerating process is extremely smooth and essentially free of all transverse and rolling motion.

Each switching circuit 466 is controlled by a built-in microprocessor 472 that receives input signals from the photoelectric vehicle position sensors 468, from the magnetometers 470, from vehicle roll sensors 460, and from a master central control computer located outside the tunnel. This enables the microprocessor 472 in each switching circuit 466 to be pre-programmed so as to enable the vehicle to leave the end of the launch tube with a very precise, pre-calculated launch velocity $V_o$ essentially independent of vehicle mass.

The design and operating principles of the optical switching circuit 466 is similar to the one described in FIG. 2, page 500, of E. H. Lemke's paper, "Magnetic Acceleration of Interstellar Probes," *Journal of the British Interplanetary Society*, Vol. 35, pp. 498-503, 1982. The high power, fast acting thyratron switches used in the circuit are described in *High Speed Pulse Technology, Vol. III, Capacitor Discharge Engineering*, Academic Press, New York, 1976, by Frank B. A. Früngel, pp. 52-56. An excellent technical overview of high power, fast action switches for pulse power applications can be found in the paper "A Review of Opening Switch Technology for Inductive Energy Storage," *Proceedings of the IEEE*, Vol. 72, No. 8, Aug. 1984, pp. 1019-1040.

The capacitor bank 446 is recharged by high voltage superconducting electric power cables 474 that extend all the way through the accelerator corridor 432. A large complex of hydroelectric and geothermal power plants is constructed near the entrance to the accelerator (near Eureka, Calif.) that supplies all of the power required to operate the accelerator.

There are no active or passive components of the accelerator that are mounted inside the vacuum tube 434. Thus, the interior of the vacuum tube 434 is absolutely clear of any material objects that might separate from the inside walls of the tube and fall into the path of an accelerating vehicle. Moreover this also enables the vacuum tube to remain free from any penetrations (such as electrical conduits) that would otherwise have to pass through its walls. Such penetrations, even though made air-tight, would cause some leakage. Consequently, since the vacuum tube will have 5 cm thick walls of pure silica glass, continuously drawn, seamless and without any penetrations, it will be virtually 100% leakproof. This is very important from a practical point of view since the entire 1,530 km long, 6.20 m (20.34 ft) diameter vacuum tube will be maintained at an extremely low pressure that does not exceed approximately mately $10^{-6}$ torr. Once the initial vacuum is established inside the tube, it can be maintained without any degradation almost indefinitely. Any pumping necessary to maintain the vacuum will be performed at each end of the tube. This very low tube pressure allows an electromagnetically propelled launch vehicle to be accelerated smoothly inside the tube to extremely high velocities essentially without experiencing any aerodynamic drag or buffeting even though the tube walls are only 5 cm (1.97 in) from the vehicle.

Although it may appear to be extremely difficult to evacuate the 1,530 km long, 6.2 m diameter tube to the required operating pressure using thousands of vacuum pumps mounted all along the tube, this is not the case. In fact, the entire tube can be evacuated without using any vacuum pumps. This is accomplished by utilizing the accelerator itself as a giant vacuum pump.

A specially designed free-moving, giant air-tight piston, with a diameter exactly equal to the inside diameter of the launch tube, can be designed and constructed to move through the entire tube, driven by the powerful magnetic forces of the linear motors. Since the tube is perfectly straight, this piston could be extremely long (e.g., exceeding 200 m) with thousands of superconducting propulsion coils (similar to those mounted on the spaceplane) to provide an enormous driving force. After the piston is inserted into the tube, an air-tight door directly behind it is closed. The contacting surface area between the lateral walls of the piston and the inside walls of the tube is very great such that as the piston is driven through the tube, the air in front of it is simply forced out through the other end leaving the tube completely evacuated behind the piston. The piston could be driven completely through the tube in 24 hours. An air-tight door mounted near the end of the tube is closed preserving the vacuum when the piston is adjacent the door. The piston is then driven back through the tube to the entrance and withdrawn through an air-lock. This evauaction process is extremely simple. The piston could be stored near the entrance so that it can be used to reevacuate the tube if such reevacuation is needed.

FIG. 21 is a schematic longitudinal cross section near the beginning of the accelerator tube 434 showing the air-tight piston 475 moving away from an air-tight pressure door 488. This door 488 is mounted on an air-lock 482 located at the entrance of the accelerator. The evacuation process begins by introducing the piston 475 into the tube 434 via the air-lock 482. After the piston 475 is moved completely inside the tube 434, the air-lock door 488 is closed and the piston 475 is slowly moved backward a short distance until its perfectly flat rear face 477 contacts the perfectly flat forward face 479 of the closed pressure door 488. A system of by-pass air escape conduits 481 passing through the door 488 allow the air trapped between the two faces 477, 479 to escape into the air-lock 482 when the two faces 477, 479, are brought into physical contact with each other. After all of the air behind the piston 475 between the two faces is forced out of the tube 434, the escape conduits 481 are closed and the piston 475 is driven forward by the driving coils of the electromagnetic accelerator. The air is then forced out of the tube through the other end which is initially left open to the outside atmosphere.

The piston 475 is 200 m long with 18 rows of superconducting propulsion coils 483 that are 198 m long and embedded all around the piston just under its surface. The driving coils on the electromagnetic accelerator can drive the piston 475 forward (or backward) with an enormous traction force (thousands of tons) that can far exceed the maximum atmospheric pressure force acting on its front face 485 (which will be about 320 tons at sea level). The piston 475 is made air-tight by thousands of transverse gasket rings 487. Any air molecules that manage to slip past the first gasket ring 489 are automatically removed by vacuum conduits 491 mounted between adjacent gasket rings. These conduits 491 are connected to cryopumps 493 mounted inside the piston that maintain a pressure of about $10^{-5}$ torr. Thus, as the piston 475 is driven through the tube 434, virtually no gas molecule can get around it. Hence, the tube behind the moving piston will be left almost perfectly evacuated with a pressure significantly below $10^{-6}$ torr as is found in deep space.

When the piston 475 approaches the end of the tube 434, another air-tight pressure door, similar to the door 482, is closed. The piston 475 is slowly driven forward, driving out essentially all gas molecules trapped between the adjacent faces by escape conduits passing through this door. When the two perfectly flat faces are in contact flush up against each other, the escape conduits are closed, and the piston is driven back through the tube 434 which is now completely evacuated between the two doors mounted at each end. When the piston 475 arrives back at the entrance (which would be only a few hours after leaving the other end) it is withdrawn through the air-lock 482.

Although the evacuation piston 475 is completely automated and controlled by the central control computer, it is manned by a crew of about 20 technicans that monitor the various systems and perform minor repair and maintenance work. Since the outside diameter of the piston is 6.20 m (20 ft) its interior will be very spacious.

It is important to point out and emphasize that since it would ordinarily require thousands of vacuum pumps operating continuously for hundreds of days to evacuate the 1,530 km long accelerating tube down to a pressure of only $10^{-4}$ torr—and nearly impossible to reach a vacuum of $10^{-6}$ torr—this tube evacuation system is an important feature of the invention.

A plurality of traveling closed-circuit TV monitors 476 are also provided that can move along tracks 478 extending throughout the entire accelerator corridor for observing various systems of the accelerator. A small very high speed, rail transportation system 480 is also provided along the bottom and along each side of the accelerator corridor adjacent the vacuum tube 434 for transporting repair personnel and/or equipment to any malfunctioning system.

In order to enable a launch vehicle to enter the vacuum tube 434 from a loading platform in the open atmosphere, the entrance passageway leading into the vacuum tube 434 is equipped with a long air-lock. Referring to FIGS. 22 and 23 this air-lock 482 comprises a relatively long chamber 484 with air-tight pressure doors 486, 488 at each end. A launch vehicle 490, that is to be launched by the electromagnetic accelerator, is rolled into the chamber 484 from the outside atmosphere by passing through the first pressure door 486. The vehicle 490 is supported by a small train of heavy duty wheeled support vehicles 492 moving over a plurality of parallel railroad tracks 494. Before the first pressure door 486 is opened to admit the launch vehicle 490, the pressure inside the chamber 484 is returned to ambient atmospheric pressure while the second pressure door 488 is kept closed so as to prevent any air from entering the vacuum tube 434. After the vehicle 490 is rolled into the air-lock, the first pressure door 486 is closed and a plurality of very large, high capacity, vacuum pumps 496 are started in order to evacuate the chamber 484. When the pressure inside the chamber 484 falls to about $10^{-1}$ torr, a second plurality of very low pressure vacuum pumps 498 are started to reduce the pressure to a level slightly below that of the vacuum tube 434. These low pressure vacuum pumps 498 may be turbomolecular pumps, diffusion pumps, or cryogenic vacuum pumps. When the pressure inside the chamber 484 falls below that of the vacuum tube 434, the second pressure door 488 is opened. A second plurality of very low pressure vacuum pumps 500 are also located on the other side of the second pressure door 488. These pumps 500 are connected to the inside end of the vacuum tube 434 and operate continuously, 24 hours a day in order to compensate for any air leakage that passes into the main vacuum tube 434 from the pressure door 488.

The air-lock chamber 484 is surrounded by 18 rows of initializing electromagnets 502 which are essentially extensions of the driving coils 448 of electromagnetic accelerator mounted around the launch tube 434. When the precalculated calculated launch time arrives, these initializing electromagnets 502 are energized, and the vehicle 490 is slowly lifted off the vehicle support train 492 and accelerated forward into the main vacuum tube 434 via non-contacting magnetic forces. The acceleration build-up inside the launch tube 434 is exceptionally smooth and follows a precise, pre-calculated acceleration profile designed to give the vehicle an exact, pre-calculated, launch velocity $V_o$ at the end of the vacuum tube 434.

As soon as the vehicle 490 is accelerated into the main vacuum tube 434, the second pressure door 488 is closed, and sealed air-tight. A plurality or air conduits 504 leading to the open atmosphere are opened via valves 506 and the pressure inside the air-lock 484 is returned to ambient atmospheric pressure. A plurality of low pressure air turbines 508 are mounted inside the conduits 504 for generating electricity from the pressure differential between the ambient atmosphere and the air-lock 484. The electrical energy generated there from is fed into a flywheel energy storage system 510. After the air-lock reaches ambient atmospheric pressure, the first pressure door 486 is opened and the vehicle support train 492 is rolled out into the atmosphere where it is reloaded with another launch vehicle. This procedure for loading and launching the space vehicles in the electromagnetic accelerator can be completely automated. The electrical energy used to pump out the air-lock can be obtained from the electrical energy generated by letting air into the air-lock. A relatively small amount of additional electrical energy is supplied from an external source to compensate for the energy lost due to conversion inefficiencies The end of the evacuated launch tube 434 is sealed by a very thin diaphragm having high magnetic susceptibility such that by creating a magnetic field at the end of the tube, the inward force acting on the diaphgram generated by atmospheric pressure is exactly balanced by the outward magnetic force generated by the magnetic field. Since the physical mass of the diaphragm does not have to support the atmospheric pressure force (as in prior art diaphragm vacuum seals) its mass can be very low such that when the nose cone on the spaceplane breaks through it at hypervelocity, it suffers no damage. Since the atmospheric pressure force acting on the 6.20 m diameter diaphragm is hundreds of tons, this design feature of the invention is very important.

As shown in FIG. 24, the diaphragm 537 is mounted in airtight engagement across the end of the evacuated launch tube 434 and immersed in a magnetic field 523 of about 5 T generated by a solenoid 518 such that the magnetic force acting on the diaphgram is exactly balanced by the inward pressure force of the ambient atmosphere. The air-tight pressure door 512, mounted near the end of the tube, is closed immediately after the vehicle moves past it. The distance between the door 512 and the end of the vacuum tube 514 is taken to be about 400 m. Consequently, assuming that the air rushes into the end of the tube immediately after the vehicle exits, it will require about one full second after the vehicle clears the door 512 before any atmospheric gas molecules can actually reach it since they will be moving toward it with a relatively low velocity. By constructing the air-tight sliding door 512 with a material such as Kevlar with a very high strength-to-weight ratio, and by constructing the actuator system with a plurality of fast acting electromagnetic linear motors operating in parallel, or by pistons driven through cylinders by detonating explosive gas cartridges, it will be possible to close the door during this one second time period. The triggering system would use an optical sensor that determines the exact instant when the spaceplane clears the sliding door 512. The details of this very fast acting door closing system is well known in the art and omitted from this disclosure. After a vehicle is accelerated through the tube and breaks through the diaphragm 537 and passes into the atmosphere, a new diaphragm is mounted and the volume enclosed between the diaphragm and the closed pressure door 512 is re-evacuated via a plurality of pumps 534. The door 512 is opened just before another vehicle is launched.

FIG. 24 also illustrates a 7 m (23 ft) diameter water conduit 538, which feeds water drawn from a system of nearby reservoirs, into the hot and cold water conduits of the accelerator. As is shown in FIG. 24, the annular hot and cold water conduits 392,416 begin near the end of the driving coils 448 just inside the pressure door 512. The water feeder conduit 538 delivers the water at a flow rate of 358.71 m$^3$/sec.

FIGS. 25 and 26 are schematic longitudinal and transverse cross sections respectively of an electromagnetically propelled reusable launch vehicle or spaceplane 540 in its launch configuration with its wings 542, tail surfaces 544 and jet engine ducts 546 retracted. FIG. 27 is a plan view corresponding to FIGS. 25 and 26. In order to illustrate the retractable elements more clearly, the superconducting vehicle coils are not shown. These coils were described in FIGS. 19 and 20. As described above, a detachable hypervelocity nose cone 78 is mounted around the forward section of the spaceplane 540 for reducing drag while traversing through the atmosphere at very high Mach numbers. A conventional chemical rocket engine 548 is mounted in the rear of the spaceplane 540 for carrying out various orbital maneuvers after the vehicle is catapulted into space by the electromagnetic accelerator. The chemical propellants (liquid oxygen-liquid hydrogen) are stored in cryogenic fuel tanks 552 in front of the rocket engine 548. These tanks 552 are detachable and come in various sizes depending on the particular mission. For missions to low Earth orbit, very little rocket fuel is required and the tanks 552 are relatively small. For missions to geosynchronous orbit, the small fuel tanks are removed on the ground and replaced with larger tanks prior to launch.

As is illustrated in FIGS. 25, 26 and 27, the spaceplane 540 is divided into four large payload bays 556, 558, 560 and 562. The cockpit 564 and crew quarters 566 are located in the forward section of the fuselage. The first payload bay 556 is located directly behind the crew quarters 566 and is separated from it by a pressure bulkhead 568 and pressure doors 570. This payload bay 556 is cylindrical with an inside diameter of about 5.50 m (18.04 ft) and a length of 60 m (196.85 ft). The second and third payload bays 558,560 have semi-circular transverse cross sections and are located one above the other. They are separated by a 2.5 m (8.20 ft) thick wing cavity 572. This cavity 572 is 60 m (196.85 ft) long, 5.50 m (18.04 ft) wide and contains the wings 542 stored in a side-by-side configuration during launch. The fourth payload bay 562 is located behind the second and third payload bays and separated from them by another pressure bulkhead 574 and pressure door 576. This payload bay 562 is also 60 m (196.85 ft) long and is similar to the first payload bay 556.

In order to prevent the strong magnetic fields of the superconducting vehicle thrust coils 450 from entering the payload pays, a system of secondary superconducting magnetic shielding coils 554 are mounted inside the lateral wall of the double hull 578 and adjacent the thrust coils (FIG. 19). The design of magnetic shielding coils are well known in the art of magnetics. (See, for example, "Magnetic Shielding For Magnetically Levitated Vehicles, *IEEE Proceedings*, Vol. 61, No. 5, May 1973, pp. 598–603, by Y. Iwasa.) The cryogenic cooling system provided for cooling the superconducting propulsion coils is similar to that described on pages 201–203 by J. Powell and G. Danby in their paper, "Magnetic Suspension For Levitated Tracked Vehicles," *Cryogenics*, June 1971.

The rear section 580 of the fuselage contains two other cavities 582 when the tail surfaces 584,586 are stored. The rear section is 40 m (131.23 ft) long and contains the rocket engine 548, fuel tanks 552 for the rocket engine, six high thrust air-breathing jet engines 550, fuel tanks 588 for the jet engines 550, and various engine support systems 590.

For missions requiring a large amount of on-board vehicle propulsion, removable auxiliary oxygen-hydrogen fuel tanks 592 can be temporarily mounted inside the fourth payload bay 562 adjacent the rear section 580. In some missions requiring a great deal of rocket fuel, the entire 60 m long fourth payload bay 562 can be fitted with fuel tanks. The maximum oxygen-hydrogen fuel carrying capacity of this payload bay is approximately 1,000,000 kg. When the spaceplane is loaded with rocket fuel in this configuration, it could serve as a reusable refueling station or tanker vehicle orbiting the Earth, the Moon or some other planet or celestial body. The additional electrical energy required by the electromagnetic accelerator to launch the tanker vehicle is supplied by the secondary superconducting inductive energy storage system located near the beginning of the accelerator.

Besides having a conventional chemical rocket engine 548, the vehicle's space propulsion system also includes six high power electron cyclotron resonance plasma engines 594 mounted around the central rocket nozzle 596. Each of these electromagnetic engines are 1.5 m (4.92 ft) in diameter and generate an effective propulsive power of 5 MW. A transverse cross section of the conventional rocket nozzle 596 and the six auxiliary low thrust electromagnetic engines 594 mounted around it is shown in FIG. 28. The plasma engines can either use argon or nitrogen propulsive fuel. When the engines are using argon, the effective specific impulse is 8,000 sec and when using nitrogen, the specific impulse is 6,000 sec. The exhaust velocities corresponding to these two propulsive fluids are 78.40 km/sec and 58.80 km/sec respectively. The combined, total effective thrust of all six engines is 765N (172 lbs) with argon and 1,020N (229 lbs) with nitrogen. The electric power source used to operate the plasma engines is derived from the thousands of high field superconducting vehicle propulsion coils 450 and superconducting magnetic shielding coils 554 mounted inside the vehicle's pressure hull 578 surrounding the payload bays. Thus, the propulsion coils 450 are not only used to launch the vehicle from Earth by magnetic forces between the drive coils 448 of the electromagnetic accelerator but also as inductive energy storage systems for operating the vehicle's plasma accelerator engines, for auxiliary space propulsion as well. The DC electric current is extracted from the superconducting coils 450 and 554 via electrical systems 598 and fed into high efficiency Magnetron or Amplitron microwave generators 600 located in the rear section 580 of the vehicle. The overall electric-to-microwave conversion efficiency of these generators can be as high as 95%. The microwaves are fed into a system of high power waveguides 602 and fed into the plasma accelerators 594. By utilizing the technology of superconductivity, the entire electric power system associated with the plasma accelerators can be designed relatively small and compact. The detailed design, construction and operating principles of these high power engines 594 (using superconducting drive coils) can be found in "Solar Powered, Self-Refueling, Microwave Propelled Interorbital Transportation System," AIAA 18th Thermophysics Conference, June 1-3, 1983, Montreal, Canada, AIAA paper No. 83-1446 by M. A. Minovitch.

Additional vehicle support systems 604 are located in the vehicle's forward section 606 immediately in front of the crew quarters 566. A relatively large central liquid helium refrigeration system 608 is mounted in this forward section 606 for providing refrigeration for the thousands of superconducting coils (FIGS. 19,20) and other flight support systems. The vehicle superconducting propulsion coils 450 are only mounted around the four payload bays where the fuselage is cylindrical with an outside diameter of 6 m (19.69 ft) and a length of 180 m (590 ft). The forward landing gear 610 of the spaceplane 540 is also stored in this forward fuselage section 606. A plurality of main landing gears 612 are stored in the lower central payload bay 560.

Electrical systems 614 are also provided for simultaneously charging all of the vehicle's superconducting coils with DC current prior to launch. After the vehicle is launched, these systems 614 can also be used to extract the current and use it for operating the vehicle's electrical systems. The total amount of inductive energy stored in these superconducting coils is enormous. Thus, the vehicle coils are not only utilized for launching the vehicle in the electromagnetic accelerator, but also as a vast on-board inductive energy storage system for operating essentially all of the required electrical systems. Since this system is capable of providing very high power densities over extended time periods, it is also utilized as a basic power source for operating the high power plasma accelerators 594 for providing extremely high $I_{sp}$ auxiliary vehicle propulsion and/or station keeping.

In the particular vehicle design shown in FIGS. 25,26 and 27, the forward payload bay 556 is divided into two levels 556A and 556B and designed for carrying passengers. The rear payload bay 562 is designed for carrying bulky, structural type cargo. Approximately 400 passengers can be accomodated on each level in the passenger bays 556A and 556B, thereby providing a total passenger capacity of 800 (in addition to non-passenger payload). The passenger seats 616 are movable and specially designed to support each passenger in a standing position during the launch such that the acceleration forces are perpendicular to the longitudinal axis of the standing passengers. This seat design is adopted because the human anatomy can withstand maximum linear acceleration when a person is in a prone position and the acceleration is applied in a transverse direction perpendicular to the person's longitudinal axis. In this position, the average human body, in good health, should be able to withstand up to 8 g's of linear acceleration for three minute time periods without experiencing any physiological failures. (See "The Physiological Effects Of Transient Mechanical Forces: A Review Of Their Relevance To Astronautics," *Journal Of The British Interplanetary Society*, Vol. 17, 1959-60, pp. 290-293, by J. C. Guignard.) The acceleration required for various missions is given in Table 6. An acceleration of 8 g is considered maximum. Flights to low Earth orbit will only require 2.56 g.

The most critical phase of any electromagnetically propelled spaceplane will be its ascent through the Earth's atmosphere after launching. This is because when the vehicle is accelerated to its maximum velocity $V_o$ at the end of the launch tube, it is immediately injected into the atmosphere at a relatively low altitude where the density is very high. However, when the spaceplane is returning to Earth at the end of its mission, it reenters the atmosphere at very high altitudes where the density is very low. Thus, the vehicle is able to slow down (via aerodynamic breaking) to much lower velocities before reaching low altitudes where the density is high. This is obviously not possible during the launch phase. Consequently, the aerodynamic forces and heating will be much more severe during the ascent out of the atmosphere than the descent into the atmosphere.

The problem of designing large vehicles for hypervelocity flight through the lower regions of the Earth's atmosphere is not easy. In this flight regime, the thermal barrier will be almost impossible to overcome. There is nothing in the prior art of high speed aircraft design that can be used to crack this barrier. It represents a totally new frontier for manned high speed flight through the atmosphere. Unless this new frontier can be conquered, an electromagnetically propelled manned space vehicle capable of being catapulted from the Earth's surface directly into orbit will be very difficult, if not impossible, to achieve.

Table 8 describes how long an electromagnetically propelled spaceplane will be required to fly through the atmosphere at hypersonic speeds before it gains sufficient altitude to leave the atmosphere. The analysis was based on the particular system proposed herein where the launch angle (i.e., elevation angle at launch) $\theta_o=6.89°$ and where the launch altitude $h_o=4,348$ m (14,265 ft). Four different launch velocities $V_o$ are analyzed corresponding to four different missions: Direct flights to low Earth orbit (LEO) with an inclined circular parking orbit altitude of 200 km ($V_o=8.763$ km/sec; direct flights to geosynchronous orbit ($V_o=11.421$ km/sec); direct flights to Mars or Venus with hyperbolic excess velocity $V_\infty=4.00$ km/sec ($V_o=13.043$ km/sec); and direct flights to Jupiter with hyperbolic excess velocity $V_\infty=8.370$ km/sec ($V_o=15.489$ km/sec). Since aerodynamic drag decreases very rapidly above an altitude of 40,000 m (131,234 ft) it will be assumed that the spaceplane leaves the atmosphere when it reaches this altitude.

seconds after it leaves the launch tube. However, it only requires about 16.5 seconds to leave the atmosphere for missions to Jupiter. But these flight times are sufficiently long to severely damage—if not totally destroy the vehicle—unless it is able to penetrate into the thermal barrier in low altitude hypersonic flight. Of course, if the launch angle $\theta_o$ were steeper, the flight time through the atmosphere would be significantly shorter and the effect would be more like exposing the vehicle to a sudden thermal pulse. But with a shallow launch angle of only 6.89°, the effect is more like exposing the vehicle to a continuous, ultra high temperature blow torch. Thus, in order for the spaceplane to be able to reach outer space, it will have to be capable of achieving controlled, long distance, aerodynamic flight through the atmosphere at hypervelocities. Since it is impossible to increase the launch angle by any significant amount because of the acceleration barrier set by the human anatomy, the spaceplane will have to be capable of penetrating at least a little way, into the hypervelocity thermal barrier. However, I shall introduce herein, a spaceplane design that is not only capable of penetrating "a little way into the thermal barrier" but rather a design that is capable of penetrating completely through it—a design that fundamentally cracks the thermal barrier wide open and enables the spaceplane to achieve controlled low altitude hypervelocity flight through the atmosphere over arbitrarily long time periods and essentially without any speed limits!

Since the spaceplane will be designed to be completely reusable after each flight with a long operational life and with low maintenance, it would be very desirable to avoid any direct contact between the spaceplane and any shock waves that it generates while traversing through the atmosphere during launch and reentry. This is because the shock waves are generated by hypervelocity flight with Mach numbers exceeding 30. Consequently, the resulting gas temperatures in the shock envelope, close to the apex, exceed 30,000° K. It

TABLE 8

Flightpath Altitude h Versus Elapsed Time T For An Electromagnetically Propelled Spaceplane Traversing The Earth's Atmosphere On A Ballistic Trajectory With Various Launch Velocities $V_0$ Corresponding To Direct Flights To Low Earth Orbit (LEO) Geosynchronous Orbit, And Interplanetary Missions To Mars, Venus and Jupiter Launch Angle $\theta_0 = 6.89°$   Launch Altitude $h_0 = 4,348$ m (14,265 ft)

| TIME T (sec) | LEO (200 km) $V_0 = 8.763$ | | GEOSYNCHRONUS $V_0 = 11.421$ | | MARS VENUS $V_0 = 13.043$ | | JUPITER $V_0 = 15.489$ | |
|---|---|---|---|---|---|---|---|---|
| | h (m) | h (ft) | h (m) | h (ft) | h (m) | h (ft) | h (m) | h (ft) |
| 2 | 6,474 | 21,241 | 7,128 | 23,387 | 7,530 | 24,704 | 8,138 | 26,700 |
| 4 | 8,648 | 28,372 | 9,989 | 32,774 | 10,817 | 35,488 | 12,076 | 39,621 |
| 6 | 10,869 | 35,659 | 12,931 | 42,424 | 14,208 | 46,615 | 16,162 | 53,026 |
| 8 | 13,137 | 43,100 | 15,952 | 52,337 | 17,704 | 58,085 | 20,396 | 66,915 |
| 10 | 15,452 | 50,696 | 19,054 | 62,513 | 21,305 | 69,898 | 24,776 | 81,286 |
| 12 | 17,815 | 58,448 | 22,236 | 72,952 | 25,010 | 82,053 | 29,303 | 96,138 |
| 14 | 20,225 | 66,354 | 25,497 | 83,652 | 28,819 | 94,550 | 33,977 | 111,472 |
| 16 | 22,682 | 74,414 | 28,839 | 94,615 | 32,732 | 107,387 | 38,796 | 127,284 |
| 18 | 25,185 | 82,629 | 32,260 | 105,839 | 36,748 | 120,564 | 43,762 | 143,575 |
| 20 | 27,736 | 90,998 | 35,760 | 117,323 | 40,868 | 134,082 | 48,873 | 160,344 |
| 22 | 30,334 | 99,521 | 39,340 | 129,069 | 45,091 | 147,937 | 54,129 | 177,588 |
| 24 | 32,979 | 108,197 | 42,999 | 141,074 | 49,418 | 162,131 | 59,530 | 195,308 |
| 26 | 35,670 | 117,028 | 46,738 | 153,339 | 53,847 | 176,663 | 65,075 | 213,501 |
| 28 | 38,408 | 126,011 | 50,555 | 165,863 | 58,379 | 191,532 | 70,764 | 232,167 |
| 30 | 41,193 | 135,148 | 54,451 | 178,645 | 63,013 | 206,736 | 76,597 | 251,304 |

Notice that for missions to low Earth orbit (LEO) the spaceplane will leave the Earth's atmosphere about 30 would be extremely difficult to provide a layer of nonablative thermal protection strong enough to withstand temperatures of this magnitude without melting, falling apart or suffering serious degradation after each flight. In order to solve this problem, the spaceplane is equipped with a very large detachable nose cone. This nose cone completely encloses the entire forward section of the spaceplane's fuselage and, because of its long tapered shape, reduces aerodynamic drag to very low levels. After the reentry is accomplished, and the spaceplane is slowed to relatively low velocities (by aerodynamic breaking) the nose cone is jettisoned prior to landing.

The main purpose of the nose cone will be to survive the flight out of and into the atmosphere and to protect the spaceplane. However, the most severe operating conditions will occur during the flight out of the atmosphere. Consequently, in the preferred embodiment, the design of the nose cone will also be towards the goal of achieving reusability. This presents a very difficult design problem because of the tremendous temperatures and pressures involved. (It would be impractical to provide another nose cone to protect this nose cone because at some point, the last nose cone will have to deal directly with the atmosphere.)

The solution to this nose cone design problem will be accomplished in two steps involving two entirely separate methods. The first step will be to design the nose cone with such a long tapering shape that it is able to move completely inside its initial bow shock cone without touching its surface. This was illustrated in FIG. 2. Since the initial bow shock 80 is relatively small, the resulting aerodynamic drag will be extremely low relative to the total transverse cross sectional area of the spaceplane (which is 28.27 m$^2$). In order to calculate the required length of the nose cone, such that it will be completely enclosed within the shock cone without touching its surface, it is necessary to calculate the geometry of the shock cone 82 (FIG. 2). This can be accomplished by using the well known "Mach angle" formula for supersonic flight.

When a slender body moves through the atmosphere in supersonic flight with Mach number M, the vertex semi-angle $\alpha$ (Mach angle) of the resulting shock cone is related to M by the formula $$\sin \alpha = 1/M \tag{14}$$

For missions to low Earth orbit, the required launch velocity $V_o$ is 8.763 km/sec. Since the speed of sound at the summit of Quandary Peak, Colo. (elevation 4,348 m) is 0.278 km/sec, the required Mach number is 31.523. Hence, $\alpha = 1.818°$.

The minimum length that the nose cone must have in order to prevent the shock cone from contacting its surface is determined by the condition that the envelope of the shock cone is tangential to the surface of the nose cone. Hence, the maximum allowed vertex semi-angle of the required nose cone would be 1.818° for missions to low Earth orbit. Thus, if the entire nose cone 78 extends from point P (FIG. 27) where the fuselage 618 first reaches its full outside diameter of 6 m (19.69 ft) the nose cone 78 must be at least 94.22 m (310.11 ft) long. If the tip of the nose cone 620 is spherical with a radius of 0.1 m (instead of pointed) the minimum overall length could be reduced to 91.37 m (299.77 ft).

A nose cone 300 feet long may not be possible to design from a purely structural point of view since it would have to be very strong. But in view of the tremendous temperatures involved, it is important to maintain a noncontact relationship between the nose cone and the shock cone. Actually, the "thermal barrier" can, in a very real sense, be viewed as the ultra high temperature shock cone moving ahead of a vehicle travelling at hypervelocity through the atmosphere. Moreover, it follows from equation (14) that this shock cone thermal barrier actually closes in on the vehicle moving behind it when the speed of the vehicle is increased. Thus, there appears to be an absolute upper limit on the speed that a hypervelocity vehicle can have while moving through the atmosphere for the simple reason that its maximum transverse dimension must be larger than the tip of the fuselage. Consequently, it appears that the thermal barrier is truly impenetrable. (Inverted cone-shaped capsules such as those designed for projects Mercury, Gemini, and Apollo are not vehicles designed for sustained low drag hypervelocity flight through the atmosphere and are not considered in this context.)

Although a long tapered nose cone may in principle enable a vehicle to fly inside its shock cone without contacting its surface, the surrounding air temperature inside the shock layer will be extremely high and on the order of 30,000° K. This layer will therefore generate an enormous amount of optical radiation. According to Table 8, the nose cone will be completely surrounded by this radiating layer for almost 30 seconds before it can gain sufficient altitude to climb out of the atmosphere. Unless otherwise protected, the entire surface area of the nose cone will be exposed to intense optical radiation that, after just a few seconds exposure, could cause the entire nose cone to melt away (if not completely evaporate).

The solution to this radiative heat transfer problem will be two fold. A protective gas layer will be injected between the shock layer and the external surface of the nose cone that has a high opacity relative to the radiation. This gas will therefore serve as an optical barrier that blocks the radiation from falling on the surface of the nose cone. The source of this opaque gas layer will be provided by a solid graphite extendable nose plug. This nose plug is cylindrical 20 cm (7.87 in) in diameter, with a hemispherical end. After the spaceplane is launched and the nose cone enters the atmosphere, the hemispherical surface of the graphite nose plug immediately begins to vaporize thereby generating a protective layer of opaque gaseous graphite between the shock layer and the surface of the nose cone. The initial bow shock is generated by the nose plug. Since gaseous graphite is extremely opaque to optical radiation, the evaporating gases will provide an excellent shield that blocks almost all of the intense radiation from falling on the nose cone. As the hemispherical surface of the nose plug begins to slowly evaporate away, a hydraulic press, mounted behind the nose plug inside the nose cone, slowly advances more of the nose plug out the end of the nose cone. The length of the nose plug is such that there is always enough of it protruding from the end of the nose cone to generate the required gaseous graphite radiation shield.

The aerodynamic drag force F acting on the nose plug at any altitude can be calculated by the equation $$F = C_d \pi r^2 (\rho/2) V^2$$

where $C_d$ is the drag coefficient, r is the radius of the nose plug (which is assumed to be 0.10 m), $\rho$ is the density of the atmosphere at a particular altitude, and V is the velocity. For a hemispherical tip, $C_d = 1$. At the launch altitude of 4,350 m, the air density is 0.7658 kg/m$^3$. Thus, if the spaceplane enters the atmosphere at a launch velocity, V=9,000 m/sec, the initial drag force acting on the nose plug will be 974,390N (219,050 lbs, or 110 tons). This represents the maximum drag force acting on the nose plug at this launch velocity and decreases very rapidly as spaceplane gains altitude. State of the art hydraulic presses operating with a hydraulic fluid pressure of 2,000 Atm are capable of exerting a force of up to $6 \times 10^6$N on the end of the nose plug, exceeding the drag force by a wide margin.

Longitudinal compressive loads well above 110 tons are readily tolerated by a nose cone constructed and reinforced with light weight, high temperature composite material such as graphite fiber. Graphite fiber has a tensile strength five times greater and a Young's Modulus two times greater than high strength aluminum, and it can hold its strength in temperatures exceeding 4,000° F.

Most of the major load bearing structural elements of the entire spaceplane are made of conventional graphite fiber composites such as described in "New World for Aerospace Composites," *Aerospace America*, Oct. 1985, pp. 36–42, by W. F. DeMario; and "The FSTS Study—Structures and Subsystems," *Astronautics and Aeronautics*, June 1983, pp. 50–62, by A. H. Taylor et al.

The ablation and deceleration mechanics of graphite cylinders with hemispherical tips catapulted through the atmosphere at hypervelocity by an electromagnetic launcher have already been investigated in detail by C. Park and S. W. Bowen in their paper "Ablation and Deceleration of Mass Drive-Launched Projectiles for Space Disposal of Nuclear Wastes," AIAA 19th Aerospace Sciences Meeting, St. Louis, Mo., Jan. 12–15, 1981, AIAA Paper No. 81-0355. In this study, the projectiles were launched vertically upward from sea level with a velocity in excess of 17 km/sec. Their results show that the total mass of graphite that is evaporated due to ablation is only about 15 kg for a hemispherical nose with a radiums of 10 cm. If the launch altitude were 4,350 m, this loss would decrease to about 10 kg. Furthermore, if the launch velocity were only 9,000 m/sec, this loss would decrease to about 3 kg. However, if the elevation angle $\theta$ of the launch trajectory were not 90°, the mass loss would increase by a factor equal to $(1/\sin \theta)$. Hence, since the launch trajectory of the spaceplane will have a low elevation angle equal to 6.89°, the total mass loss of the graphite nose plug traversing through the atmosphere with a launch velocity of 9,000 m/sec will be about $3/\sin 6.89 = 25.0$ kg. Since the mass density of graphite is 2.25 gm/cm$^3$, a loss of 25 kg means that the 20 cm diameter nose plug will only have to be advanced a total distance of 35.4 cm (13.9 in) while the spaceplane passes through the atmosphere. Any number of simple systems can controllably move such a small object this short distance. In fact, this distance is sufficiently small to completely eliminate the need for any hydraulic nose plug advancing system. If desired, the nose plug could be simply mounted such that it protrudes a distance greater than the ablation distance. The study conducted by Park and Bowen in the above mentioned paper also shows that a 20 cm diameter graphite cylinder with a hemispherical tip is sufficiently strong to withstand much higher forces (such as that generated by being injected into the atmosphere at sea level at velocities exceeding 17 km/sec).

In order to neutralize the relatively small amount of radiation that may penetrate through the graphite gas shield, the surface of the nose cone is made highly reflective. For example, the surface of the nose cone can be constructed from a shell of highly polished aluminum or stainless steel covered with an outer protective layer of thin silica glass composite material. The fuselage of the spaceplane can also be made highly reflective.

There still remains one very difficult problem that renders all of the above design techniques for protecting the nose cone useless if it cannot be solved. The electromagnetically propelled reusable spaceplane concept proposed herein is not only intended to provide direct transportation to low Earth orbit but also to geosynchronous orbits, lunar orbits and even for direct interplanetary flights to Jupiter. (It is important to be able to reach Jupiter because its enormous gravitational field can be utilized to catapult the a vehicle to essentially any other region of the Solar System without requiring any on-board rocket propulsion.) Unfortunately, direct flights to Jupiter require a minimum launch velocity $V_o$ of about 15.5 km/sec. This corresponds to a Mach number of 55.7. Consequently, $\alpha = 1.03°$ and the nose cone would have to be 161.6 m (530 ft) long in order to avoid contacting the shock cone. A detachable nose cone this long would be impractical.

In view of the above calculations it appears that it is impossible to avoid contacting the initial shock cone when the spaceplane is launched on high energy missions because the vertex angle of the shock cone is too small. However, this is not the case. It is possible to provide a means for allowing the nose cone to traverse through the atmosphere—at almost unlimited speed—without contacting the initial shock cone. The key engineering breakthrough that allows this important flight characteristic to be realized is based on applying the principles of magnetohydrodynamics to the shock waves. It represents the second, and most important step in the design of the nose cone.

Since the temperature of the gas making up the shock cone envelope and the protective gaseous graphite radiation shield is extremely high, the molecules are heavily ionized. Consequently, the shock cone can be deflected away from the nose cone by employing shaped magnetic fields generated inside the surface of the nose cone. The amount of deflection can be determined by the principles of electromagnetic theory.

Any ion with charge q moving with velocity $\vec{V}$ in a magnetic field B will experience a magnetic force $\vec{F}$ given by the well known vector equation $$\vec{F} = q\vec{v} \times \vec{B}$$

Consequently, by mounting a plurality of magnetic field coils with a certain size and shape inside the nose cone completely around its circumferential periphery, it is possible to deflect the shock cone in a radial direction away from the surface of the nose cone. Omitting the details, it can be shown that if $\vec{V}$ and $\vec{B}$ are perpendicular, then the instantaneous radius of curvature R of the path of the deflected ion is given by $$R = MV/Bq$$

where M denotes the mass of the ion. For example, if B=1.0T and V=15,489 m/sec and the ion is $N_2^{++}$ (doubly ionized nitrogen gas) then the magnetic field would deflect the ion along a curving path with an instantaneous radius of curvature equal to 2.25 m. Thus, by generating an axial magnetic field on the order of 1.0T around the longitudinal central axis of the nose cone in a counter clockwise direction, it will be possible to deflect the entire shock cone, together with the protective gas layer, radially outward away from the surface of the advancing nose cone and therefore prevent any direct contact with its surface. This is a key design feature of the spaceplane as it represents a means for opening up the thermal barrier and allowing essentially unlimited speeds through the atmosphere over unlimited time intervals.

FIGS. 29 and 30 are transverse and longitudinal schematic cross sections illustrating the design, construction, and operating features of the preferred embodiment of the detachable, reusable, hypervelocity nose cone. As is shown in FIG. 30, the nose cone 78 is mounted around and completely encloses the entire forward section 622 of the fuselage 618 and extends a significant distance beyond the nose 624 of the spaceplane 540. It is attached to the fuselage 618 by two separate locking systems. The first system 626 is basically a system whereby the entire nose cone is literally "screwed" onto the forward fuselage of the spaceplane. This is accomplished by three retractable cylindrical ring collars 628 that are attached to the main forward bulkheads 630 of the spaceplane's fuselage. These cylindrical ring collars 628 or flanges extend and retract parallel to the longitudinal central axis of the spaceplane. They can be extended forward about 100 cm from their retracted position with their ends flush against the surface of the fuselage. The ring collars 628 are threaded along their outside walls similar to large diameter pipes. Three corresponding cylindrical rims 632 are rigidly mounted inside the nose cone with grooved inside side walls that screw into the threads of the fuselage collars 628. A plurality of motors 634 are provided aboard the spaceplane for rotating the ring collars 628. Thus, in this primary locking system 626, the nose cone 78 is attached to the forward fuselage 622 by extending the threaded fuselage collars 628, lining up the fixed rims 632 of the nose cone 78 with these collars 628 and rotating the collars 628. The result literally screws the entire nose cone 78 onto the forward section 622 of the spaceplane's fuselage, 360° around three separate bulkheads 630.

The second locking system 636 for attaching the nose cone 78 to the spaceplane's fuselage 622 comprises a plurality of explosive mounting bolts 638 extending all the way around the circumferential end periphery 640 of the nose cone 78. Several other internal supporting beams 642 are attached to various points on the forward fuselage via explosive bolts 644.

In order to obtain high structural strength, the overall length of the nose cone 78 is 50 m (164.04 ft) rather than 100 m since the shock cone can now be deflected by magnetic fields. The maximum external diameters at the trailing and forward ends are 6 m (19.69 ft) and 21 cm (8.27 in) respectively. The overall shape is that of a long tapered truncated cone with a vertex semiangle angle $\alpha_o$ of 3.31°. Thus, the maximum Mach number that the spaceplane could fly without using its magnetic shock cone deflecting coils is 17.30. Since this is too low to achieve orbital velocities, the deflecting coils will be energized during every launch.

A 20 cm (7.87 in) diameter, 10 m (32.81 ft) long, cylindrical solid graphite nose plug 646 is mounted inside the forward end 648 of the nose cone 78. This graphite nose plus 646 is mounted inside a hydraulic cylinder 650 made of reinforced titanium carbide. The hydraulic cylinder 650 is mounted inside the nose cone 78 and forces the nose plug 646 to move out of a small 20 cm diameter circular hole 652, located at the forward end 648 of the nose cone 78. The forward end of the nose plug 646 is hemispherical and projects about 20 cm (7.87 in) beyond the end of the truncated nose cone 78. The operation of the hydraulic cylinder 650 is such that as the end of the nose plug 646 is being evaporated while moving through the atmosphere at hypervelocities, velocities, the hydraulic cylinder 650 simultaneously advances more of the nose plug 646 out through the hole 652 at the end of the nose cone 78 so that the nose plug 646 always extends about 20 cm beyond the end of the nose cone. The evaporation process acting on the nose plug 646 is such that its surface always remains approximately hemispherical. A cooling system 654 is provided inside the nose cone 78 to cool the internal portion of the nose plug 646, the hydraulic cylinder 650, and the related compressor system 656 of the hydraulic cylinder 650.

A plurality of superconducting narrow wedge shaped, magnetic field deflector flector coils 658, are mounted inside the nose cone 78, parallel to the straight inside lateral walls 660 of the nose cone 78. The coils 658 have straight windings in the long direction with the outside portion 662 parallel to the adjacent inside wall 664. The coils 658 are oriented such that the plane of each wedge coil 658 passes through the longitudinal central axis of the nose cone 78. The coils 658 are energized with a DC current i which flows around each coil towards the nose plug 646 in the outer windings 662 and back in the opposite direction in the inner windings 666. The combination of all of the resulting magnetic fields from each coil producas an axial magnetic field 668 around the longitudinal central axis 670 of the nose cone 78 as shown in FIG. 31.

The effect of the superconducting magnetic deflecting coils 658 is illustrated in FIG. 32. If the nose cone velocity were Mach number 55 and if the shock cone deflecting coils 658 were turned off (i.e., discharged), the Mach angle $\alpha$ of the shock cone would be 1.04°. Since the overall length of the nose cone 78 is only 50 m (164.04 ft) the semi-angle $\alpha_o$ is 3.31°. Hence, the shock cone 82 along with the protective graphite gas layer optical radiation shield 672 would physically collide with the surface 674 of the nose cone 78 as illustrated by the dashed curving line 676. However, when the deflecting magnetic field coils 658 are energized, the shock cone 82 and the gaseous graphite layer optical radiation shield 672 are both forced radially outward by the resulting magnetic forces. The shock cone 82 is thereby artificially expanded outward and contact with the nose cone 78 (and with the spaceplane) is avoided.

It is important to emphasize that if the magnetic deflecting field is too strong, the shock cone 82, along with the graphite gas layer 672, will be deflected way beyond what is necessary to avoid contact. This will significantly increase the aerodynamic drag because the resultant magnet "recoil" force acting on the deflector coils 658 extends along the longitudinal central axis 670 of the nose cone, opposite the direction of motion. In general, the total aerodynamic drag increases when the amount of magnetic deflection increases. Consequently, the most efficient strategy for operating the deflector coils is to charge them with just enough current to produce the minimum amount of deflection necessary to achieve safe passage for the nose cone and spaceplane. This will result in minimizing the total aerodynamic drag.

As a practical consideration in the overall design of the nose cone, it should be pointed out that the longer the nose cone, the smaller $\alpha_o$, and the minimum amount of magnetic deflection that is required to avoid contact, decreases. Hence, the longer the nose cone, the lower the drag. Therefore, in order to keep the aerodynamic drag as low as possible, the nose cone should be designed as long as possible provided that its structural integrity is not seriously compromised. Thus, the basic trade-off in the nose cone design is length versus structural integrity.

The magnetic deflector system can also be utilized to achieve very precise vehicle guidance while traversing through the atmosphere. This is achieved by controlling the amount of current flowing in the various deflector coils 658. This magnetic guidance control system is designed and operated as follows: The total number of individual deflector coils 658 mounted in the nose cone is even. The coils are grouped into opposing pairs 678, 680 and connected, via cables 682 to an independent power control and current transfer system 684. The two coils 678,680 in each pair are diametrically opposite each other, on opposite sides of the central axis 670. The power control and current transfer system 684 associated with each individual pair of coils 678,680 is controlled by an external central guidance and control computer 686 inside the spaceplane to extract current from one coil, say 678, and feed it into the other coil 680. This has the effect of decreasing the strength of the magnetic deflector field on one side of the nose cone while simultaneously increasing the strength of the magnetic deflector field on the diametrically opposite side of the nose cone. Thus, the magnetic recoil force acting on the coil 678 will be less than that acting on coil 680, and the nose cone will tend to turn toward coil 678 and away from coil 680. Consequently, by simultaneously controlling all of the individual current transfer systems 684 associated with each pair of deflector coils mounted around the entire circumferential periphery of the nose cone, it is possible to actually steer the nose cone along essentially any desired course while traversing through the atmosphere. This enables the spaceplane to have very precise yaw and pitch control.

Precise roll control is obtained in a similar manner by varying the magnetic fields in a few of the vehicle propulsion coils 688 located around the forward portion inside the double walled hull of the fuselage immediatly behind the nose cone 78. (Since the adjacent coils in each row have opposite polarity, the net aerodynamic effect is zero if all of the field strengths are equal.) The central guidance computer 686, interfaced with a central inertial-gyro navigation system 690, transmits precise control signals simultaneously to all of the magnetic flux coil controllers 684 thereby providing extremely accurate yaw, pitch and roll control for guiding the spaceplane through the atmosphere at hypersonic speeds.

This magnetic guidance system—represents for the first time—an an active aerodynamic vehicle flight control system for achieving complete yaw, pitch and roll control for a vehicle moving through the atmosphere at hypervelocity without contacting the atmosphere via traditional aerodynamic control surfaces or rocket thrusters.

It is important to emphasize the fact that it is impossible to change the direction of the electromagnetic accelerator in order to launch a vehicle onto a ballistic flight path that leaves the atmosphere with certain orbital elements necessary to achieve a desired inerorbital or interplanetary transfer trajectory to a specific destination. The only variable in the launch trajectory that the accelerator can change is the launch velocity $V_o$. The only other variable that can be changed is the launch time. Thus, if the flight path through the atmosphere is (essentially) a straight line, then the ability to vary the ballistic trajectories leaving the Earth's atmosphere will be fairly limited. However, by changing a vehicle's ballistic trajectory as it passes through the atmosphere, the trajectories leaving the atmosphere can be tailor made for many different missions. The guidance system can actively steer the vehicle along an ascending, non-ballistic, flight path specifically designed to achieve a specific ballistic trajectory leaving the atmosphere corresponding to a given mission objective. This will reduce the amount of onboard board propulsion needed to carry out the missions. Thus, the magnetic hypervelocity atmospheric guidance system described above is regarded as an integral component of the entire electromagnetic launching system.

The shallow launch angle $\theta_o$ is therefore utilized to allow an electromagnetically propelled spaceplane to remain in the atmosphere a relatively long period of time so that its trajectory can be altered without placing excessive acceleration loads on the spaceplane or its passengers.

A self-contained cryogenic refrigeration system 692 is also mounted inside the nose cone 78 for cooling the superconducting magnetic deflector coils 658.

In the preferred embodiment of the spaceplane, the wings 542 and tail surfaces 584,586 are maintained in a retracted mode inside their respective housings throughout most of the flight. They are only deployed after the spaceplane plane reenters the atmosphere and slowed down to relatively low velocities via aerodynamic breaking. The nose cone 78 also remains attached to the spaceplane during most of the flight.

Figure 33:
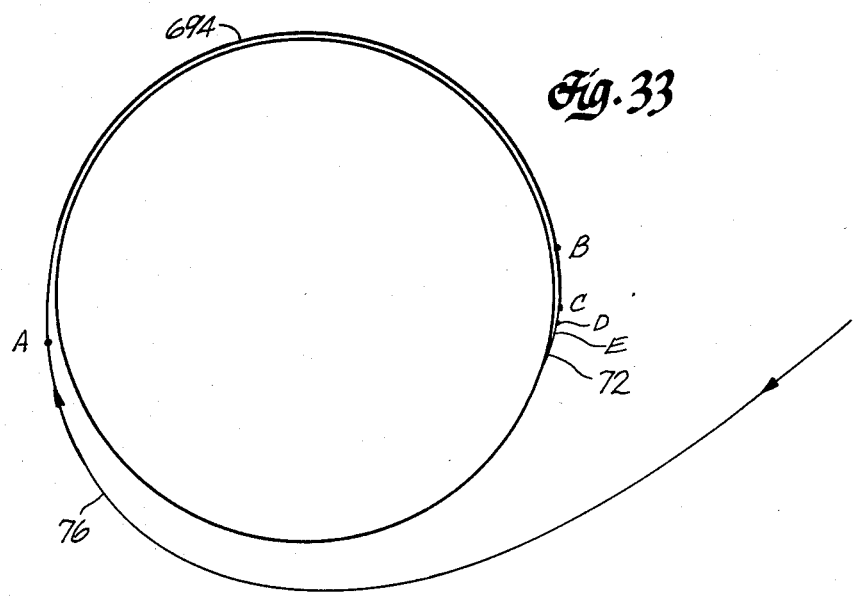
FIG. 33 illustrates a typical reentry trajectory of a spaceplane returning to Earth and its controlled deceleration flight path.
Figure 34:
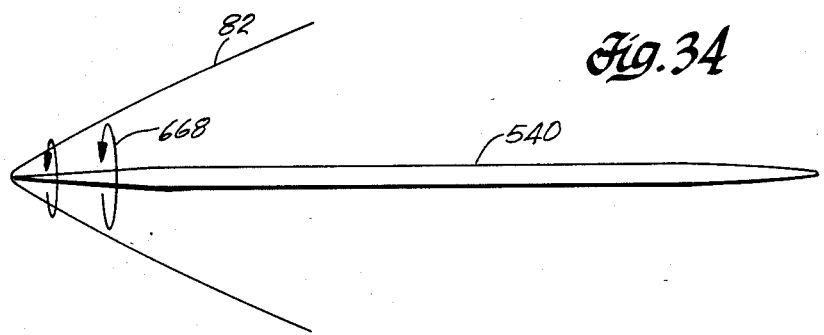
FIG. 34 is a perspective view showing a spaceplane being decelerated during its hypervelocity reentry into the Earth's atmosphere by the magnetohydrodynamic forces exerted on the ionized shock wave generated by the supe conducting magnetic deflector coils mounted inside the nose cone.

The reentry back into the Earth's atmosphere is made nose first with the nose cone providing complete aerodynamic control, stability and guidance. The reentry trajectory is very shallow and almost tangent to the upper atmosphere. The primary deceleration is accomplished by simultaneously incressing the magnetic fields in all of the deflector coils 658. This is accomplished very gradually in a precisely controlled manner while the spaceplane is guided down to lower levels of the atmosphere. The longitudinal axis of the spaceplane is automatically maintained precisely aligned with its velocity vector. The flight path of the descending spaceplane is automatically controlled by the central guidance computer 686 which is programmed to fly the vehicle along an optimum flight path towards the landing field 72. Since the primary deceleration is achieved by the magnetic deflector coils, there is essentially no direct contact between the spaceplane (and the nose cone) and the atmosphere. Thus, the reentry speeds can be extremely high. The flight path that the decelerating vehicle follows is almost circular and hugs the upper levels of the atmosphere at altitudes between 40 km (131,200 ft) and 60 km (196,800 ft) depending upon its entry velocity. The total length of the high speed primary deceleration path ranges between 6,000 km (3,700 miles) to 20,000 km (12,400 miles). A typical reentry trajectory 76 and corresponding high altitude deceleration trajectory 694 through the atmosphere are illustrated in FIG. 33. The reentry begins at an altitude between 70 km (230,000 ft) to 80 km (262,500 ft) and is denoted by point A on FIG. 33. The primary deceleration is completed when the vehicle is slowed to about Mach 4 at point B. FIG. 34 is a perspective view of a spaceplane being decelerated during its hypervelocity reentry by the magnetohydrodynamic forces generated by the superconducting magnetic deflector coils mounted inside the nose cone.

Figure 35:
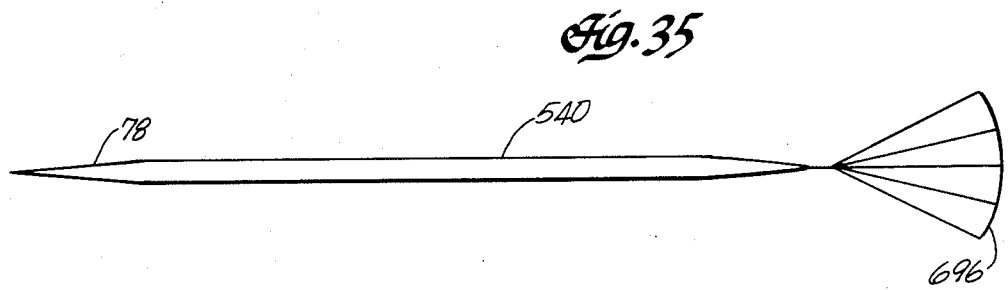
FIG. 35 is a perspective view showing a spaceplane being decelerated its secondary low speed drag parachute system deployed from the rear of the spaceplane.

After the spaceplane 540 has slowed to about Mach 4 at an altitude of about 30,000 m (98,400 ft) a relatively small drag parachute 696 is deployed from the rear section 580 (FIG. 25) of the spaceplane (FIG. 35). The drag parachute is designed to slow the spaceplane to about Mach 1. When this speed is reached (at point C FIG. 33) the wings 542 and tail surfaces 584,586 are deployed, and the drag parachute 696 is jettisoned. After the wings 542 and tail surfaces 584,586 are fully deployed and locked into place, the nose cone 78 is jettisoned (point D FIG. 33). This is accomplished by first unscrewing the ring collars 628, simultaneously firing all of the explosive bolts 638, and firing a plurality of small separation rockets 698. When the nose cone 78 falls to a lower altitude, a recovery parachute 700 is deployed and the nose cone 78 descends slowly and lands in the Pacific Ocean where it is recovered. Except for the graphite nose plug 646 (most of which is evaporate during the hypervelocity flights through the atmosphere) the nose cone 78 is completely reusable. It is transported back to the spaceport, refurbished (with a new graphite nose plug), mounted on another spaceplane, and catapulted on another flight into space.

After the nose cone is jettisoned, the six jet engine ducts 546 are opened. Each of the jet engines are rated at about 60,000 lbs static thrust and are started when the vehicle descends to an altitude of about 15,000 m (49,200 ft) (point E). Thus, the vehicle is transformed from a cigar-shaped hypervelocity space vehicle to a sub-sonic, jet propelled aircraft.

FIGS. 36, 37 and 38 are schematic longitudinal, transverse, and plan views respectively showing the spaceplane 540 with its wings 542, tail surfaces 584 and 586, and landing gears 610,612 deployed. The design method used for extending and retracting the wings 542 and tail surfaces 584,586 are new to the art of aerodynamic flight and requires some technical explanation. In order to enable the spaceplane to land with very high gross weights (on the order of 1,500,000 kg) but with reasonable landing speeds, the total wing area must be extremely large. But a large wing area is difficult to achieve because the wings have to be retractable and fit completely inside a relatively narrow slot 572 located inside the fuselage of the spaceplane between the upper payload bay 558 and the lower payload bay 560. This problem is solved by taking advantage of the fact that the wings do not have to carry any fuel tanks. Therefore, the wing construction is based upon dividing the wing into a plurality of movable wing sections 702 that telescope in and out of each other in a transverse direction perpendicular to the longitudinal central axis of the spaceplane's fuselage. Each telescoping wing section 702 has a chord that could be as long as the wing housing 572, which is 60 m (196.85 ft). The transverse span of each telescoping wing section 702 is slightly less than the radius of the main fuselage, which is 3 m (9.84 ft). Consequently, if there were 18 transverse telescoping wing sections in each wing, the total wing span would be $(2\times18+2)\times3$ m=114 m (374.02 ft). If each wing section were rectangular with 3 m×60 m dimensions, the total wing area would be 6,480 m² or 69,750 ft².

(This wing area could be increased or decreased simply by adding or decreasing the number of telescoping wing sections.) If the total landing mass of the spaceplane were 1,500,000 kg (3,306,934 lbs) the wing loading would be 231.48 kg/m$^2$ (47.42 lbs/ft$^2$). This wing loading is much lower than large commercial jet aircraft and significantly below that of the U.S. Shuttle Orbiter.

The telescoping wing sections 702 designed for the spaceplane will have a gradually decreasing chord as shown in FIG. 38. The chord at the wing root 704 and wing tip 706 will be 58 m (190.29 ft) and 50 m (164.04 ft) respectively. Each wing section 702 will have an extended length of 2.5 m (8.20 ft) and each wing will have a total of 20 transverse telescoping wing sections 702. Thus, when all of these telescoping wing sections are fully extended, the spaceplane will have a wing span of 106 m (347.77 ft). The total wing area will be 5,040 m$^2$ (54,250 ft$^2$). With a landing mass of 1,500,000 kg (3,306,934 lbs) the wing loading will be 297.56 kg/m$^2$(60.96 lbs/ft$^2$). When the wing is retracted, all of these sections slide into each other. They are stacked on top of each other in parallel layers and stored completely inside the wing housing 572.

Each wing is extended and retracted by a plurality of separate load bearing wing spars that also telescope into and out of each other very much like a conventional motorized whip antenna, or various space frames proposed by NASA. For example, these wing spars may be electrically or hydraulically actuated and comprise 20 separate segments, 2.5 m long with successively decreasing cross sections that fit into each other. Such a structure is extended by first extending the innermost wing spars. This action extends the outermost wing section. By forcing the outermost wing spar to move continuously outward (by a telescoping rotating screw mechanism) all of the remaining telescoping wing spars and wing sections are moved outward until the wing is fully extended.

This telescoping wing design technique is capable of providing an enormous wing area while enabling the wing to be collapsed and stored inside a relatively small wing housing. Although deployable wings have been designed in the prior art that can be stored completely inside the body of a fuselage (such as the wings designed for the U.S. Navy's BGM-109 Tomahawk submarine launched cruise missile) the deployable wing design used aboard the spaceplane is new to the prior art in that the wings are composed of separate movable sections that telescope into and out of each other.

The collapsible telescoping wing design feature provided for storing and deploying the wings is also used for the design of the vertical and horizontal tail surface 584,586. Thus, the tail surfaces 584,586 are divided into a plurality of movable vertical and horizontal sections 708,710 respectively, that telescope in and out of each other in a transverse direction perpendicular to the longitudinal central axis of the spaceplane's fuselage. As in the design of the wing sections 702, the aerodynamic tail sections 708,710 also have gradually decreasing chords. The designs of the fully deployed tail sections are illustrated in FIGS. 36 and 38.

Since the landing weight of the spaceplane is very high, it is equipped with a large number of main landing gears 612. These landing gears 612 are mounted on main supporting beams 712 that telescope outward from the interior of the fuselage in transverse horizontal directions. The landing gears are attached to these support beams 712 by telescoping beams 714 that are mounted perpendicular to the main support beams 712 along vertical directions. The main landing gears 612 are deployed by opening a plurality of landing gear doors 716, extending the main support beams 712 on each side of the fuselage, and lowering the gears 612 by telescoping the vertical beams 714 downward. The landing gear system is actuated by conventional hydraulic or electric motors like those on many aircraft.

The spaceplane can land either by a fully automatic landing system or by a flight crew using manual controls similar to the reusable U.S. Space Shuttle Orbiter. However, unlike the Orbiter, the spaceplane is not a glider when it lands. It is a powered flight aircraft with six powerful jet engines (and a high thrust rocket engine that can be used if an extra burst of propulsive power is required). The spaceplane approaches and lands at the landing field (i.e., spaceport) similar to a large commercial jumbo jet. Moreover, it can take off (unloaded) under its own power using its six jet engines (with the assistance of its rocket engine) and fly to and land at another airport just like a conventional airliner.

The spaceplane is completely reusable. After landing at the spaceport, it can be refurbished, refitted with another nose cone, loaded, and catapulted back into space within two or three hours (depending on the cargo). The "turn around time" would be similar to that of a large commercial airliner which lands at an airport, refuels, receives a new load of passengers (and freight) and takes off again.

Table 9 summarizes the design and performance characteristics of a typical electromagnetically propelled reusable spaceplane. In reviewing the table it is important to emphasize the fact that the electromagnetic accelerator is designed to be able to catapult extremely massive launch vehicles by concentrating enormous quantities of electric power drawn from the primary capacitor bank and the secondary superconducting energy storage system in whatever amounts that are required to accelerate the vehicle to the required launch velocity $V_o$. Thus, the individual vehicles really do not have any absolute maximum launch mass. The maximum launch and payload masses given in Table 9 should therefore be considered as representative and not absolute limits.

TABLE 9

Design And Performance Characteristics Of An Electromagnetically Propelled Reusable Spaceplane

| | |
|---|---|
| Detachable Nose Cone | |
| Overall Length | 50 m (164.04 ft) |
| Maximum Diameter | 6 m (19.69 ft) |

TABLE 9-continued
Design And Performance Characteristics Of An Electromagnetically Propelled Reusable Spaceplane

| | |
|---|---|
| Mass | 30,000 kg (66,139 lbs) |
| Spaceplane (without nose cone) | |
| Overall Length | 240 m (787 ft) |
| Fuselage Diameter | 6 m (19.69 ft) |
| Wing Span | 106 m (347.77 ft) |
| Wing Area | 5,040 m$^2$ (54,250 ft$^2$) |
| Max Launch Mass | 2.5 × 10$^6$ kg (5.5 × 10$^6$ lbs) |
| Max Payload (LEO) | 5.0 × 10$^5$ kg (1.1 × 10$^6$ lbs) |
| Max Payload (GEO) | 3.0 × 10$^5$ kg (6.6 × 10$^5$ lbs) |
| Max Payload (Lunar Orbit) | 4.0 × 10$^5$ kg (8.8 × 10$^5$ lbs) |
| Max Passenger Load | 800 |
| Chemical Rocket Engine (One) | |
| Specific Impulse | 480 sec |
| Thrust | 4.0 × 10$^5$ N (9.0 × 10$^4$ lbs) |
| Max Fuel Load (LO$_2$—LH$_2$) | 1.2 × 10$^6$ kg (2.65 × 10$^6$ lbs) |
| Max ΔV (Space) | 5.0 km/sec |
| Electron Cyclotron Resonance Plasma Engines (Six) | |
| Specific Impulse (using nitrogen) | 6,000 sec |
| Propulsive Power (Total) | 30 MW |
| Thrust | 1,034 N (233 lbs) |
| Stored Energy (Superconducting Vehicle Coils) | 5 × 10$^{10}$ Joules |
| Max ΔV | 20 m/sec |
| Jet Engines (Six Air Breathing) | 1.6 × 10$^6$ N (3.6 × 10$^5$ lbs) |
| Total Thrust (Static) | |
| Max Speed (Atmosphere) | 600 km/hr (373 mph) |
| Cruising Speed (Atmosphere) | 500 km/hr (311 mph) |
| Max Altitude (Atmosphere) | 6,000 m (19,685 ft) |
| Landing Speed (Atmosphere) | 300 km/hr (186 mph) |

Although the primary energy storage system provided for the electromagnetic linear accelerator 32 is represented by the enormous 1,530 km long, high voltage capacitor bank 446, a secondary energy storage system is provided to keep the capacitors fully charged when they are pulsed into the drive coils to provide magnetic thrust on passing vehicle coils. Since very high peak power pulses on the order of hundreds of gigawatts will be required, this secondary system will be represented by a large superconducting inductive energy storage system 50 where the energy is stored in the form of a magnetic field. Unlike other energy storage systems such as flywheel and homopolar systems, inductive energy storage has no moving parts and is capable of providing extremely high in-out power transfer densities and energy storage densities.

In the preferred embodiment, this superconducting energy storage system will be a self shielding toroid with an average magnetic field strength B of 12 T. The energy density E(J/m$^3$) contained in a magnetic field of strength B (Teslas) is given by $$E = B^2/2\mu_o)$$

where $\mu_o = 4\pi \times 10^{-7}$. The volume V of a toroid containing a magnetic field is given by $2\pi^2 R r^2$ where R and r denote the major and minor axes respectively. The dimensions selected for the superconducting magnetic energy storage toroid will be R=100 m (328 ft) and r=70 m (230 ft). Thus, the energy storage capacity of this system will be E V=[12$^2$/(8$\pi \times 10^{-7}$)]×2×$\pi^2$×100×70$^2$=5.54×10$^{14}$ Joules. In the preferred embodiment this superconducting toroid will be constructed underground and embedded in solid bedrock utilizing rock reinforcement for containing the mechanical stresses generated by the high magnetic field. This secondary energy storage system will be interfaced between the hydroelectric power plant and the electromagnetic accelerator. Consequently, this system will also serve as a load leveling system. The technology of superconducting electric power transmission and storage has been significantly advanced during the past decade to the point where vast amounts of electric power can be transmitted and stored with virtually 100% efficiency. The proposed space transportation system will take full advantage of this new technology. For detailed articles on superconducting energy storage and transmission systems see "Applied Superconductivity Conference 1974," *IEEE Transactions on Magnetics*, Vol. MAG-11, No. 2, March 1975. More detailed design, construction, and operating principles of inductive superconducting energy storage systems can be found in the paper, "Magnetic Energy Storage," *IEEE Transactions on Magnetics*, Vol. MAG-17, No. 1, Jan. 1981, pp. 330-335 by John D. Rogers.

By combining the total energy stored in the primary capacitor storage bank with that stored in the secondary superconducting magnetic storage system, the total amount of electrical energy that can be discharged into the electromagnetic linear accelerator is approximately 6×10$^{14}$ Joules. Assuming that the electric to kinetic operating efficiency of the accelerator is 90%, the maximum kinetic energy that the accelerator can give to a launch vehicle is 5.4×10$^{14}$ Joules.

The kinetic energy E$_o$ of a vehicle with mass m$_o$ accelerated to a launch velocity V$_o$ inside the electromagnetic accelerator is given by the equation $$E_o = \tfrac{1}{2} m_o V_o^2 \tag{15}$$

Figure 39:
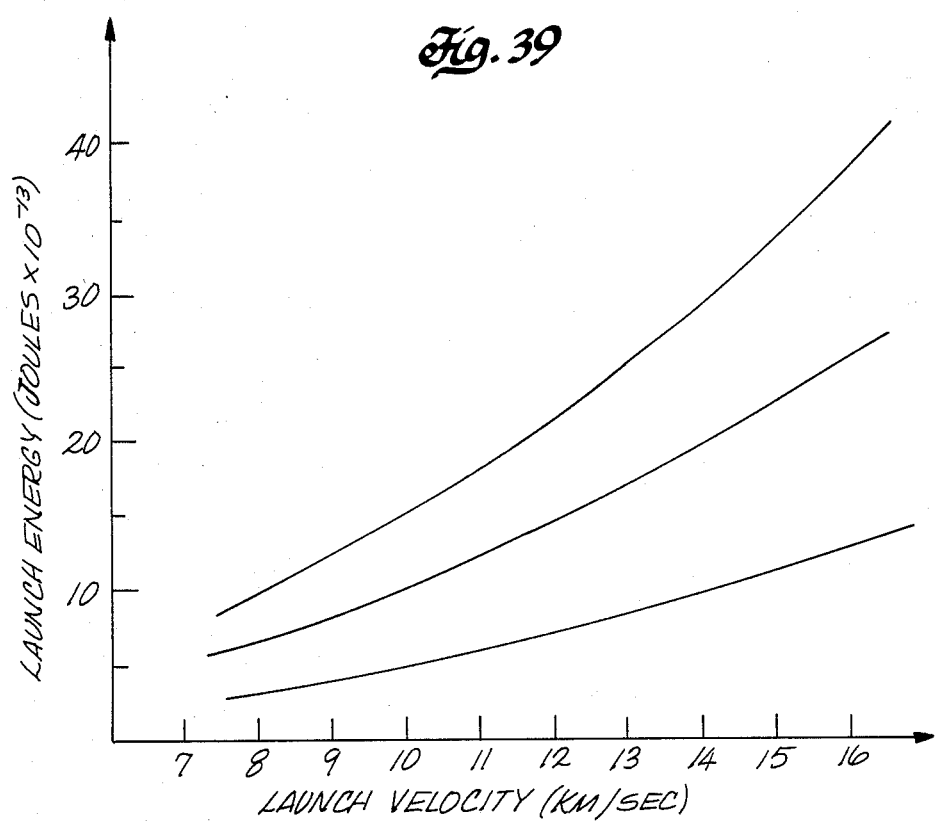
FIG. 39 is a parametric system of curves showing the kinetic energy or various vehicles accelerated by an electromagnetic accelerator versus launch velocity with the initial mass of the vehicle acting as an independent scaling parameter.

FIG. 39 is a parametric system of curves of E$_o$ versus V$_o$ with the initial vehicle launch mass m$_o$ acting as an independent scaling parameter. The upper curve, middle curve, and lower curve of FIG. 39 correspond to a launch mass of $3\times10^6$ kg, $2\times10^6$ kg and $1\times10^6$ kg respectively.

In order to better understand the actual operating performance characteristics of the electromagnetic launching system, it is helpful to consider a typical numerical example. Suppose that the initial mass of a spaceplane is $2\times10^6$ kg and it is to be accelerated to a launch velocity of 8.763 km/sec for a trip to low earth orbit. The required launch energy $E_o$ is $7.68\times10^{13}$ Joules. Assuming that the operating efficiency of the accelerator is 90%, the amount of electrical energy used for the launch would be $8.53\times10^{13}$ Joules. The acceleration would be 25.09 m/sec$^2$ (2.56 g) and the acceleration time would be 349.2 sec (5.82 min). The average rate at which the electrical energy is converted into kinetic energy would be 244 GW. (This power is transmitted along the accelerator by the superconducting cables 474.) The accelerating thrust $F=ma=5.02\times10^7$N ($1.13\times10^7$ lbs or 5,640 tons). This total accelerating thrust would be generated by the 18 separate linear motors. Thus, each linear motor would generate $2.79\times10^6$N($6.27\times10^5$ lbs. or 313 tons) of propulsive thrust. Assuming that each row of the vehicle's superconducting propulsion coils is 180 m (591 ft.) long, each linear motor would develop a specific thrust of 15,490 N/m (1,061 lbs./ft.). This thrust generating capability is well within the state-of-the-art.

According to previous theoretical and laboratory testing (with MIT's Magneplane) a square drive coil and propulsion coil linear motor with dimensions only 0.5 m by 0.5 m will generate an average accelerating force F of about $2\times10^{-6}$ $I_dI_p$ (N) where $I_d$ and $I_p$ are equal to the currents in the drive coil and propulsion coil respectively. (See "Electromagnetic Mass Drivers," Space-Based Manufacturing from Nonterrestrial Materials, Progress in Astronatutics & Aeronautics, Vol. 57, AIAA, N.Y., 1977, pp. 37–61, by F. Chilton, et al; and "Electromagnetic Flight," Scientific American, Vol. 229, No. 4, Oct. 1973, pp. 17–25 by H. Kolm and R. Thornton.) When $I_d=75,000$ amp and $I_p=100,000$ amp as used in the previous reported work, then $F=15,000$ N. Thus, the total propulsive thrust generating capability of the spaceplane using conventional technology is much more than is required to achieve the desired launch velocities. If desired, propulsion coils could be designed to have a current rating on the order of $10^6$ amp, and the pulsed drive coils could be easily designed to give pulse currents on the order of $2\times10^5$ amp. The previous studies also show that the overall electric-to-kinetic operating efficiency will be over 90%.

It is also important to note that the total accelerating thrust is distributed uniformly essentially over the entire length of the spaceplane's fuselage. This significantly reduces the stress on the vehicle's structure.

One of the most important operating features of the accelerator system is the fact that the water flowing through the cooling conduit 416 (FIG. 1) not only serves as a source for cooling the accelerator, but also as a source for generating all of the electrical energy required to operate it. Thus, by accumulating electrical energy generated by allowing the cooling water to fall a short distance inside the Earth's "gravitational potential well", it is possible to periodically release this accumulated energy into the electromagnetic accelerator to catapult massive spaceplanes completely out of this gravitational well and achieve not only free ground-to-orbit space travel but free ground-to-interplanetary space travel as well. The Earth's gravitational field is therefore utilized to launch space vehicles into orbit (or beyond) essentially without requiring any expenditure of launch energy or propulsive working fluid. Thus, in this sense, the present invention is similar to my invention of interplanetary "gravity propulsion" (known as gravity assisted trajectories) whereby a free-fall interplanetary space vehicle can be propelled around the Solar System, from one planet to another planet without expending any energy by utilizing their gravitational fields as propulsive energy sources. (See, "A Method For Determining Interplanetary Free-Fall Reconnaissance Trajectories," Jet Propulsion Laboratory, TM 312-130, August 1961.) In view of these underlying operating principles, the present invention is, in reality, another "gravity propulsion" invention. However, in this invention, the propulsive forces are electromagnetic rather than gravitational but the propulsive energy is still generated from gravitational forces supplied free of charge by the Earth's gravitational field. By combining the present invention with my previous gravity propulsion invention, it is actually possible to launch a space vehicle from the Earth's surface directly into interplanetary space and travel from one planet to another planet around the entire Solar System and land back on Earth (via atmospheric breaking) essentially without expending any propulsion energy whatsoever. The entire voyage is accomplished free of charge by utilizing planetary gravitational fields. The present system therefore represents a completion of my theory of gravity propelled space travel. In my 1961 theory of gravity assisted trajectories, a free-fall space vehicle had to be already moving in interplanetary space before it could utilize my theory of gravity propulsion. Unfortunately, this theory could not be utilized for actually launching the vehicle from the Earth's surface and accelerating it onto the initial leg of the gravity propelled interplanetary trajectory. This could only be accomplished by conventional rocket propulsion with huge launch vehicles developing enormous rocket thrust for accelerating the inertial mass of the launch vehicle—90% of which is rocket fuel for the rocket engines. The present system represents a means by which the Earth's gravitational field can be utilized for catapulting the free-fall vehicle directly from the Earth's surface. Thus, the free-fall nature of the vehicle extends all the way back to its pre-launch state at rest on the Earth's surface. In short, the transportation system allows the vehicle to remain in a free-fall condition without requiring any major on-board propulsive thrust. The initial vehicle thrust is supplied free-of-charge by the Earth's gravitational field acting through the electromagnetic accelerator. Thus, this system represents a means for achieving complete gravity propelled interplanetary or orbital space travel.

I have pointed out above how the atmosphere is utilized to help guide the spaceplane onto a more desirable initial transfer trajectory after the vehicle leaves the atmosphere (since the direction of the accelerator cannot be changed). This "atmospheric guidance system" is therefore viewed as an integral part of the entire electromagnetic launching system. But I have just described a far more important utilization of the atmosphere—that of utilizing the atmosphere to decelerate the vehicle without requiring any on-board rocket propulsion. Of course, this is nothing new. This is how the Shuttle Orbiter is decelerated. My point here, however, is to bring out the synergistic relationship between the atmosphere (more specifically, how it is utilized) and the electromagnetic launching system to achieve an economical and comprehensive Earth-based ground-to-space and space-to-ground reusable transportation system for manned vehicles. I choose the word "space" rather than "orbit" because this transportation system is not only capable of providing direct transportation between the Earth's surface and low Earth orbits but also between geosynchronous orbits, lunar orbits, Venus orbits, Mars orbits, and Jupiter orbits (and all of their satellites). Moreover, since the transportation system is capable of reaching Jupiter, it can—by utilizing the principle of gravity propelled space travel—provide transportation throughout the entire Solar System.

The electromagnetic accelerator can also be utilized to catapult large unmanned space vehicles onto direct transfer hyperbolic trajectories to all of the planets in the Solar System. Table 10 gives the approximate flight times for hyperbolic missions to each planet launched with a hyperbolic excess velocity of 40 km/sec. (The actual flight time to Pluto is about equal to that for Neptune because at the present time Pluto and Neptune are approximately equidistant from the Earth. The flight times given in Table 10 are based on voyages to the planets when they are at their mean distances from the sun.) The total vehicle launch mass is about 100,000 kg.

TABLE 10

Flight Times For Unmanned Electromagnetically Propelled Space Vehicles Launched On High Speed Direct Transfer Hyperbolic Interplanetary Trajectories To The Various Planets With Hyperbolic Excess Velocity
$V_\infty = 40.00$ km/sec  $V_0 = 45.681$ km/sec
$V_1 = 41.528$ km/sec  $a = 69.59$ g

| Target Planet | Flight Time | |
|---|---|---|
| | Days | Years |
| Mercury | 25 | 0.068 |
| Venus | 15 | 0.041 |
| Mars | 22 | 0.060 |
| Jupiter | 148 | 0.405 |
| Saturn | 275 | 0.753 |
| Uranus | 540 | 1.478 |
| Neptune | 850 | 2.327 |
| Pluto | 1,100 | 3.012 |

Figure 40:
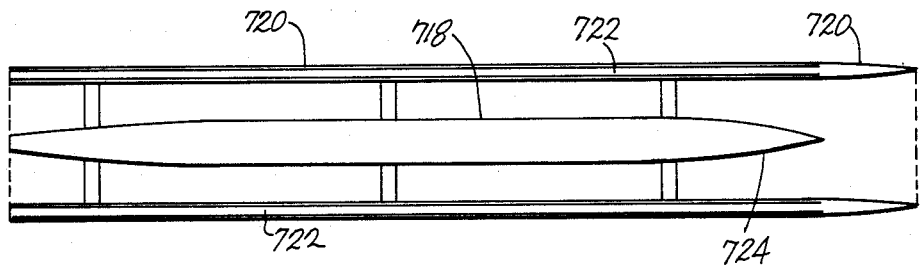
FIG. 40 is a schematic longitudinal cross section illustrating the design and construction of an electromagnetically propelled unmanned expendable space vehicle mounted inside an expendable launching canister.

Although the electromagnetic accelerator was specifically designed to launch space vehicles having an outside diameter of 6 m (19.69 ft) it can be utilized to launch space vehicles with diameters smaller than 6 m. This can be achieved by mounting the vehicle 718 inside a specially designed expendable launching canister or "sabot" 720 as shown in FIG. 40. Rows of superconducting propulsion coils 722 are mounted inside the sabot 720 which interact with the driving coils of the electromagnetic accelerator. These coils 722 are similar to the vehicle coils 450 described for the reusable spaceplane and function essentially in the same manner. Thus, the vehicle 718 is catapulted into space by the sabot 720 which is, in turn, accelerated by the electromagnetic launcher.

The design of the vehicle 718 could be relatively simple. For example, its nose section 724 could be designed to ablate while passing through the atmosphere instead of using magnetic deflector coils. These vehicles would be ideal for disposing of radioactive nuclear waste materials. They could be loaded with large quantities of waste material and catapulted onto hyperbolic escape trajectories that leave the entire Solar System. (See, for example, "U.S. Program Assessing Nuclear Waste Disposal In Space: A 1981 Status Report," *Space: Mankind's Fourth Environment*, Vol. XXXII International Astronautical Congress, Rome 1981, pp. 295-305, by E. E. Rice et al; and "Space Disposal of Nuclear Wastes," *Astronautics & Aeronautics*, April 1980, pp. 26-35, by C. C. Priest et al.) Since these vehicles (and sabots) would be relatively inexpensive, they could also be used for disposing of high toxic chemical waste material such as dioxins.

In order to comprehend the enormous performance and economical benefits that the proposed electromagnetically propelled reusable space transportation system can offer, it is useful to compare it with prior art space transportation systems, and those planned for the future. The comparisons are given for delivering payloads to low Earth orbit (LEO) and to geosynchronous orbit (GEO). The results are given in Table 11.

TABLE 11

Performance And Cost Comparisons For Delivering Payloads To Low Earth Orbit (LEO) And Geosynchronous Orbit (GEO) From The Earth's Surface Using Various Transportation Systems

| Transportation System | Propulsion System | LEO | | GEO | |
|---|---|---|---|---|---|
| | | Payload (kg) | Cost ($ kg) | Payload (kg) | Cost ($ kg) |
| Saturn V | Chemical | 75,000 | $2,094 | | |
| Ariane III | Chemical | 5,100 | $17,400 | 2,580 | $25,000 |
| U.S. Space Shuttle | Chemical | 30,000 | $892 | 7,000 | $38,000 |
| Advanced Shuttle | Chemical | 45,000 | $250 | 10,000 | $10,000 |
| Proposed System | Electromagnetic | 500,000 | $0 | 300,000 | $0 |

Table 11 clearly demonstrates the truly profound and revolutionary performance capabilities of the electromagnetically propelled reusable space transportation system. Since no rocket fuel is required to launch an electromagnetically propelled spaceplane, and since the spaceplanes are completely reusable, the transportation cost of delivering payloads to various orbits is essentially equal to the cost of generating the required electric power. However, since the system generates its own power, this cost is zero. In fact, since the system will generate much more electric power than it needs for launching spaceplanes—the excess of which is sold as commercial electric power to various utility companies—the system could even provide free space transportation service and still generate vast amounts of income revenue. It is a completely self-contained gravity powered space transportation system. (The liquid oxygen and liquid hydrogen used by the on-board chemical rocket engines for orbit circularization are manufactured by a completely automated cryogenic propellant plant constructed near the landing field (spaceport) that also operates free-of-charge by using free excess electric power.) The system has the capability of rendering space travel less costly than commercial air travel because airlines are burdened by having to pay expensive fuel costs. There are no fuel costs in the proposed space transportation system. It is powered free-of-charge by the Earth's gravitational field.

Since the energy required to launch a spaceplane is supplied by free energy generating sources located off the vehicle, (rather than by massive energy sources carried on-board the vehicle) and since the propulsive thrust used to accelerate the spaceplane is generated by magnetic forces with zero mass (rather than by expelling huge quantities of inertial mass for reaction thrust that is carried on-board the vehicle) both the energy generating source and the propulsive thrust source used to launch the spaceplane are completely removed from it, and therefore independent of them. Thus, enormous amounts of dead inertial mass is completely removed from these spaceplanes. (In conventional rocket propelled launch vehicles, this dead inertial mass represents about 95% of the vehicle's total launch mass.) Consequently, enormous amounts of clean electrical power can be concentrated (without adding any inertial mass to generate whatever magnetic forces are required to accelerate a spaceplane to the required launch velocity $V_o$—essentially independent of vehicle mass. This separation between the launch vehicle and the required launch energy-thrust source, allows the vehicle to achieve essentially unlimited performance in terms of payload carrying ability and economy. Thus, the payloads that the spaceplane can deliver to LEO and GEO given in Table 11 are not to be considered as upper bounds on the electromagnetic system (as opposed to the payloads given by the other systems which are upper bounds). The spaceplane payloads given in Table 11 can be viewed as "average" payloads that can be increased if the bulk mass density of some particular payloads is higher than others. Since the on-board rocket propulsion required to deliver payloads to lunar orbit will be much lower than that required for delivering payloads to geosynchronous orbit, the electromagnetically propelled spaceplane will actually be capable of delivering greater payloads to lunar orbit than to geosynchronous orbit. Representative payloads to lunar orbit would be on the order of 400,000 kg.

The passenger carrying spaceplanes described above with a seating capacity of 800 would be ideal for low cost commercial round trip flights to lunar orbit. The spaceplane could rendezvous in lunar orbit with a large orbiting central passenger terminal. A fleet of relatively small lunar landing shuttle vehicles could provide local transportation to specific landing areas scattered in many different locations all over the surface of the Moon. These landing areas would be adjacent lunar colonies or cities with large protective pressure domes for artificial atmospheres.

One of the most important aspects of the proposed Earth-based electromagnetic linear accelerator system is that it is also designed to generate enormous quantities of clean renewable electric power—in fact much more electric power than is required to operate it. I have described how its cooling conduit can be utilized to carry water from the reservoir system, high in the Rocky Mountains, down to a hydroelectric power plant at sea level where it can be harnessed to generate 7.719 GW of continuous electric power. But all of this electric power is generated from a system that is primarily designed to cool the accelerator—not to generate electric power. The system that is primarily designed to generate electric power is the hot water conduit, not the cold water conduit. I shall now determine how much electric power can be generated from this system. Since the primary input energy source of this system is geothermal, the hot water emerging from the end of the hot water conduit will be fed into a giant geothermal power plant rather than a hydroelectric power plant, as in the case of the cooling water.

Figure 41:
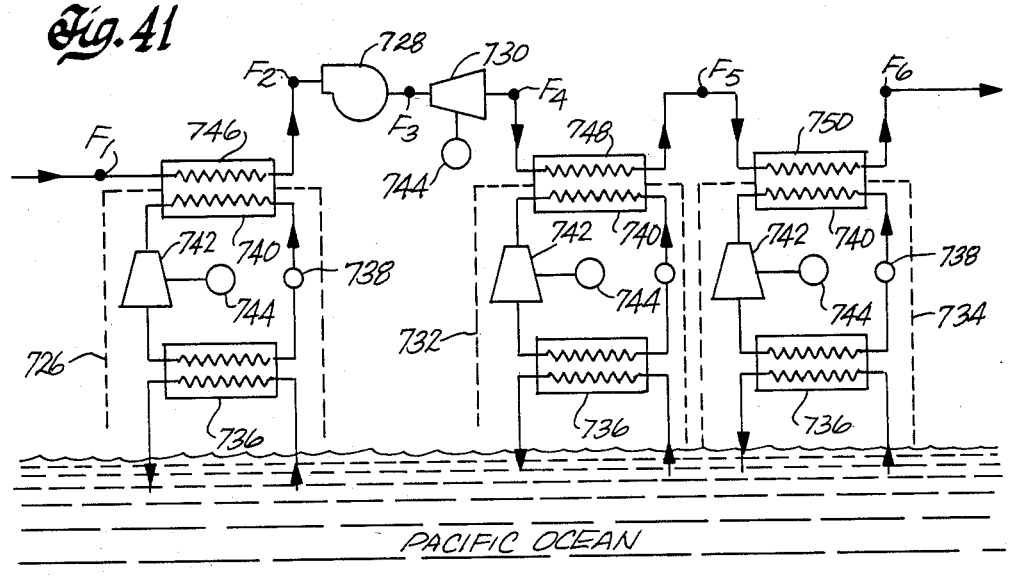
FIG. 41 is a block diagram of a multistage geothermal power plant designed for converting the geothermal energy absorbed by the hot water flowing through the accelerator tunnel into electrical energy.

FIG. 41 is a block diagram of the large multiple stage geothermal power plant illustrating the basic thermodynamic processes and operating principles. It contains five separate electric generating stages. The first stage is a high temperature, closed cycle condensing heat engine 726. The second stage is a high temperature, high pressure hydroelectric turbine generator 728. The third stage is a high temperature, high pressure bi-phase steam turbine electric generator 730. The fourth stage 732 and fifth stage 734 are low temperature closed cycle condensing heat engines.

It is assumed that the maximum temperature of the water moving through the hot water conduit heated by the surrounding rock via geothermal energy is 750° C. (1,382° F.). It is further assumed that in view of the thick jacket of evacuated multilayer thermal insulation (and the increased speed) it is possible to transport this hot water all the way through the remaining portion of the hot water conduit and feed it into the geothermal power plant without losing more than 20° C. (The actual loss will probably be significantly less than 20° C.). The detailed thermodynamic analysis of the power plant is carried out by determining the four thermodynamic state parameters, which are, temperature $T_i$, pressure $P_i$, specific enthalpy $H_i$ and specific entropy $S_i$ of the water at the various flow points $F_i (i=1,2,\ldots 6)$ separating the five power generating stages. These thermodynamic flow points are illustrated in FIG. 41.

The three thermodynamic stages 726, 732 and 734 are essentially three closed cycle Rankine engines that utilize the geothermally heated water as their high temperature heat reservoirs, and the near-by sea water as their low temperature heat reservoirs. The basic operating principles of these closed cycle condensing heat engines are well known in the art of thermodynamics. Although each engine uses different working fluids, they all have condensers 736 for condensing the working fluid to liquid; compressors 738 for compressing the liquid working fluid to high pressures; heat exchangers 740 for extracting heat energy from the high temperature heat reservoir represented by the geothermally heated water thereby vaporizing the liquefied working fluid to compressed gas; and expanders 742 where the compressed gas is expanded thereby converting the heat energy absorbed in the heat exchangers 740 into mechanical output work. The vapor discharged from the expanders 742 are recycled back into the condensers 736 where the heat of vaporization is extracted by the low temperature heat reservoir represented by the ambient sea water and liquefied. The expanders 742 are connected to high efficiency electric generators 744 that convert the mechanical shaft output of the expanders 742 into electric power. These electric generators 744 that convert mechanical shaft power into electric power can be designed to be very efficient.

As in the case of the cold water emerging from the cold water conduit, the hot water emerging from the hot water conduit also has a hydrostatic pressure of 426.40 Bar (420.82 Atm) due to gravitational compression. Consequently, since the initial temperature $T_1$ of the water entering the geothermal power plant at point $F_1$ is assumed to be 730° C., the two remaining thermodynamic state parameters $H_1$ and $S_1$ at the initial point $F_1$ are completely determined. The values of these parameters can be obtained by consulting thermodynamic tables of water corresponding to the above values of $T_1$ and $P_1$. The complete set of values are: $T_1=730°$ C., $P_1=426.40$ Bar, $H_1=3750.4$ Joules/gm, $S_1=6.4203$ Joules/gm° K.

Since the critical temperature and pressure of water is 374.15° C. and 221.20 Bar respectively, the hot water flowing into the geothermal power plant is 100% liquid. This incoming water is circulated through a thermally insulated isobaric heat exchanger 746 where it serves as the high temperature heat reservoir for the first stage Rankine engine 726. This heat exchanger 746 and first stage engine 726 are designed such that the temperature $T_2$ of the water leaving the heat exchanger 746 is 380° C. (716° F.) which is a few degrees above the critical temperature. Consequently, the thermodynamic flow parameters of the water leaving the first heat exchanger 746 at point $F_2$ are: $T_2=380°$ C., $P_2=426.40$ Bar, $H_2=1766.99$ Joules/gm, $S=3.8602$ Joules/gm² K.

The specific heat $\hat{Q}_{out1}$ extracted from the water moving through the isobaric heat exchanger 746 is given by $\hat{Q}_{out1} = H_1 - H_2 = 1983.40$ Joules/gm. Assuming that all of the heat exchangers 740 are thermally insulated from the outside environment, it follows that the heat $\hat{Q}_{in1}$ absorbed by the first stage engine is equal to $\hat{Q}_{out1}$.

The average water temperature of the Pacific Ocean off Eureka, Calif. is 12° C. (53.6° F.). Consequently, this is the temperature of the low temperature heat reservoir of the three Rankine stages. Therefore, the Carnot efficiency $\eta_1$ of the first stage is given by $$\eta_1 = \frac{730 - 12}{730 + 273.15} = .7157 \text{ or } 71.57\%$$

By optimizing this stage it can be assumed that an actual operating thermal efficiency of 50% can be obtained. Thus, the specific output work $W_1$ of the first stage will be given by $$\hat{W}_1 = 0.50 \, \hat{Q}_{in1} = 991.70 \text{ Joules/gm}$$

After the water emerges from the first heat exchanger 746 (at point $F_2$) it is fed into the second stage engine 728 which is a high pressure hydroelectric turbine generator. The outlet pressure of this turbine is designed to be 230 Bar which is slightly above the critical pressure. Consequently, by assuming that the turbine 728 is isentropic, the thermodynamic flow parameters of the water leaving the turbine 728 at point $F_3$ will be: $T_3=361.88°$ C., $P_3=230$ Bar, $H_3=1733.62$ Joules/gm, $S_3=3.8602$ Joules/gm° K.

The efficiency of high pressure water turbine 728 can be assumed to be 95%. Thus, the specific shaft output work $W_2$ of the hydroelectric stage will be $$W_2 = 0.95 \, (H_2 - H_3) = 31.70 \text{ joules/gm}$$

After the water emerges from the water turbine 728 (at point $F_3$) it is fed into the high pressure bi-phase turboexpander 730. As in the design of the turbine 728, this expander 730 is coupled to an electric generator. The expansion process of the expander 730 is designed to isentropically expand the water from a pressure of $P_3=230$ Bar all the way down to $P_4=1.00$ Bar (which is approximately equal to standard atmospheric pressure). Since the initial temperature and pressure $T_3$, $P_3$ of the water is very close to the critical point, a large fraction of the water will "flash" to vapor during the expansion process.

Since the expansion is assumed to be isentropic, the thermodynamic state parameters at the discharge point $F_4$ can be obtained from a Temperature-Entropy chart of water by following the constant entropy line of $S_3$ down to a pressure of 1.00 Bar. The results are: $T_4=100°$ C., $P_4=1.00$ Bar, $H_4=1372.73$ Joules/gm, $S_4=3.8602$ Joules/gm° K.

If the overall efficiency of the bi-phase turboexpander 730 is 90%, then the specific output work of the third stage will be $$W_3 = 0.90 \, (H_3 - H_4) = 324.80 \text{ Joules/gm}$$

After the water is discharged from the third stage turboexpander 730 it is fed into and circulated through the thermally insulated isobaric high temperature heat exchanger 748 of the fourth stage 732. This stage is a closed cycle Rankine engine which utilizes the water discharged from the turboexpander 730 as its high temperature heat reservoir. The discharge water temperature of this stage will be assumed to be 60° C. Since the low temperature heat sink of this stage is 12° C., the Carnot efficiency is $$\eta_4 = \frac{100 - 12}{100 + 273.15} = .2358 \text{ or } 23.58\%$$

The thermodynamic state parameters of the water leaving the heat exchanger 748 at point $F_5$ are: $T_5 = 60°$ C., $P_5 = 1.00$ Bar, $H_5 = 251.20$ Joules/gm, $S_5 = 0.8309$ Joules/gm° K. Consequently, the specific heat $Q_{out4}$ extracted from the water circulating through the isobaric heat exchanger 748 is given by $Q_{out4} = H_4 - H_5 = 1121.53$ Joules/gm. In view of the fact that the heat exchanger 748 is thermally insulated from the ambient environment, all of this heat is absorbed by the working fluid of the fourth stage engine and represents the input heat $Q_{in4}$. Since the Carnot efficiency of this stage is 23.58%, the operating thermodynamic efficiency can be assumed to be 18%. Consequently, the specific output work $W_4$ of this stage is given by $$W_4 = 0.18 \, Q_{in4} = 201.88 \text{ Joules/gm}$$

The fifth and last stage is represented by the low temperature Rankine engine 734. (The reason why the last two stages are not combined into a single stage is because by separating the stages, the working fluids in each stage can be selected to give higher operating efficiencies.) Thus, after the working fluid is discharged from the heat exchanger 748 of the fourth stage, it is immediately fed into the heat exchanger 750 of the last stage 734. The water discharged from this heat exchanger 750 will be assumed to have a temperature of 30° C. Consequently, the thermodynamic state parameters of the water after circulating through this heat exchanger at point $F_6$ are: $T_6 = 30°$ C., $P_6 = 1.00$ Bar, $H_6 = 125.8$ Joules/gm, $S_6 = 0.4365$ Joules/gm° K.

The specific heat extracted from this water and absorbed by the working fluid of the fifth stage is equal to $Q_{in5} = H_5 - H_6 = 125.40$ Joules/gm. The Carnot efficiency $\eta_s$ of this stage is $$\eta_5 = \frac{60 - 12}{60 + 273.15} = .1441 \text{ or } 14.41\%$$

Consequently, the overall operating thermodynamic efficiency of the fifth stage can be assumed to be 10%. It therefore follows that the specific output work W of this stage is given by $$W_5 = 0.10 \, Q_{in5} = 12.54 \text{ Joules/gm}$$

The total specific mechanical output work $W_h$ of the entire geothermal power plant is represented by the combined outputs of all five stages $$W_h = \sum_{i=1}^{5} W_i = 1,562.62 \text{ Joules/gm}$$

Each of the various expanders and prime movers of each stage are connected to large electric generators for converting mechanical shaft power to electric power. By utilizing high efficiency state-of-the-art generator design, the shaft power to electric power conversion efficiency $\eta$ of these generators can be assumed to be 98%. Consequently, the net electric power generating capacity $P_h$ of the geothermal power plant will be $$P_h = 1000 \, m_h \, W_h \, \eta = 265.179 \text{ GW}$$

The total electric power output P of the accelerator system is equal to the combined outputs of the geothermal power plant (utilizing the accelerator's hot water system) and the hydroelectric power plant (utilizing the accelerator's cold water system). Thus, the grand total electric power output is $$P = P_h + P_c = 272.898 \text{ GW}$$

Electric power generation on such a gigantic scale as this is difficult to describe. It dwarfs the output of the largest power plants ever constructed. For example, it represents more electric power than the combined outputs of all of the world's nuclear power plants operating at maximum capacity. It is about equal to the combined output of 55 Glaser type 5 GW orbiting solar power satellites in geosynchronous orbit! It represents more power than the total U.S. installed electric generating capacity of 1978 (from all sources).

All of this tremendous electric generating capacity is achieved without exhausting, discharging or creating any toxic waste products whatsoever. There is zero environmental pollution—no acid rain, no smoke, no radioactive waste products. Just clean, renewable, geothermal and hydroelectric power plants generating continuous, unending, electric power. No coal shipments, oil tankers or nuclear materials are involved. Since the plants would require very little maintenance with zero fuel costs, the operating overhead would be extremely low relative to the output power.

It should be emphasized that since the heating portion of the hot water conduit will be close to 1,000 km long, the total amount of heat contained in the geothermal heat reservoir that is harnessed to heat the flowing water is enormous. For example, it has been shown that a cube of hot rock 1.6 km on end at a temperature of 1,000° C. contains enough geothermal energy to generate 200 MW of electricity in a geothermal power plant operating continuously at a thermal efficiency of only 10% for an entire century! (See, *Handbook of Geothermal Energy*, Gulf Publishing Co., 1982, Ch. 2, pp. 44-178, by I. M. Edwards et al). Thus, a similar cube that is 16 km on end, could be harnessed to generate 200 GW of continuous electric power for a century. However, the actual body of 1,000° C. hot rock that is harnessed by the proposed system would be many times greater than a single cube this large. Consequently, for all practical purposes, the geothermal power plant would be able to operate continuously at 265.179 GW indefinitely. The power plants could be constructed along the beach near Eureka, Calif. extending for several kilometers. The unused thermal energy could be absorbed over a large volume of ocean water. Since the water entering the plants is pure, uncontaminated fresh mountain water transported all the way from the Rocky Mountains, it could be utilized for agricultural irrigation after it is discharged from the plants. It could also be fed into the California Aqueduct system and transported to Southern California.

All of the electric power not required by the accelerator for launching space vehicles will be sold as commercial power to various electric utility companies. This will generate enormous amounts of continuous income revenue. Although some of this excess power could be fed into the existing U.S. electric power grid for distribution, it will not be possible to feed all of it into this system. There is simply too much power. Therefore, instead of constructing a vast network of new electric power transmission lines to handle the overload using conventional high voltage cables, the excess power will be distributed via high power microwave transmission.

Figure 42:
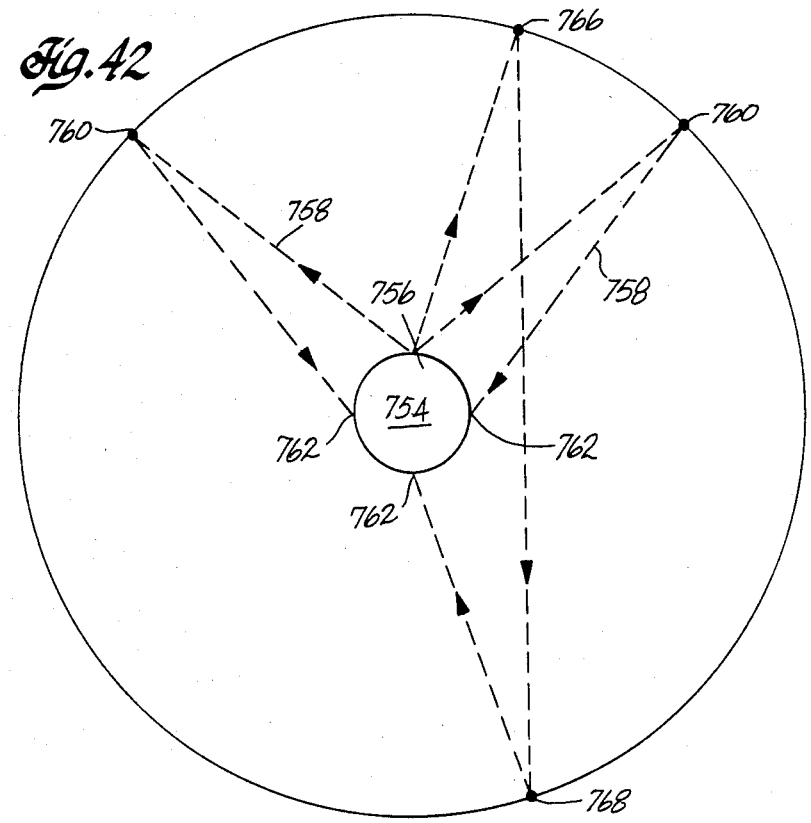
FIG. 42 illustrates the operating principles of a world wide electric power distribution system utilizing microwave power transmission and passive orbiting microwave reflector satellites.

This system of power distribution via microwave transmission is illustrated in FIG. 42. A large fraction of the excess electric power (say 200 GW to 225 GW) is transmitted via a network of underground superconducting power lines 752 to a central microwave transmitting station. This station is located a few dozen kilometers from the power plants. It contains a field of several large planer phased array microwave transmitting antennas 754. Each transmitting antenna 754 is circular with a diameter of a few kilometers. Electric current is fed into many thousands of high power microwave generators 756 mounted in a matrix grid behind each antenna. These generators 756 convert the incoming electric current into microwaves that are fed into each antenna for transmission into space as coherent phased microwave beams 758.

A system of relatively low mass passive reflector satellites 760 are deployed in geosynchronous orbits. These reflector satellites 760 reflect the microwave beams 758 transmitted from the transmitting antennas 754 to various receiving antennas 762 located all over the world. The receiving antennas 762 are "rectennas" several kilometers in diameter that convert the microwave power back into electric power. This electric power is then fed into the existing electric power grid 764 in that particular region and sold as commercial electric power. By using two reflecting satellites, 766 and 768 illustrated in FIG. 42, power can be transmitted half way around the Earth.

Since all of the passive orbiting reflector satellites are relatively inexpensive, this entire world wide electric power transmission system represents a very economical method for making available huge amounts of clean, non-polluting electric power to other industrialized countries outside the Soviet Block. Japan and Western Europe could be prime customers for this power. It could have profound political implications. For example, by transmitting 25 GW to West Germany, 25 GW to France, 25 GW to England and 25 GW to Italy, Western Europe would become energy self-sufficient. Essentially all shipments of oil from the Middle East and coal from the United States could be terminated. The Soviet pipeline to Western Europe could be dismantled and removed. Likewise, by transmitting 40 GW to Japan, that country could also be made energy self-sufficient.

It would require shipments of one super tanker per week, loaded with one million barrels of crude oil to generate 10 GW of continuous electric power. Thus, the 140 GW of transmitted power would represent 14 super tankers per week of Arabian oil that could be cancelled. Since burning all of this crude oil would be eliminated, this power transmitting system would have a tremendous beneficial effect on the environments of those countries. All of the remaining power could be transmitted to various regions within the United States. It could also be used for replacing coal burning power plants in the central and eastern part of the United States that is causing "acid rain".

The design of the power relay satellites 760 would be similar to that described in my publication "Solar Powered, Self-Refueling, Microwave Propelled Interorbital Transportation System," AIAA Paper No. 83-1446, AIAA 18th Thermophysics Conference, June 1-3, 1983, Montreal, Canada. A detailed technical discussion of microwave power transmission can be found in the article "The Technology and Application of Free-Space Power Transmission by Microwave Beam," *IEEE Proceedings*, Vol. 62, No. 1 Jan. 1974, pp. 11-25 by W. C. Brown. The overall, electric power in, electric power out, transmission efficiency would be about 80%. In view of the tremendous distances involved, this efficiency is extremely high.

It is evident that the proposed gravity powered Earth-based electromagnetic transportation system, for launching manned space vehicles is much more than a transportation system. It is also a system for generating clean renewable non-polluting electric power on an enormous scale. This generating power is two orders of magnitude greater than the largest prior art electric generating plants. Moreover, the system also includes a world wide transmission system for distributing this power simultaneously to various countries (across oceans) all over the world.

It is reasonable to assume that by the year 2000 and beyond, the cost of electric power will be at least .12 KW-hr. Suppose that the entire 272.898 GW of electric generating capacity of the proposed transportation system is fed into the electric power grids of the U.S. and those of other countries and sold as commercial power to utility companies at 12¢/KW-hr. This sale would generate a gross income of $786 million per day!

This tremendous revenue generating capability has profound implications regarding how the construction of the entire transportation system could be financed. For example, since it would require about 12 years to excavate the 1,530 km long, 46 km deep tunnel, it is reasonable to assume that the reservoir system in the Rocky Mountains and the hydroelectric-geothermal power plants in Eureka, Calif. could be constructed and readied for operation before the tunnel is completed. As described above, the excavation project itself would produce about 23 GW of electric power that would generate an income revenue of $66 million per day. Consequently, over the 12 year excavation period, a total income of about $289 billion would be generated.

But this is only the beginnnng. As soon as the annular hot and cold water conduits are installed and connected to the reservoir system and to the power plants, the water could be turned on. The resulting output power of 272.898 GW could be immediately fed into the power grids and sold as commercial electric power to the various utility companies. This would represent the end of the first phase of the construction project. Income revenue would now begin accumulating at a rate of $786 million per day instead of $66 million per day. Just one year of this enormous income revenue would be $287 billion. When this is combined with the gross income accumulated during the excavation period, the entire cost of the project including: the tunnel, the reservoir system, the electric generating plants, the microwave power transmission system, the electromagnetic accelerator system, and the construction of a large fleet of reusable spaceplanes and expendable launch vehicles would be small in comparison. Since it would probably require another five years to complete the project, the accumulated gross income revenue during this six year period would be astronomical. Thus, even before the space transportation system begins operating, its entire cost could be paid for many times over.

This construction project would also represent an enormous opportunity of employment for hundreds of thousands of skilled and unskilled workers. It would have a significant beneficial impact on the entire U.S. aerospace manufacturing industry. Thousands of subcontractors all over the United States would be involved.

After the system begins operating in its primary function—that of providing low cost space transportation—the potential income revenue could be even increased. As described in Table 11, the lowest expected cost for transporting round-trip payloads (such as passengers) between the Earth's surface and geosynchronous orbit with future reusable chemically propelled rocket vehicles (such as the U.S. Space Shuttle) will be about $10,000/kg ($4,535/lb). Although the proposed electromagnetically propelled transportation system could offer the same service free-of-charge and still be able to generate a vast amount of income revenue (by the sale of its electric power) the income could be significantly increased by charging, for example, $1,000/kg. This would represent a cost reduction of one full order of magnitude below the lowest possible cost offered by prior art reusable transportation systems. This cost reduction would, in turn, increase the demand for the transportation service. Thus, by carrying out only one flight per week to geosynchronous orbits with a payload of 300,000 kg, the annual gross income revenue of the system would be increased by $15.6 billion per year.

Since no other space transportation service could offer such low prices, all possible competing commercial space transportation systems would rapidly disappear. The proposed system would represent a world wide monopoly on space transportation based on the proposition of offering better transportation service at a cheaper price. The proposed system could provide commercial space transportation for all countries outside the Soviet Block. Thus, when one contemplates all of the possible nation states, world wide corporations, and private individuals that may want to use this space transportation service, the launch rate could grow to several launches each day. The landing field (i.e., spaceport) would begin to resemble a major international airport.

When heavy use of the system becomes routine, the cost for using it could be lowered two more orders of magnitude—thereby stimulating still greater use and increasing demand. Thus, by applying the basic principles of supply and demand economic theory, the cost could be significantly lowered while increasing the net operating profit. This would open the door to commercial space travel by ordinary citizens on an enormous scale. Large orbiting space stations and lunar colonies could be established to serve these travelers. It would be the beginning of the real colonization of space. This early colonization of space would be the direct result of the proposed Earth based electromagnetic space transportation system—a system that could be constructed with today's technology.

In order to analyze the potential revenues that could be generated by the proposed Earth-based electromagnetic space transportation system operating as a privately owned commercial spaceline (similar to a privately owned commercial airline) I have compiled a list of possible places where space transportation could be provided. The list includes possible rate schedules (for passengers, and cargo), flight times, passengers (and cargo) per spaceliner, average number of flights per year and the resulting annual gross revenue. The results appear in Table 12.

TABLE 12

Potential Gross Income Revenue Generated By Operating The Proposed Earth-Based Electromagnetic Space Transportation System As A Privately Owned Commercial Spaceline

| Orbiting Spaceports | Flight Time | Cost Passenger | Cost (Cargo) | Passengers Per Flight | Cargo (kg) Per Flight | Revenue Per Flight | Flights Per Year | Revenue Per Year |
| --- | --- | --- | --- | --- | --- | --- | --- | --- |
| LEO (Cargo) | 90 min | $1,500 | $8/kg | 200 | 400K | $3.5 M | 300 | $2.10 B |
| LEO (Passengers) | 90 min | $2,000 | $10/kg | 800 | 300K | $4.6 M | 1,000 | $9.20 B |
| GEO (Cargo) | 12 hr | $2,500 | $12/kg | 200 | 300K | $4.1 M | 500 | $4.10 B |

TABLE 12-continued

Potential Gross Income Revenue Generated By Operating
The Proposed Earth-Based Electromagnetic Space Transportation
System As A Privately Owned Commercial Spaceline

| Orbiting Spaceports | Flight Time | Cost Passenger | Cost (Cargo) | Passengers Per Flight | Cargo (kg) Per Flight | Revenue Per Flight | Flights Per Year | Revenue Per Year |
|---|---|---|---|---|---|---|---|---|
| GEO (Passengers) | 12 hr | $3,000 | $15/kg | 800 | 200K | $5.4 M | 1,000 | $10.80 B |
| $L_4$, $L_5$ (Cargo) | 72 hr | $4,000 | $30/kg | 200 | 350K | $11.3 M | 500 | $11.30 B |
| $L_4$, $L_5$ (Passengers) | 72 hr | $4,500 | $35/kg | 800 | 200K | $10.6 M | 1,000 | $21.20 B |
| Moon (Cargo) | 75 hr | $4,500 | $32/kg | 200 | 350K | $12.1 M | 500 | $12.10 B |
| Moon (Passengers) | 75 hr | $5,000 | $40/kg | 800 | 200K | $12.0 M | 1,000 | $24.0 B |
| Planetary (Cargo) | 48 hr | $8,000 | $70/kg | 200 | 250K | $19.1 M | 60 | 42.29 B |
| Planetary (Passengers) | 48 hr | $10,000 | $80/kg | 800 | 200K | $24.0 M | 80 | $3.84 B |
| Waste Disposal | Solar Escape | — | $100/kg | — | 50K | $5.0 M | 1,000 | $5.0 B |
| Unmanned Exploration | 1–2 yr | — | $500/kg | — | 100K | $50 M | 60 | $3.0 B |

Key: K = One Thousand M = One Million B = One Billion
Average Number Of Launches Per Day: 20
Total Number Of Launches Per Year: 7,000
Total Number of Spaceplanes In Fleet: 5,000
Gross Annual Income From Space Transportation: $108.93 B
Average Electric Power Used By Electromagnetic Accelerator: 12.898 GW
Average Electric Power Sold To Utility Companies: 260.00 GW
Gross Annual Income From Sale Of Electric Power: $273.50 B
Total Annual Gross Income Of System: $382.43 B
Estimated Annual Operating Overhead: $32.43 B
Estimated Annual Net Profit: $350.00 B As pointed out above, the flight operations at the landing field resemble those of a large international airport. However, unlike conventional aircraft, as soon as a spaceplane completes its landing roll, the wings and tail surfaces are retracted back into the fuselage before it pulls up to the passenger terminal or loading dock. The systems check-out procedures are essentially all computer controlled and completed before the spaceplane is loaded for another flight into space. Although the landing field is designed primarily for spaceplanes returning from space, there will be many conventional aircraft landing and taking off with passengers and/or cargo for cities all over the world.

The passenger cost entries given in Table 12 refer to the cost of one-way way passenger travel from the Earth-based spaceport to an orbiting spaceport, or from an orbiting spaceport to the Earth-based spaceport. This equal, either-way, travel cost also applies to non-passenger cargo. It is assumed that there will be extensive manufacturing taking place in space that will require transportation to Earth. Thus, it is assumed that each leg of every flight to and from a spaceport contains a maximum passenger load and a nearly maximum cargo load (mass wise). Thus, the entry "Flights Per Year" refers to round trip flights and the entry "Revenue Per Year" is twice the revenue generated from one-way flights.

The travel cost figures given for flights to LEO, GEO $L_4$, $L_5$ and lunar orbit (Moon) were specifically designed to be not too much higher than the expected cost of a first class ticket on an ocean going luxury liner. Orbiting spaceports labeled LEO (Cargo) indicates that the spaceport is a construction site in low Earth orbit. The spaceplanes operating between these spaceports and the ground based spaceport are special purpose cargo spaceplanes specifically designed for transferring cargo with a few passengers. These spaceports could also be orbiting factories processing materials in a zero g environment. Orbiting spaceports labeled LEO (Passenger) refers to large orbiting space stations (or cities) in low Earth orbit. The spaceplanes traveling to these spaceports are specifically designed for carrying large numbers of passengers together with some cargo. They can be referred to as passenger carrying spaceliners. However, these spaceplanes have an exterior design essentially identical to that of the cargo carrying spaceplanes. This distinction between Cargo and Passenger spaceports is followed throughout the table.

Orbiting spaceports labeled $L_4$ and $L_5$ refer to large space stations moving in the vicinity of the Moon at the Lagrange libration points $L_4$ and $L_5$. Since these points have the special property of appearing stationary in the Earth-Moon system, they could be very useful locations for constructing large space stations.

Spaceports labeled "Planetary" refers to very large interplanetary cruise ships that periodically pass by the Earth on never ending gravity propelled interplanetary trajectories. These cruise ships are very large and can accomodate several thousand passengers. They are cities that continually move throughout the Solar System transporting passengers (and/or cargo) from one planetary colony to another planetary colony. The ships are propelled from one planet to another planet without requiring any on-board rocket propulsion by utilizing my invention of "gravity propulsion". There could be several dozen of these interplanetary cruise ships moving simultaneously on their respective free-fall gravity propelled trajectories throughout the Solar System. Each time one of these ships approaches the Earth, one or more spaceplanes, carrying interplanetary voyagers and cargo are catapulted out to rendezvous and dock with it. The passengers leave the spaceplanes (which serve as shuttle vehicles) and continue their respective interplanetary voyages inside the cruise ship. The spaceplanes are left docked to the cruise ship to be used later by other passengers wishing to land on Earth the next time the ship passes it. This gravity propelled interplanetary transportation system represents the most efficient means for large scale passenger transportation throughout the Solar System. (For a detailed description of this system see my AAS publication: "Gravity Thrust And Interplanetary Transportation Networks," *Use of Space Systems for Planetary Geology and Geographics*, Science & Technology Series Vol. 17, American Astronautical Society, 1968, pp. 507–540.)

The total mass of these interplanetary cruise ships could be multiples of $5 \times 10^6$ kg. They could be constructed by assembling a collection of $5 \times 10^6$ kg subsections or modules injected onto slowly converging interplanetary trajectories from eccentric Earth orbits using my microwave propelled interorbital transportation system. (See my paper, "Solar Powered, Self-Refueling, Microwave Propelled Interorbital Transportation System," ALAA 18th Thermophysics Conference, June 1-3, 1983, Montreal, Canada, AIAA Paper No. 83-1446.) Each $5 \times 10^6$ kg module could itself be constructed in LEO by assembling large prefabricated sections launched from the Earth's surface inside spaceplanes (configured as large cargo carriers).

The proposed Earth-based electromagnetic launching system is also idetally suited for permanently disposing of high-level radioactive waste material by injecting it completely out of the Solar System. This can be accomplished by loading it aboard relatively small expendable launch vehicles and accelerating it onto hyperbolic interplanetary trajectories that escape the Solar System. Such vehicles could be especially designed for this purpose and, by employing automated mass production techniques, their cost would be relatively low. These missions are labeled "Waste Disposal". With a disposal cost of only $100/kg, this method of disposal would be in very great demand—not only by the United States but by almost all industrialized countries—because it represents the ultimate disposal. It offers total and permanent separation of the waste material from the entire Solar System. It could also be used to dispose of other toxic substances such as chemical dioxins, etc.

The electromagnetic accelerator would also be ideal for launching unmanned high speed exploration vehicles throughout the Solar System. These launch vehicles could be very sophisticated multi-stage vehicles for transporting scientific payloads to other planets or satellites thereof. The injected payload mass (excluding launch vehicle mass) could be 100,000 kg (220,500 lbs). This is more than one full order of magnetude greater than current payloads designed for unmanned exploration of the Solar System. Moreover, the interplanetary transfer trajectories could be extremely fast. Hyperbolic excess velocities leaving Earth could exceed 40 km/sec. In many cases, the payloads could be decelerated near their destinations by atmospheric breaking. This would allow most of the payload mass to be scientific hardware instead of rocket fuel for retro propulsion. (For example, see my paper "Reducing Energy Requirements for Orbiting or Landing on the Natural Satellites by Planetary Atmospheric Braking," Jet Propulsion Laboratory, TM 393-80, No. 16, 1971.) These missions are labeled "Unmanned Exploration" in Table 12.

The total number of launches per year is 7,000. This total includes 5,940 reusable spaceplane launches and 1,060 unmanned expendable vehicle launches. The total annual operating cost (i.e., all overhead) is assumed to be $32.43 billion. This figure includes the cost of maintaining all of the power generating plants, the microwave power transmission system, the electromagnetic accelerator and all of the spaceplanes. Since the spaceplanes are also powered aircraft, all of the major repair and overhaul work is carried out at a special facility several hundred kilometers from Eureka, Calif. This will keep the traffic at the Eureka spaceport to a minimum.

Even though the annual operating overhead is $32.43 billion, the expected net annual profit would be tremendous—$350.00 billion. This is a truly enormous profit that would even exceed the total construction cost of the entire system (including the fleet of 5,000 spaceplanes). It represents more net profit than the total profits of all of the world's 500 largest corporations combined! It would alter the entire U.S. balance of world trade. In fact, it would even exceed the total net profits of the entire world wide oil cartel (OPEC). This profit could be spent on purchasing more spaceplanes, enlarging the Earth-based facilities, and constructing extensive spaceports and other space transportation systems all over the entire Solar System. It would lead to wide spread colonization throughout the entire Solar System.

Although the reader may view my Earth-based electromagnetically propelled space transportation system as "science fiction", or at least something for the very distant future, this is definitely not my view. All of the various components of the system, such as: the electromagnetic accelerator, the power generating and energy storage systems, the control systems, the vacuum tube, and the reusable spaceplanes are all well within engineering feasibility.

The most difficult aspect of the construction would involve boring the very deep tunnel required for the electromagnetic accelerator. I have disclosed how this can be achieved by utilizing my deep Earth gravity powered hydraulic tunnel boring machine. I have designed this machine for the specific purpose of boring the required tunnel. This boring machine does not involve any advanced technology. It does not require any preliminary research and development program before it can be designed and constructed. In fact, it could have been designed and constructed ten years ago—this entire Earth-based electromagnetic transportation system could have been designed and constructed ten years ago!

During the past quarter century, aerospace engineers and scientists havebbeen studying the problem of launching manned space vehicles into space. This effort has involved tens of thousands of researchers all over the world. Countless scientific articles and research papers have been published on this subject. Numerous launch vehicles have been designed and built to transport human passengers to orbit. In the United States, a reusable ground-to-orbit "Space Shuttle" has been designed, built and flown on numerous missions. Advanced single-stage manned shuttle vehicles are being designed. Super heavy lift launch vehicles are being designed for transporting massive payloads to orbit. All of these studies and launch vehicle designs have one common characteristic—they are all based on the proposition that the only practical means for accelerating a manned space vehicle from the Earth's surface to orbital velocities is by means of Newton's "third law of motion" and in particular, by classical rocket propulsion. Essentially, all conceivable alternative methods for propelling manned space vehicles from the Earth's surface to orbital velocities have been proposed, investigated and found to be impractical—including electromagnetic launchers.

Long range plans are being formulated for developing space transportation systems for use in the next century. According to these plans, all passenger carrying vehicles (and high payload vehicles) launched from the Earth's surface will use chemical rocket engines for their primary propulsive source. (See, "Liquid-Rocket Propulsion Technology," an AIAA Liquid Propulsion Technical Committee Assessment, *Astronautics & Aeronautics,* April 1983, pp. 46–56.) Unfortunately, these plans and prior art thinking, will have an enormous negative impact on the accessibility of space to ordinary private citizens. It will essentially rule out any possibility of developing a commercial space transportation service for transporting ordinary passengers from the Earth's surface into space. The travel costs would be too high. For example, the minimum cost for transporting a 100 kg passenger from the Earth's surface to an orbiting geosynchronous space station (using one or more advanced rocket propelled vehicles) would be about $1,000,000 (in 1980 dollars). There are not many private citizens who would be willing to pay this amount of money for a one-way trip into outer space!Of course, the reason why this cost is so high is due to the initial mass problem inherent in all chemically propelled rocket vehicles. Most of the fuel that must be carried aboard a chemically propelled rocket vehicle is required just to accelerate the unused portion. Other than this, it serves no useful purpose. Thus, Newton's third law of motion is a very inefficient method for propelling high thrust launch vehicles. The inevitable conclusion from all of this prior art research is that unless a fundamentally new method for achieving high thrust vehicle propulsion is discovered, mankind will never be able to engage in any significant amount of travel his own planet.

In view of these facts, the proposed Earth-based electromagnetically propelled, passenger carrying space transportation system represents a fundamental breakthrough in the art of space travel. It could open the door to a vast utilization of outer space on a scale previously considered only in the realm of science fiction. It would enable the economic construction of large permanent lunar bases, extensive manned interplanetary missions to various planets and their satellites, and low cost commercial interplanetary space travel for ordinary citizens. It represents a means by which the entire Solar System can be colonized.

Not only will the system provide economical space transportation for ordinary citizens, but it will also generate vast amounts of clean electric power on an unprecedented scale—in fact, more electric power than the total combined outputs of every nuclear power plant in the entire world operating simultaneously at maximum capacity. Present methods for generating bulk eletric power involve burning a combustible fuel (such as coal, oil or gas) or by operating nuclear reactors. Unfortunately, combustible fuels are being depleted at a rapid rate, they are expensive and their combustion products are toxic and harmful to the environment. "Acid rain", resulting from coal burning power plants, is growing to such alarming levels that it is threatening to destroy wide areas of the U.S. and Canada. It is approaching the state of becoming a national catastrophe. Nuclear power plants are subject to catastrophic accidents and generate very dangerous radioactive waste products. After the accident at the Three Mile Island nuclear power plant, public acceptance of nuclear power has reached an all-time low. Therefore, the prospects for substantially increasing the generation of bulk electric power beyond the present levels is not very good.

The annual demand for electric power in the U.S. is increasing at an exponential rate of about 5% every year. (See, *Efficient Electricity Use: A Practical Handbook For An Energy Constrained World,* Pergamon Press, Inc. New York, 1976, edited by C. B. Smith.) Consequently, since it is unlikely that prior art methods of bulk electric power generation will be able to satisfy this demand, and since the technology of fusion generated electricity is still many decades away from large scale bulk power generation, it appears that a major energy crisis is inevitable.

Bold new ideas have been put forward as a means for generating additional bulk electric power. One such method proposed by Peter Glaser over fifteen years ago involves generating and transmitting energy from space. Large satellites fitted with solar cells could be constructed and deployed in geosynchronous orbits. The satellites would convert incident solar radiation into microwaves which would be beamed back to Earth. A receiving antenna on the ground would convert the microwaves back into electric power which would be fed into the U.S. electric grid. The amount of power fed into the grid from each satellite would be about 5 GW. Unfortunately, the cost of each one of these orbiting solar power satellites would range in the hundreds of billions of dollars. Yet, there are serious plans for actually constructing and deploying these satellites.

The electric power generating system that I am proposing (as an adjunct to my space transportation system) will generate 55 times more elctric power than Glaser's orbiting solar power station. It's achieved not by going high above the Earth to geosynchronous orbit to collect solar energy, but by going deep underground to collect geothermal energy. The power plants that generate all of this electric power are located on the ground where they can be easily maintained—not in geosynchronous orbit where it would cost hundreds of millions of dollars just to tighten a loose bolt.

While the present invention has been described with reference to a specific embodiment, it will be obvious that many modifications and variations may be constructed without departing from the spirit and scope of the invention. For example, the design of the driving coils on the electromagnetic accelerator and the propulsion coils on the spaceplane can have many variations. In particular, the vehicle coils could be designed as a series of coaxial dipole coils interacting with corresponding accelerator coils. The accelerator could also take the form of an electromagnetic "railgun" catapult. All of the various designs for electromagnetic accelerators are considered within the domain of this invention. (See, for example, the various papers on electromagnetic accelerators presented at the 1980 Conference on Electromagnetic Guns and Launchers published in *IEEE Transactions on Magnetics*, Vol. MAG-18, No. 1, pp. 3-216, Jan. 1982.)

Although the preferred primary energy storage system uses high voltage capacitors, it could also be designed with homopolar generators, flywheels or superconducting energy storage systems mounted all along the accelerator. Likewise, the secondary energy storage system can utilize many different types of energy storage systems.

The method of converting geothermal energy into electrical energy may also have many different variations. For example, the hot water conduit could be replaced with banks of thermoelectric converters operating between the hot glass tunnel liner and the cold cooling conduit.

The reusable spaceplanes could also have many different variations. For example, it is not necessary to equip them with air-breathing jet engines for powered flight through the atmosphere.

Figure 43:
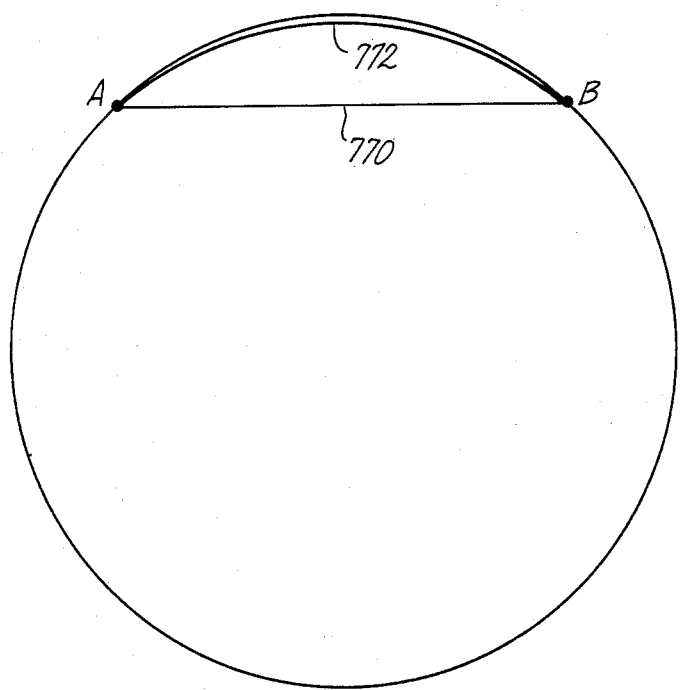
FIG. 43 illustrates an electromagnetic accelerator embedded underground that follows a curved path instead of a straight line.

Another important variation involves the path of the electromagnetic accelerator. Although the preferred path is a straight line connecting the end points, it could also be curved. This variation is illustrated in FIG. 43. Suppose that the beginning and end points of the accelerator are denoted by A and B respectively. In the preferred embodiment, the accelerator follows a straight line $\overline{AB}$ 770 connecting points A and B. However, this path may require a maximum tunnel depth that is too difficult to reach (or it may lie in a body of molten magma). However, by constructing the accelerator along the curved path AA 772, it will be possible to design the accelerator tunnel with a relatively shallow depth while still keeping the same beginning and ending points. The exit altitude and exit angle into the atmosphere would be lower but this would not present any significant problem because the reusable spaceplanes are equipped with magnetic deflector coils for deflecting the resulting shock waves away from the nose cone at any altitude.

The location of the accelerator can be other than described herein. In fact, the system could even be installed on other planets or satellites thereof. Since it will provide the most economical method for launching manned (or unmanned) vehicles from the surface of any sufficiently large celestial body, it could be installed throughout the entire Solar System. In this respect, the present application can be viewed as a "blueprint," or "grand strategy," that will enable the colonization of the entire Solar System.

I believe that this transportation system, and the colonization of space that this system will enable, is far more economical than the rather limited plans set forth by Gerard O'Neill. (See, for example, his publications, "The Colonization of Space," *Physics Today*, Vol. 27, Sept. 1974, pp. 32-40; and "Conquest of Space," *OMNI*, Vol. 6, No. 1, Oct. 1983, pp. 158-164). This strategy actually represents the enormous lengths engineers are willing to go to support their axiomatic like belief that the only practical means for transporting passengers to GEO (or other high Earth orbits) is by way of chemical rocket propulsion. O'Neill actually proposes to supply the tremendous amounts of oxygen that would be required for operating these vehicles by extracting it from lunar rocks. O'Neill concludes from his analysis that since it would be too costly to transport the oxygen "all the way out of the Earth's gravity well", it would be more efficient to transport it from a source that is already outside this "gravity well". Following Arthur C. Clarke, who proposed this strategy 25 years before O'Neill, he catapults the lunar rocks to an orbiting space station by a relatively small electromagnetic launcher. (See, "Electromagnetic Launching As A Major Contribution To Space - Flight," *Journal of the British Interplanetary Society*, Vol. 9, No. 6, Nov. 1950, pp. 261-267, by A. C. Clarke.) Thus, the basic strategy has remained essentially unchanged for at least 35 years. It is a strategy built around a passenger carrying space transportation system propelled by chemical rocket engines. It would require many hundreds of billions of dollars to implement these plans and continued expenditures of billions of dollars annually just to support a rather low level of space activity thereafter. (See the articles "Should We Make Products On the Moon," *Astronautics & Aeronautics*, June 1983, pp. 80-85 by W. F. Carroll et al; and "Finding Paydirt On The Moon and Asteroids," *Astronautics & Aeronautics* Nov. 1983, pp. 44-49, by R. L. Stoehle.)

The potential space transportation capability (in terms of number of passengers and/or payload) that could be transported to GEO or lunar orbits by my Earth-based electromagnetic system during only one day's operation would exceed that of all future space transportation systems currently being planned for the next century using chemically propelled launch vehicles (and separate interorbital transfer vehicles) during an entire year of operation. And, it would accomplish this feat without exhausting any combustion products into the atmosphere. It would be accomplished without requiring any energy input because the system generates all of the energy that it could possibly need. In fact, the total cost would be essentially zero since all of the launch vehicles would be reusable. It is a completely self-contained space transportation system. Even if it delivered all of this payload free-of-charge, the system would still be able to generate a net amount of income revenue during that short period of time by the sale of its excess electrical energy. In comparison, all of the proposed systems in the prior art would exhaust millions of tons of rocket exhaust products into the atmosphere, which would originate from millions of tons of cryogenic and non-cryogenic propellants—which, in turn, would cost billions of dollars to manufacture, store and deliver.

O'Neill, and essentially all other contemporary aerospace engineers in the art of astronautics, takes the position that the Earth's deep "Gravitational well" is a serious obstacle in the conquest of space because in order to achieve orbital flight, a launch vehicle must be given sufficient kinetic energy to climb out of this well. The space transportation system disclosed herein is based upon a precisely opposite point of view—a point of view whereby the Earth's strong gravitational field is viewed as a beneficial aspect and utilized to supply all of the energy required to accelerate a vehicle out of this well.

This is accomplished by constructing a very long tunnel embedded deep underground that starts at sea level and ends near the summit of a high mountain such that a significant gravitational potential difference is created between the end points. An annular water conduit is installed inside the tunnel and an electromagnetic accelerator is installed inside the annular water conduit. The gravitational potential difference is converted into electrical energy by using the water conduit in a hydroelectric power plant. The electrical energy is accumulated in electrical storage systems and periodically released into the electromagnetic accelerator for launching high mass space vehicles. The water conduit also serves as a cooling system for the accelerator. Moreover by constructing the tunnel with a maximum depth exceeding 20 km, it is possible to also harness the Earth's natural geothermal energy. This can be accomplished by installing another annular water conduit between the hot rock walls and the cold water conduit. The water flowing in this conduit is heated to very high temperatures by absorbing the geothermal energy from the hot rock walls in the deepest portion of the tunnel. The geothermal energy is converted into vast amounts of additional electrical energy by feeding the hot water into a geothermal power plant. Since the system will generate far more eletrical energy than is required to operate the accelerator and for domestic consumption, the excess electrical energy is converted into microwaves and transmitted to other countries where it is reconverted back into electric power and sold to local utility companies. Thus, the Earth's gravitational field not only supplies all of the energy required to launch space vehicles out of it gravitational well, but a vast amount of additional electrical energy can be generated by harnessing the Earth's geothermal energy field which can be sold as commercial power—thereby generating vast amounts of income revenues far beyond what could be generated by offering low cost space travel!

All of these truly remarkable operating features and benefits are totally unique to the art of space travel. They are obtained by simply recognizing and utilizing the Earth's gravitational field as a friendly ally that would like to assist mankind achieve space travel—rather than viewing gravity as an enemy that must be beaten into submission and conquered by the usual techniques of applying brute force rocket power with enormous launch vehicles as big as battleships.

From the foregoing description, it will thus be evident that the present invention has provided a vastly improved method and system for achieving economical space transportation. As various changes can be made in the above construction and operating methods without departing from the spirit or scope of the invention, it is intended that all matter contained in the above description or shown in the accompanying drawings should be interpreted as illustrative and not in a limiting sense.

What is claimed is:

1. A method for transporting passengers and/or freight from the Earth's surface into space by electromagnetic accelerator having an accelerating tube comprising the steps of:

introducing an air-tight piston into said accelerating tube;

closing an air-tight door behind said piston after introducing said piston into said tube;

evacuating the space between said piston and said door;

driving said piston through said tube by electromagnetic forces generated by said accelerator thereby forcing atmospheric air out of said tube;

withdrawing said piston from said tube after said tube is evacuated; and accelerating a space vehicle by means of an electromagneetic forces generated by said accelerator by passing said vehicle through said evacuated accelerating tube.

2. A method as set forth in claim 1 further comprising the steps of:

mounting a thin diaphragm having a magnetic susceptibility in air-tight sealing engagement over the end of said accelerating tube; and applying a suffcient magnetic field to said diaphragm that the inward force acting on said diaphgram generated by outside atmospheric pressure is substantially canceled by the magnetic force acting on said diaphgram generated by said magnetic field.

3. A method as set forth in claim 2 further comprising the steps of:

mounting an air-tight door some distance from the end of said accelerating tube; and closing said door immediately after a space vehicle passes said door such that said door is closed before any atmospheric gas reaches said door after said vehicle breaks through said diaphgram thereby preserving the vacuum inside a major portion of said tube.

4. A method as set forth in claim 3 further comprising the steps of:

mounting a new diaphram across the end of said tube after one vehicle is launched;

re-evacuating that portion of the tube between said closed door and said new diaphragm; and opening said door before another vehicle is launched.

5. A method as set forth in claim 1 further comprising the steps of:

mounting an air-lock means on the beginning of said evacuated electromagnetic accelerator;

introducing a space vehicle into the beginning of said accelerator while maintaining a vacuum inside the evacuated portion of said accelerator by means of said air-lock means; and accelerating said vehicle through the evacuated portion of said accelerator.

6. A method as set forth in claim 1 further comprising the steps of:

maneuvering said space vehicle into an orbit around the Earth my means of an auxiliary propulsion system mounted on-board said vehicle;

returning said space vehicle back into the Earth's atmosphere by means of said on-board propulsion system;

decelerating said space vehicle to suborbital velocities;

extending movable wings and aerodynamic control surfaces from the body of said space vehicle after said vehicle is declerated to suborbital velocities;

landing said space vehicle on a runway located on the Earth's surface;

retracting said movable wings and aerodynamic control surfacess into the body of said space vehicle; and accelerating said space vehicle by means of said electromagnetic accelerator for another trip into space.

7. A method as set forth in claim 6 wherein said space vehicle is equipped with a detachable nose cone that is mounted on the forward portion or the space vehicle during launching and jettisoned prior to landing.

8. A method as set forth in claim 6 wherein said space vehicle is equipped with a plurality of air-breathing jet engines that are turned off during launching and turned on during landing such that said space vehicle lands as a powered flight aircraft rather than as a glider.

9. A method as set forth in claim 8 wherein said air-breathing jet engines can be utilized to give said vehicle a sustained flight capability through the atmosphere prior to landing.

10. A method as set forth in claim 1 wherein said electromagnetic accelerator has a length exceeding 500 km.

11. A method as set forth in claim 1 wherein said electromagnetic accelerator is mounted inside an underground tunnel that begins at a relatively low elevation and ends at a relatively high elevation and further comprising the step of utilizing the gravitational potential difference between the ends of the tunnel to generate electrical energy for launching space vehicles by means of said electromagnetic accelerator.

12. A method as set forth in claim 11 wherein said step of utilizing said gravitational potential difference to generate electrical energy for launching said space vehicles comprises the steps of:

mounting a water conduit inside said tunnel;

feeding water into said conduit at the higher elevation;

withdrawing said water at the lower elevation, said withdrawn water compressed by gravitational hydrostatic water pressure;

feeding said withdrawn water into a hydroelectric turbine generator means thereby converting the hydrostatic water pressure of the outlet water into electrical energy;

accumulating said electrical energy inside an energy storage system; and discharging a portion of said accumulated energy into said electromagnetic accelerator for launching a space vehicle.

13. A method as set forth in claim 1 wherein said electromagnetic accelerator is mounted inside a tunnel that extends to a depth exceeding 5 km at the mid-point where the surrounding rock walls are at a relatively high temperature due to natural geothermal energy and further comprising the step of utilizing this geothermal energy for generating electrical energy.

14. A method as set forth in claim 13 wherein said step of utilizing said geothermal energy to generate electrical energy comprises the steps of:

mounting a water conduit inside said tunnel;

feeding water into said conduit at one end of said tunnel;

heating said water flowing through said conduit by absorbing geothermal energy from the surrounding rock walls;

withdrawing said heated water at the other end of said conduit; and feeding said heated water withdrawn from said conduit into a geothermal electric generating plant whereby a portion of said geothermal energy absorbed by said water is converted into electrical energy.

15. A method as set forth in claim 14 further comprising the step of feeding a portion of said electrical energy into an electric grid for commercial distritubtion to various utility companies.

16. A method for accelerating a body to high velocities within the Earth's atompshere by means of an electromagnetic accelerator having an accelerating tube comprising the steps of:

introducing an air-tight piston into said accelerating tube;

closing an air-tight door behind said piston after introducing said piston into said tube;

evacuating the space betwene said piston and said door;

driving said piston through the tube by electromagnetic forces generated by said accelrator thereby forcing atmospheric air out of said tube; and accelerating said body through said evacuated tube by means of said electromagnetic accelerator.

17. A method as set forth in claim 16 further comprising the steps of:

mounting a thin diaphgragm havign a magnetic susceptibility in air-tight sealing engagement across the end of said tube; and applying a sufficient magnetic field to the end of said tube that said magnetic field generates magnetic forces on the surface of said diaphgram that cancel out the inward pressure forces generated by the outside atomsphere.

18. A method as set forth in claim 17 further comprising the steps of:
mounting an air-tight door some distance from the end of said accelerating tube; and
closing said door immediately after said body passes said door such that said door is closed before any atomospheric gas reaches said door after said body breaks through said diaphragm, thereby preserving the vacuum inside a major portion of said tube.

19. A method as set forth in claim 16 further ompprising the steps of:
mounting an air-lock means on the beginning of said accelerating tube; and
introducing said body into said accelerating tube while maintaining a vacuum inside said tube by means of said air-lock means.

20. A space transportation system for transporting passengers and/or freight from the Earth's surface into space comprising:
a space vehicle;
an electromagnetic accelerator having an accelerating tube;
an air-tight piston adapted for travel through said accelerating tube;
means for introducing said piston into said tube;
means for evacuating the space behind said piston after said piston is introduced into said tube;
means for driving said piston through said tube by electromagnetic forces generated by said accelerator thereby forcing atmospheric air out of said tube;
means for withdrawing said piston from said tube after said tube is evacuated; and
means for accelerating said vehicle by passing through said evacuated accelerating tube.

21. A system as set forth in claim 20 further comprising:
a thin diaphragm having a magnetic susceptibility mounted in air-tight sealing engageament over the end of said accelerating tube; and
means for applying a sufficient magnetic field to said diaphgram that the inward force acting on said diaphgram generated by outside atmospheric presusre is substantially balanced by the magnetic force acting on said diaphgram generated by said magnetic field.

22. A system as set forth in claim 21 further comprising:
mounting an air-tight door some distance from the end of said accelerating tube; and
means for closing said door immediately after a space vehicle passes said door such that said door is closed before any atomospheric gas reaches said door after said vehicle breaks thorugh said diaphgram, thereby preserving the vacuum inside a major portion of said tube.

23. A system as set forth in claim 28 further comprising:
a new diaphragm mounted across the end of said tube after a vehicle is launched through said tube;
means for re-evacuating that portion of the tube between said closed door and said new diaphragm; and
means for opening said door before another vehicle is launched.

24. A system as set forth in claim 20 further comprising:
air-lock means mounted on the beginning of said evacuated accelerating tube;
means for introducing a space vehicle into said air-lock means adapted for transferring said vehicle from the outside atmosphere into said electromagnetic accelerator while maintaining a vacuum environment inside said accelerating tube;
pumping means adapted for establishing a vacuum inside said air-lock means; and
means for accelerating said vehicle inside said tube by moving magnetic fields generated by said electromagnetic accelerator.

25. A system as set forth in claim 20 wherein said space vehicle is reusable and further comprises:
auxiliary propulsion means mounted on-board said space vehicle whereby said vehicle can be maneuvered into an orbit around the Earth after being launched by said electromagnetic accelerator;
means for returning said space vehicle back into the Earth's atmosphere;
means for decelerating said space vehicle to suborbital velocities;
retractable wings;
retractable aerodynamic control surfaces;
retractable landing gears;
means for retracting said wings; control surfaces and landing gears into the body of said space vehicle during launching; and
means for deploying said wings, control surfaces and landing gears such that said space vehicle can be landed like an airplane on a runway on the Earth's surface.

26. A system as set forth in claim 25 further comprising a detachable nose cone that is mounted on the forward portion of the space vehicle during launching and jettisoned prior to landing.

27. A system as set forth in claim 25 wherein said space vehicle further comprises:
a plurality of air-breathing jet engines;
a plurality of movable air inlet ducts adapted for drawing air into said jet engines;
a plurality of movable jet exhaust ducts adapted for expelling jet exhaust out of said jet engines;
means for retracting said air inlet and exhaust ducts during launching;
means for deploying said air inlet and exhaust ducts during landing; and
means for turning off said jet engines during launching and turning on said jet engines after said vehicle reenters the atmosphere such that said space vehicle lands as a powered flight aircraft.

28. A system as set forth in claim 27 wherein said air-breathing jet engines can be utilized to give said space vehicle a sustained flight capability through the atmosphere prior to landing.

29. A system as set forth in claim 20 wherein said electromagnetic accelerator has a length exceeding 500 km.

30. A system as set forth in claim 20 wherein said electromagnetic accelerator is mounted inside an underground tunnel that begins at a relatively low elevation and ends at a relatively high elevation thereby creating a gravitational potential difference between the ends of said tunnel and further comprising means for utilizing said gravitational potential difference to generate electrical energy for launching space vehicles by means of said electromagnetic accelerator.

31. A system as set forth in claim 30 wherein said means of utilizing said gravitational potential difference comprises:
water conduit means mounted inside said tunnel;
means for feeding water into said conduit at the higher elevation;
means for withdrawing said water at the lower elevation, said water compressed by gravitational hydrostatic water pressure;
a hydroelectric turbine generator means adapted for generating electric power;
means for feeding said withdrawn compressed water into said hydroelectric electric turbine generator means thereby converting gravitational potential energy into electrical energy;
means for accumulating and storing the electrical energy generated by said hydroelectric turbine generator means; and
means for discharging a portion of said accumulated electrical energy into said electromagnetic accelerator for launching said space vehicle.

32. A system as set forth in claim 20 wherein said electromagnetic accelerator is mounted inside a tunnel that extends to a depth exceeding 5 km below sea level at the mid-point where the surrounding rock walls are at a relatively high temperature due to natural geothermal energy and further comprising means for converting a portion of said geothermal energy into electrical energy.

33. A system as set forth in claim 32 wherein said means for converting said geothermal energy into electrical energy comprises:
water conduit means mounted inside said tunnel adapted for heating water by absorbing said geothermal energy;
means for feeding water into said conduit;
means for withdrawing heated water at the opposite end of said conduit and
means for converting a portion of the heat energy absorbed by said water into electrical energy.

34. A system as set forth in claim 33 further comprising means for feeding a portion of said electrical energy into an electric power grid for distribution as commercial power.

35. A system as set forth in claim 28 further comprising a graphite plug mounted at the tip of said nose cone such that as the vehicle tranverses through the atmosphere at hypervelocity a portion of said graphite plug evaporates, thereby absorbing heat while shielding said nose cone from direct contact with the incident air stream and generating a narrow bow shock wave.

36. A system as set forth in claim 35 further comprising means for generating a magnetic field around a portion of said nose cone such that said bow shock wave is deflected away from said nose cone and from said space vehicle.

37. A system as set forth in claim 36 further comprising means for controlling the flight path of said vehicle while traversing through the atmosphere at hypervelocity, said means comprising:
means for generating a plurality of magnetic fields around a portion of said vehicle; and
means for varying the strength of said magnetic fields which, by interacting with shock waves, generate flight control forces.

38. A system for accelerating, a body to high velocities within the Earth's atmosphere comprising:
electromagnetic accelerator means having an acclerating tube located within the Earth's atmosphere;
an air-tight piston adapted for travel through said tube;
means for introducing said piston into said tube;
means for evacuating the space behind said piston after said piston is introduced into said tube;
means for driving said piston through said tube by electromagnetic forces generated by said accelerator thereby forcing atmospheric air out of said tube;
means for withdrawing said piston from said tube after said tube is evacuated;
means for introducing said body into said tube while maintaining a vacuum enviornment inside siad tube; and
means for accelerating said body through said evacuated tube by said electromagnetic accelerator.

39. A system as set forth in claim 38 further comprising:
a diaphragm having magnetic susceptibility mounted in-air-tight sealing engagement across the end of said tube; and
means for applying a sufficient magnetic field to said diaphgragm that the resulting magnetic forces acting on said diaphragm substantially cancel the inward forces generated by atmospheric pressure.

40. A system as set forth in claim 39 further comprising:
an air-tight door mounted some distance from the end of said tube; and
means for closing said door immediately after said body passes said door such that said door is closed before any atmospheric gas reaches said door after said body breaks through said diaphragm, thereby preserving the vacuum enviornment inside a major portion of said tube.

41. A system as set forth in claim 38 further comprising:
air-lock means mounted on the beginning of said evacuated tube; and
means for introducing said body into said tube while maintaining a vacuum inside said tube by said air-lock means.

42. A system for evacuating an electromagnetic accelerator having an evacuated accelerating tube comprising:
a free moving piston with outside diameter equal to the inside diameter of said accelerating tube such that said piston moves in air-tight sealing engagement with the inside walls of said tube; and
magnetic coil means mounted inside said piston such that said accelerator drives said piston through said tube forcing atmospheric gas out of the tube.

43. A method for evacuating an electromagnetic accelerator having an accelerating tube by the steps of:
introducing an air-tight piston into said accelerating tube;
closing an air-tight door behind said piston after introducing said piston into said tube;
evacuating the space between said piston and said door; and
driving said piston through said tube by electromagnetic forces generated by said acclerator thereby forcing atmospheric air out of said tube.

* * * * *